US012710662B2

(12) United States Patent
Osterhout et al.

(10) Patent No.: US 12,710,662 B2
(45) Date of Patent: Aug. 18, 2026

(54) MODULAR SYSTEMS FOR HEAD-WORN COMPUTERS

(71) Applicant: Mentor Acquisition One, LLC, Plantation, FL (US)

(72) Inventors: Ralph F. Osterhout, San Francisco, CA (US); Robert Michael Lohse, Palo Alto, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 106 days.

(21) Appl. No.: 18/934,864

(22) Filed: Nov. 1, 2024

(65) Prior Publication Data

US 2025/0060604 A1 Feb. 20, 2025

Related U.S. Application Data

(63) Continuation of application No. 18/607,238, filed on Mar. 15, 2024, now Pat. No. 12,174,393, which is a (Continued)

(51) Int. Cl.
*G06F 1/16* (2006.01)
*G02B 27/01* (2006.01)
(Continued)

(52) U.S. Cl.
CPC ......... *G02B 27/0176* (2013.01); *G06F 1/163* (2013.01); *G06F 1/1632* (2013.01); *G06F 1/1658* (2013.01); *G02B 2027/0156* (2013.01); *G02B 2027/0161* (2013.01); *G02B 2027/0178* (2013.01); *G06F 3/012* (2013.01);
(Continued)

(58) Field of Classification Search
CPC ...... G06F 1/163; G06F 1/1632; G06F 1/1658; G06F 3/012; G06F 3/013; G06F 3/016; G06F 3/017; G06F 3/0346; G06F 3/03545; G06F 3/0362; G02B 27/0176;
(Continued)

(56) References Cited

U.S. PATENT DOCUMENTS 1,897,833 A 2/1933 Benway
2,064,604 A 12/1936 Paul
(Continued)

FOREIGN PATENT DOCUMENTS

CA 2316473 A1 1/2001
CA 2362895 A1 12/2002
(Continued)

OTHER PUBLICATIONS

US 8,743,465 B2, 06/2014, Totani (withdrawn)
(Continued)

*Primary Examiner* — Anthony M Haughton
(74) *Attorney, Agent, or Firm* — Vista IP Law Group, LLP

(57) ABSTRACT

Aspects of the present disclosure relate to modular expansion systems for use in head-worn computing systems. In an head-worn computer, an electrical connector is adapted to electrically connect with a modular expansion module, wherein the modular expansion module adds a capability to the head-worn computer and is removeably mounted to the head-worn computer, and a mount is adapted to physically secure the modular expansion module to the head-worn computer.

20 Claims, 45 Drawing Sheets

Related U.S. Application Data continuation of application No. 18/355,153, filed on Jul. 19, 2023, now Pat. No. 11,977,238, which is a continuation of application No. 18/153,957, filed on Jan. 12, 2023, now Pat. No. 11,754,845, which is a continuation of application No. 17/894,926, filed on Aug. 24, 2022, now Pat. No. 11,586,048, which is a continuation of application No. 17/242,550, filed on Apr. 28, 2021, now Pat. No. 11,460,708, which is a continuation of application No. 16/670,943, filed on Oct. 31, 2019, now Pat. No. 11,022,808, which is a continuation of application No. 15/170,256, filed on Jun. 1, 2016, now Pat. No. 10,466,491.

(51) Int. Cl.
*G06F 3/01* (2006.01)
*G06F 3/0346* (2013.01)
*G06F 3/0354* (2013.01)
*G06F 3/0362* (2013.01)

(52) U.S. Cl.
CPC .............. *G06F 3/013* (2013.01); *G06F 3/016* (2013.01); *G06F 3/017* (2013.01); *G06F 3/0346* (2013.01); *G06F 3/03545* (2013.01); *G06F 3/0362* (2013.01)

(58) Field of Classification Search
CPC .... G02B 2027/0156; G02B 2027/0161; G02B 2027/0178
See application file for complete search history.

(56) References Cited

U.S. PATENT DOCUMENTS 3,305,294 A 2/1967 Alvarez
3,531,190 A 9/1970 Leblanc
3,671,111 A 6/1972 Okner
4,145,125 A 3/1979 Chika
4,513,812 A 4/1985 Papst et al.
4,695,129 A 9/1987 Faessen et al.
4,852,988 A 8/1989 Velez
4,859,031 A 8/1989 Berman et al.
D327,674 S 7/1992 Kuo
5,257,094 A 10/1993 Larussa
5,305,124 A 4/1994 Chern
D352,930 S 11/1994 Tsuji
D375,748 S 11/1996 Hartman
D376,790 S 12/1996 Taylor
5,596,451 A 1/1997 Handschy
5,625,372 A 4/1997 Hildebrand
D383,148 S 9/1997 Lee
5,699,194 A 12/1997 Takahashi
5,717,422 A 2/1998 Fergason
D392,959 S 3/1998 Edwards
5,741,446 A 4/1998 Tahara
5,767,841 A 6/1998 Hartman
5,788,195 A 8/1998 Rice
5,796,374 A * 8/1998 Cone .................. G02B 27/0176 345/8
5,808,589 A 9/1998 Fergason
5,808,800 A 9/1998 Handschy
5,808,802 A 9/1998 Hur
5,815,126 A 9/1998 Fan et al.
5,889,567 A 3/1999 Swanson
D410,638 S 6/1999 Loughnane
5,914,818 A 6/1999 Tejada
5,949,583 A 9/1999 Rallison
5,954,642 A 9/1999 Johnson
5,971,538 A 10/1999 Heffner
6,034,653 A 3/2000 Robertson
6,076,927 A 6/2000 Owens
6,137,675 A 10/2000 Perkins
6,147,805 A 11/2000 Fergason
6,157,291 A 12/2000 Kuenster
6,195,136 B1 2/2001 Handschy
6,204,974 B1 3/2001 Spitzer
6,297,749 B1 10/2001 Smith
D451,892 S 12/2001 Carrere
6,359,723 B1 3/2002 Handschy
6,369,952 B1 4/2002 Rallison
6,379,009 B1 4/2002 Fergason
6,384,982 B1 5/2002 Spitzer
D460,071 S 7/2002 Sheehan
6,421,031 B1 7/2002 Ronzani
6,433,760 B1 8/2002 Vaissie
6,456,438 B1 9/2002 Lee
6,461,000 B1 10/2002 Magarill
6,478,429 B1 11/2002 Aritake
6,480,174 B1 11/2002 Kaufmann
6,491,389 B2 12/2002 Yaguchi
6,491,391 B1 12/2002 Blum et al.
D470,144 S 2/2003 Li
6,535,182 B2 3/2003 Stanton
D473,871 S 4/2003 Santos
D478,052 S 8/2003 Thomas, Jr.
6,642,945 B1 11/2003 Sharpe
6,683,584 B2 1/2004 Ronzani
6,717,075 B1 4/2004 Stavely
6,747,611 B1 6/2004 Budd
6,771,294 B1 8/2004 Pulli
6,816,141 B1 11/2004 Fergason
6,824,265 B1 11/2004 Harper
6,847,336 B1 1/2005 Lemelson
6,847,496 B1 1/2005 Presby
6,906,836 B2 6/2005 Parker
6,943,754 B2 9/2005 Aughey
6,956,558 B1 10/2005 Rosenberg
D512,027 S 11/2005 Sarasjoki
D513,233 S 12/2005 Stauffer
6,977,776 B2 12/2005 Volkenandt et al.
6,987,787 B1 1/2006 Mick
D514,525 S 2/2006 Stauffer
D521,493 S 5/2006 Wai
7,088,234 B2 8/2006 Naito
D529,467 S 10/2006 Rose
7,119,971 B2 10/2006 Kobayashi
D541,226 S 4/2007 Wakisaka
7,199,934 B2 4/2007 Yamasaki
7,206,134 B2 4/2007 Weissman
D559,793 S 1/2008 Fan
7,347,551 B2 3/2008 Fergason et al.
D571,816 S 6/2008 Corcoran
7,380,936 B2 6/2008 Howell
7,401,918 B2 7/2008 Howell
7,401,920 B1 7/2008 Kranz
7,417,617 B2 8/2008 Eichenlaub
7,425,065 B2 9/2008 Wang
7,481,531 B2 1/2009 Howell
7,488,294 B2 2/2009 Torch
7,500,747 B2 3/2009 Howell
7,543,943 B1 6/2009 Hubby, Jr.
7,582,828 B2 9/2009 Ryan
7,656,585 B1 2/2010 Powell
7,677,723 B2 3/2010 Howell
7,690,799 B2 4/2010 Nestorovic
7,733,571 B1 6/2010 Li
7,758,185 B2 7/2010 Lewis
7,771,046 B2 8/2010 Howell
7,777,690 B2 8/2010 Winsor
7,777,723 B2 8/2010 Namiki
7,777,960 B2 8/2010 Freeman
7,791,889 B2 9/2010 Belady
7,792,552 B2 9/2010 Thomas
7,806,525 B2 10/2010 Howell
7,830,370 B2 11/2010 Yamazaki
D628,616 S 12/2010 Yuan
7,850,301 B2 12/2010 Dichiara
7,855,743 B2 12/2010 Sako
D630,213 S 1/2011 Fidali
D631,881 S 2/2011 Quinn
D631,882 S 2/2011 Odgers
7,928,926 B2 4/2011 Yamamoto

(56) References Cited

U.S. PATENT DOCUMENTS 8,004,765 B2 8/2011 Amitai
D645,492 S 9/2011 Zhao
D645,493 S 9/2011 Zhao
8,018,579 B1 9/2011 Krah
D646,316 S 10/2011 Zhao
D647,947 S 11/2011 Yu
8,079,713 B2 12/2011 Ashkenazi
8,089,568 B1 1/2012 Brown
8,092,007 B2 1/2012 Dichiara
8,125,716 B2 2/2012 Bryant
8,166,421 B2 4/2012 Magal
8,184,067 B1 5/2012 Braun
8,187,481 B1 5/2012 Hobbs
8,223,024 B1 7/2012 Petrou
8,223,121 B2 7/2012 Shaw
8,228,315 B1 7/2012 Starner
D665,838 S 8/2012 Kim
8,235,529 B1 8/2012 Raffle
D667,482 S 9/2012 Healy
D667,483 S 9/2012 Krsmanovic
D669,066 S 10/2012 Olsson
D671,590 S 11/2012 Klinar
8,337,013 B2 12/2012 Howell
8,353,594 B2 1/2013 Lewis
8,376,548 B2 2/2013 Schultz
8,378,924 B2 2/2013 Jacobsen
8,384,999 B1 2/2013 Crosby
D680,112 S 4/2013 Monahan
D680,152 S 4/2013 Olsson
8,427,396 B1 4/2013 Kim
8,430,507 B2 4/2013 Howell
8,434,863 B2 5/2013 Howell
D685,019 S 6/2013 Li
8,467,133 B2 6/2013 Miller
8,472,120 B2 6/2013 Border
8,477,425 B2 7/2013 Border
8,482,859 B2 7/2013 Border
8,488,246 B2 7/2013 Border
8,494,215 B2 7/2013 Kimchi
8,520,310 B2 8/2013 Shimizu
D689,862 S 9/2013 Liu
D690,684 S 10/2013 Lee
D692,047 S 10/2013 Shin
8,553,910 B1 10/2013 Dong
8,564,883 B2 10/2013 Totani
8,570,273 B1 10/2013 Smith
8,570,656 B1 10/2013 Weissman
D693,398 S 11/2013 Rubin
8,576,276 B2 * 11/2013 Bar-Zeev .............. G06T 19/006 348/53
8,576,491 B2 11/2013 Takagi
8,587,869 B2 11/2013 Totani
8,593,795 B1 11/2013 Chi
8,594,467 B2 11/2013 Lu
D696,668 S 12/2013 Chen
8,611,015 B2 12/2013 Wheeler
D697,914 S 1/2014 Bates
8,638,498 B2 1/2014 Bohn et al.
8,662,686 B2 3/2014 Takagi
8,665,214 B2 3/2014 Forutanpour et al.
8,670,183 B2 3/2014 Clavin
8,678,581 B2 3/2014 Blum
8,696,113 B2 4/2014 Lewis
8,698,157 B2 4/2014 Hanamura
8,711,487 B2 4/2014 Takeda
D704,764 S 5/2014 Markovitz
8,733,927 B1 5/2014 Lewis
8,733,928 B1 5/2014 Lewis
8,743,052 B1 6/2014 Keller
8,745,058 B1 6/2014 Garcia-barrio
8,750,541 B1 6/2014 Dong
8,752,963 B2 6/2014 Mcculloch
8,770,742 B2 7/2014 Howell
8,786,675 B2 7/2014 Deering
8,786,686 B1 7/2014 Amirparviz
8,787,006 B2 7/2014 Golko
8,803,867 B2 8/2014 Oikawa
8,814,691 B2 * 8/2014 Haddick ................. G06F 3/012 463/36
8,823,071 B2 9/2014 Oyamada
8,832,557 B2 9/2014 Fadell
8,837,880 B2 9/2014 Takeda
8,854,735 B2 10/2014 Totani
8,866,702 B1 10/2014 Wong
D716,808 S 11/2014 Yeom
D716,813 S 11/2014 Deng
D718,309 S 11/2014 Roberts
8,878,749 B1 11/2014 Wu
D719,568 S 12/2014 Heinrich
D719,569 S 12/2014 Heinrich
D719,570 S 12/2014 Heinrich
8,922,530 B2 12/2014 Pance
8,929,589 B2 1/2015 Publicover et al.
D723,092 S 2/2015 Markovitz
D723,093 S 2/2015 Li
8,955,973 B2 2/2015 Raffle
8,957,835 B2 2/2015 Hoellwarth
8,963,068 B2 2/2015 Hagopian
8,964,298 B2 2/2015 Haddick
D724,083 S 3/2015 Olsson
8,971,023 B2 3/2015 Olsson
8,982,471 B1 3/2015 Starner
D727,317 S 4/2015 Olsson
9,010,929 B2 4/2015 Lewis
D728,573 S 5/2015 Deng
9,024,842 B1 5/2015 Prada Gomez
9,031,273 B2 5/2015 Dong
D730,975 S 6/2015 Stables
D732,025 S 6/2015 Heinrich
9,046,999 B1 6/2015 Teller
9,063,563 B1 6/2015 Gray
9,064,436 B1 6/2015 Patel
D733,709 S 7/2015 Kawai
9,076,368 B2 7/2015 Evans
9,105,261 B2 8/2015 Horii
D738,373 S 9/2015 Davies
9,122,054 B2 9/2015 Osterhout
9,128,281 B2 9/2015 Osterhout
9,129,295 B2 9/2015 Border
9,141,191 B2 9/2015 Horowitz
9,141,194 B1 9/2015 Keyes
9,143,693 B1 9/2015 Zhou
D741,398 S 10/2015 Echeverri
9,158,116 B1 10/2015 Osterhout
D743,963 S 11/2015 Osterhout
9,176,582 B1 11/2015 Johnson
D744,581 S 12/2015 Votel
D745,007 S 12/2015 Cazalet
9,213,163 B2 * 12/2015 Lewis .................... A61B 3/113
9,223,136 B1 12/2015 Braun
9,229,233 B2 1/2016 Osterhout
9,235,064 B2 1/2016 Lewis
9,239,473 B2 1/2016 Lewis
9,244,293 B2 1/2016 Lewis
D751,551 S 3/2016 Ho
D751,552 S 3/2016 Osterhout
9,274,338 B2 3/2016 Robbins et al.
9,286,728 B2 3/2016 Osterhout
9,292,082 B1 3/2016 Patel
9,292,973 B2 3/2016 Bar-zeev et al.
9,298,001 B2 3/2016 Border
9,298,002 B2 3/2016 Border
D753,114 S 4/2016 Osterhout
9,310,610 B2 4/2016 Border
9,316,833 B2 4/2016 Border
9,323,325 B2 4/2016 Perez et al.
9,324,189 B2 4/2016 Vaughn
D756,363 S 5/2016 Mathis
D757,006 S 5/2016 Cazalet
9,329,387 B2 5/2016 Border
9,344,612 B2 * 5/2016 Ritchey .............. G02B 27/0179
9,366,867 B2 6/2016 Border
9,366,868 B2 6/2016 Border
9,370,302 B2 6/2016 Krueger

(56) References Cited

U.S. PATENT DOCUMENTS 9,374,655 B1 6/2016 Lee
9,377,625 B2 6/2016 Border
D761,796 S 7/2016 Heinrich
9,400,390 B2 7/2016 Osterhout
9,401,540 B2 7/2016 Osterhout
D765,076 S 8/2016 Rochat et al.
9,423,842 B2 8/2016 Osterhout
9,436,006 B2 9/2016 Border
9,448,409 B2 9/2016 Border
D768,759 S 10/2016 Markovitz et al.
D769,873 S 10/2016 Cazalet et al.
9,482,880 B1 11/2016 Chandrasekhar
9,494,800 B2 11/2016 Border
9,523,856 B2 12/2016 Osterhout
9,529,195 B2 12/2016 Osterhout
9,529,199 B2 12/2016 Osterhout
9,529,385 B2 12/2016 Connor
9,532,714 B2 1/2017 Border
9,538,915 B2 1/2017 Border
9,575,321 B2 2/2017 Osterhout
9,594,246 B2 3/2017 Border
9,612,453 B2 4/2017 Lee et al.
9,651,783 B2 5/2017 Border
9,651,787 B2 5/2017 Haddick
9,651,788 B2 5/2017 Osterhout
9,651,789 B2 5/2017 Osterhout
9,658,473 B2 5/2017 Lewis
9,671,613 B2 6/2017 Border
9,672,210 B2 6/2017 Osterhout
9,682,622 B2 6/2017 Kim
9,684,171 B2 6/2017 Border
9,684,172 B2 6/2017 Border
9,690,763 B1 6/2017 Lee
D792,400 S 7/2017 Osterhout
D793,391 S 8/2017 Nakagawa et al.
D793,467 S 8/2017 Krause
D794,022 S 8/2017 Limaye et al.
D794,637 S 8/2017 Osterhout
D795,865 S 8/2017 Porter et al.
9,720,227 B2 8/2017 Border
9,720,234 B2 8/2017 Border
9,720,235 B2 8/2017 Border
9,720,505 B2 8/2017 Gribetz et al.
9,740,012 B2 8/2017 Border
9,746,676 B2 8/2017 Osterhout
D796,504 S 9/2017 Natsume et al.
D796,506 S 9/2017 Natsume et al.
D800,118 S 10/2017 Xing et al.
9,798,148 B2 10/2017 Border
D803,832 S 11/2017 Lin et al.
9,810,906 B2 11/2017 Osterhout
9,829,707 B2 11/2017 Border
9,841,599 B2 12/2017 Border
9,846,308 B2 12/2017 Osterhout
9,897,822 B2 2/2018 Osterhout
9,910,284 B1 3/2018 Nortrup
9,927,612 B2 3/2018 Border
9,933,622 B2 4/2018 Border
9,939,934 B2 4/2018 Osterhout
10,013,053 B2 7/2018 Cederlund et al.
10,025,379 B2 7/2018 Drake et al.
10,151,937 B2 12/2018 Lewis
10,185,147 B2 1/2019 Lewis
10,466,491 B2 11/2019 Osterhout et al.
10,539,787 B2 1/2020 Haddick et al.
10,684,478 B2 6/2020 Osterhout
10,824,253 B2 11/2020 Osterhout
10,860,100 B2 * 12/2020 Osterhout ............ G06F 3/0346
11,022,808 B2 6/2021 Osterhout et al.
11,460,708 B2 10/2022 Osterhout et al.
11,586,048 B2 2/2023 Osterhout et al.
11,754,845 B2 9/2023 Osterhout et al.
11,977,238 B2 5/2024 Osterhout
12,174,393 B2 12/2024 Osterhout
2001/0017614 A1 8/2001 Hara
2001/0019240 A1 9/2001 Takahashi
2002/0021498 A1 2/2002 Ohtaka
2002/0024675 A1 2/2002 Foxlin
2002/0054272 A1 5/2002 Ebata
2002/0101568 A1 8/2002 Eberl
2002/0109903 A1 8/2002 Kaeriyama
2002/0148655 A1 10/2002 Cho
2002/0181115 A1 12/2002 Massof
2002/0191297 A1 12/2002 Gleckman
2003/0002165 A1 1/2003 Mathias
2003/0030597 A1 2/2003 Geist
2003/0030912 A1 2/2003 Gleckman
2003/0048531 A1 3/2003 Luecke
2003/0142065 A1 7/2003 Pahlavan
2003/0151834 A1 8/2003 Penn
2003/0156191 A1 8/2003 Urisaka
2003/0234823 A1 12/2003 Sato
2004/0003453 A1 1/2004 Urakawa
2004/0008158 A1 1/2004 Chi
2004/0024287 A1 2/2004 Patton
2004/0027312 A1 2/2004 Owada
2004/0032392 A1 2/2004 Chi
2004/0046736 A1 3/2004 Pryor
2004/0066363 A1 4/2004 Yamano
2004/0066547 A1 4/2004 Parker
2004/0080541 A1 4/2004 Saiga
2004/0130522 A1 7/2004 Lin
2004/0132509 A1 7/2004 Glezerman
2004/0150631 A1 8/2004 Fleck
2004/0162211 A1 8/2004 Domey
2004/0174497 A1 9/2004 Sharma
2004/0194880 A1 10/2004 Jiang
2004/0224765 A1 11/2004 Martinez
2004/0227994 A1 11/2004 Bruzzone
2005/0041289 A1 2/2005 Berman
2005/0099592 A1 5/2005 Lee
2005/0156915 A1 7/2005 Fisher
2005/0157949 A1 7/2005 Aiso
2005/0212980 A1 9/2005 Miyazaki
2005/0264752 A1 12/2005 Howell
2005/0280772 A1 12/2005 Hammock
2006/0017654 A1 1/2006 Romo
2006/0023158 A1 2/2006 Howell et al.
2006/0047339 A1 3/2006 Brown
2006/0061542 A1 3/2006 Stokic
2006/0098293 A1 5/2006 Garoutte
2006/0119794 A1 6/2006 Hillis
2006/0132457 A1 6/2006 Rimas-ribikauskas
2006/0132924 A1 6/2006 Mimran
2006/0170652 A1 8/2006 Bannai
2006/0178827 A1 8/2006 Aoyama
2006/0215111 A1 9/2006 Mihashi
2006/0221266 A1 10/2006 Kato
2006/0239629 A1 10/2006 Qi
2006/0250322 A1 11/2006 Hall
2006/0250696 A1 11/2006 Mcguire
2006/0279549 A1 12/2006 Zhang
2006/0285223 A1 12/2006 Watanabe
2006/0288233 A1 12/2006 Kozlay
2007/0003168 A1 1/2007 Oliver
2007/0004451 A1 1/2007 C, Anderson
2007/0024750 A1 2/2007 Wing
2007/0024763 A1 2/2007 Chung
2007/0024764 A1 2/2007 Chung
2007/0024820 A1 2/2007 Chung
2007/0024823 A1 2/2007 Chung
2007/0025273 A1 2/2007 Chung
2007/0030379 A1 2/2007 Agranov
2007/0030456 A1 2/2007 Duncan
2007/0038960 A1 2/2007 Rekimoto
2007/0058868 A1 3/2007 Seino
2007/0070859 A1 3/2007 Hirayama
2007/0075989 A1 4/2007 Cohen
2007/0091431 A1 4/2007 Mezouari
2007/0120806 A1 5/2007 Schmidt
2007/0120836 A1 5/2007 Yamaguchi
2007/0132662 A1 6/2007 Morita
2007/0153639 A1 7/2007 Lafever
2007/0156364 A1 7/2007 Rothkopf

(56) References Cited

U.S. PATENT DOCUMENTS

2007/0178950 A1 8/2007 Lewis
2007/0229458 A1 10/2007 Moon
2007/0236450 A1 10/2007 Colgate
2007/0263174 A1 11/2007 Cheng
2007/0274080 A1 11/2007 Negley
2007/0296684 A1 12/2007 Thomas
2008/0002262 A1 1/2008 Chirieleison
2008/0005702 A1 1/2008 Skourup
2008/0066973 A1 3/2008 Furuki
2008/0088793 A1 4/2008 Sverdrup
2008/0121441 A1 5/2008 Sheets
2008/0122736 A1 5/2008 Ronzani
2008/0125288 A1 5/2008 Case
2008/0143954 A1 6/2008 Abreu
2008/0169998 A1 7/2008 Jacobsen
2008/0186255 A1 8/2008 Cohen
2008/0266645 A1 10/2008 Dharmatilleke
2008/0291277 A1 11/2008 Jacobsen
2008/0298639 A1 12/2008 Tsunekawa
2009/0013204 A1 1/2009 Kobayashi
2009/0015735 A1 1/2009 Simmonds
2009/0015736 A1 1/2009 Weller
2009/0040296 A1 2/2009 Moscato
2009/0108837 A1 4/2009 Johansson
2009/0147331 A1 6/2009 Ashkenazi
2009/0180194 A1 7/2009 Yamaguchi
2009/0183929 A1 7/2009 Zhang
2009/0195875 A1 8/2009 Pasca
2009/0251441 A1 10/2009 Edgecomb
2009/0279180 A1 11/2009 Amitai
2009/0324121 A1 12/2009 Bhagavathy
2010/0001572 A1 1/2010 Masunaga
2010/0007852 A1 1/2010 Bietry
2010/0045928 A1 2/2010 Levy
2010/0073376 A1 3/2010 Schmale
2010/0079356 A1 4/2010 Hoellwarth
2010/0079508 A1 4/2010 Hodge
2010/0079733 A1 4/2010 Lu
2010/0085325 A1 4/2010 King-smith
2010/0091139 A1* 4/2010 Sako .................... H04N 23/00 348/308
2010/0097580 A1 4/2010 Yamamoto
2010/0103075 A1 4/2010 Kalaboukis
2010/0130140 A1 5/2010 Waku
2010/0134848 A1 6/2010 Lynggaard
2010/0149073 A1 6/2010 Chaum
2010/0149510 A1 6/2010 Zaczek
2010/0182561 A1 7/2010 Ikeda
2010/0194682 A1 8/2010 Orr
2010/0254017 A1 10/2010 Martins
2010/0259718 A1 10/2010 Hardy
2010/0283774 A1 11/2010 Bovet
2010/0290124 A1 11/2010 Tohara
2010/0290127 A1 11/2010 Kessler
2010/0309097 A1 12/2010 Raviv
2010/0309426 A1 12/2010 Howell
2011/0006982 A1 1/2011 Rhee
2011/0012874 A1 1/2011 Kurozuka
2011/0043644 A1 2/2011 Munger
2011/0084900 A1 4/2011 Jacobsen
2011/0096100 A1 4/2011 Sprague
2011/0109587 A1 5/2011 Ferencz
2011/0130958 A1 6/2011 Stahl
2011/0131495 A1 6/2011 Bull
2011/0159931 A1 6/2011 Boss
2011/0164047 A1 7/2011 Pance
2011/0164163 A1 7/2011 Bilbrey
2011/0164221 A1 7/2011 Tilleman
2011/0196610 A1 8/2011 Waldman
2011/0199171 A1 8/2011 Prest
2011/0199305 A1 8/2011 Suh
2011/0201213 A1 8/2011 Dabov
2011/0202823 A1 8/2011 Berger
2011/0205209 A1 8/2011 Kurokawa
2011/0211056 A1 9/2011 Publicover et al.
2011/0213664 A1 9/2011 Osterhout
2011/0221658 A1 9/2011 Haddick
2011/0227820 A1 9/2011 Haddick
2011/0234475 A1 9/2011 Endo
2011/0241975 A1 10/2011 Mukawa
2011/0248963 A1 10/2011 Lawrence
2011/0285638 A1 11/2011 Harris
2011/0285764 A1 11/2011 Kimura
2011/0316413 A1 12/2011 Ghosh
2012/0021806 A1 1/2012 Maltz
2012/0026088 A1 2/2012 Goran
2012/0026455 A1 2/2012 Takahashi
2012/0049759 A1 3/2012 Pezzutti
2012/0050140 A1 3/2012 Border
2012/0050493 A1 3/2012 Ernst
2012/0062445 A1 3/2012 Haddick
2012/0062594 A1 3/2012 Campbell
2012/0062850 A1 3/2012 Travis
2012/0062998 A1 3/2012 Schultz
2012/0068913 A1 3/2012 Bar-zeev
2012/0069413 A1 3/2012 Schultz
2012/0075168 A1 3/2012 Osterhout
2012/0081800 A1 4/2012 Cheng
2012/0105740 A1* 5/2012 Jannard ................ G02B 27/017 351/158
2012/0113514 A1 5/2012 Rodman
2012/0119978 A1 5/2012 Border
2012/0120103 A1 5/2012 Border
2012/0120498 A1 5/2012 Harrison
2012/0133885 A1 5/2012 Howell
2012/0139915 A1 6/2012 Muikaichi
2012/0162270 A1 6/2012 Fleck
2012/0163013 A1 6/2012 Buelow, II
2012/0169608 A1 7/2012 Forutanpour
2012/0176682 A1 7/2012 Dejong
2012/0188245 A1 7/2012 Hyatt
2012/0194553 A1 8/2012 Osterhout
2012/0200935 A1 8/2012 Miyao
2012/0206817 A1 8/2012 Totani
2012/0212398 A1 8/2012 Border
2012/0212484 A1 8/2012 Haddick
2012/0212499 A1 8/2012 Haddick
2012/0212593 A1 8/2012 Na
2012/0218301 A1* 8/2012 Miller .................... G06F 3/017 345/633
2012/0223885 A1 9/2012 Perez
2012/0229248 A1 9/2012 Parshionikar
2012/0235885 A1 9/2012 Miller
2012/0242570 A1 9/2012 Kobayashi
2012/0242678 A1 9/2012 Border
2012/0242697 A1 9/2012 Border
2012/0242698 A1 9/2012 Haddick
2012/0249741 A1 10/2012 Maciocci
2012/0250152 A1 10/2012 Larson
2012/0256944 A1 10/2012 Crumly
2012/0262667 A1* 10/2012 Willey .................... G02C 5/14 351/158
2012/0264510 A1 10/2012 Wigdor
2012/0268449 A1 10/2012 Choi
2012/0287398 A1 11/2012 Baker
2012/0293548 A1* 11/2012 Perez ..................... G06F 3/012 345/633
2012/0302347 A1 11/2012 Nicholson
2012/0306850 A1 12/2012 Balan
2012/0307198 A1 12/2012 Ifergan
2012/0326948 A1 12/2012 Crocco
2012/0327040 A1 12/2012 Simon
2012/0327116 A1 12/2012 Liu
2013/0002545 A1 1/2013 Heinrich
2013/0002724 A1 1/2013 Heinrich
2013/0009366 A1 1/2013 Hannegan
2013/0009907 A1 1/2013 Rosenberg
2013/0021658 A1 1/2013 Miao
2013/0027341 A1 1/2013 Mastandrea
2013/0027437 A1 1/2013 Gu
2013/0038729 A1 2/2013 Chang
2013/0044042 A1 2/2013 Olsson
2013/0063695 A1 3/2013 Hsieh
2013/0069985 A1 3/2013 Wong

(56) References Cited

U.S. PATENT DOCUMENTS

2013/0070344 A1 3/2013 Takeda
2013/0077049 A1 3/2013 Bohn
2013/0077147 A1 3/2013 Efimov
2013/0083003 A1 4/2013 Perez
2013/0083009 A1 4/2013 Geisner
2013/0083055 A1 4/2013 Piemonte
2013/0088413 A1 4/2013 Raffle
2013/0088415 A1 4/2013 Totani
2013/0100259 A1 4/2013 Ramaswamy
2013/0101253 A1 4/2013 Popovich
2013/0106674 A1 5/2013 Wheeler
2013/0120224 A1 5/2013 Cajigas
2013/0120841 A1 5/2013 Shpunt
2013/0127980 A1 5/2013 Haddick
2013/0135198 A1 5/2013 Hodge
2013/0135244 A1 5/2013 Lynch
2013/0147685 A1 6/2013 Gupta
2013/0154913 A1 6/2013 Genc
2013/0162673 A1 6/2013 Bohn
2013/0169530 A1 7/2013 Bhaskar
2013/0169560 A1 7/2013 Cederlund
2013/0176626 A1 7/2013 Heinrich
2013/0196757 A1 8/2013 Latta
2013/0201080 A1 8/2013 Evans
2013/0201081 A1* 8/2013 Evans .................. G02B 27/017 345/8
2013/0207887 A1 8/2013 Raffle
2013/0207970 A1 8/2013 Shpunt
2013/0222270 A1 8/2013 Winkler
2013/0222919 A1 8/2013 Komatsu
2013/0230215 A1 9/2013 Gurman
2013/0234914 A1 9/2013 Fujimaki
2013/0235331 A1 9/2013 Heinrich
2013/0242405 A1 9/2013 Gupta
2013/0248691 A1 9/2013 Mirov
2013/0249849 A1 9/2013 Wong
2013/0249946 A1 9/2013 Kimura
2013/0250207 A1 9/2013 Bohn
2013/0250430 A1 9/2013 Robbins
2013/0250503 A1 9/2013 Olsson
2013/0257622 A1 10/2013 Davalos
2013/0265212 A1 10/2013 Kato
2013/0265227 A1 10/2013 Julian
2013/0278631 A1 10/2013 Border
2013/0288761 A1 10/2013 Santos Paiva Ferraz Conceicao
2013/0293580 A1 11/2013 Spivack
2013/0300637 A1 11/2013 Smits
2013/0321265 A1 12/2013 Bychkov
2013/0321271 A1 12/2013 Bychkov
2013/0321932 A1 12/2013 Hsu
2013/0336528 A1 12/2013 Itani
2013/0342571 A1 12/2013 Kinnebrew
2013/0342981 A1 12/2013 Cox
2014/0002580 A1 1/2014 Bear
2014/0028704 A1 1/2014 Wu
2014/0029498 A1 1/2014 Kim
2014/0043682 A1 2/2014 Hussey
2014/0062841 A1 3/2014 Ishikawa
2014/0062854 A1 3/2014 Cho
2014/0063054 A1* 3/2014 Osterhout ............. G06T 19/006 345/633
2014/0063055 A1 3/2014 Osterhout
2014/0063473 A1 3/2014 Pasolini
2014/0078043 A1 3/2014 Kim
2014/0111838 A1 4/2014 Han
2014/0111864 A1 4/2014 Margulis
2014/0115520 A1 4/2014 Itani
2014/0125785 A1 5/2014 Na
2014/0129328 A1 5/2014 Mathew
2014/0146394 A1 5/2014 Tout
2014/0147829 A1 5/2014 Jerauld
2014/0152530 A1 6/2014 Venkatesha
2014/0152558 A1 6/2014 Salter
2014/0152676 A1 6/2014 Rohn
2014/0153173 A1 6/2014 Pombo
2014/0159995 A1 6/2014 Adams
2014/0160055 A1 6/2014 Margolis
2014/0160157 A1 6/2014 Poulos
2014/0160170 A1 6/2014 Lyons
2014/0160576 A1 6/2014 Robbins
2014/0165000 A1 6/2014 Fleizach
2014/0168716 A1 6/2014 King
2014/0168735 A1 6/2014 Yuan
2014/0176603 A1 6/2014 Kumar
2014/0177023 A1 6/2014 Gao
2014/0183269 A1 7/2014 Glaser
2014/0191942 A1 7/2014 Kobayashi
2014/0195918 A1 7/2014 Friedlander
2014/0204062 A1 7/2014 Goto
2014/0204759 A1 7/2014 Guo
2014/0206416 A1 7/2014 Aurongzeb
2014/0232651 A1 8/2014 Kress
2014/0240103 A1 8/2014 Lake
2014/0240223 A1 8/2014 Lake
2014/0253605 A1 9/2014 Border
2014/0266988 A1 9/2014 Fisher
2014/0279528 A1 9/2014 Slaby
2014/0285631 A1 9/2014 Janky
2014/0306866 A1 10/2014 Miller
2014/0320383 A1 10/2014 Goto
2014/0320389 A1 10/2014 Scavezze
2014/0347572 A1 11/2014 Liu
2014/0361957 A1 12/2014 Hua
2014/0363797 A1 12/2014 Hu
2014/0375545 A1 12/2014 Ackerman
2015/0002528 A1 1/2015 Bohn
2015/0012581 A1 1/2015 Kim
2015/0015977 A1 1/2015 Karasawa
2015/0016777 A1 1/2015 Abovitz
2015/0029088 A1 1/2015 Kim
2015/0035744 A1 2/2015 Robbins
2015/0040040 A1 2/2015 Balan
2015/0042544 A1 2/2015 Sugihara
2015/0084862 A1 3/2015 Sugihara
2015/0085333 A1 3/2015 Theytaz
2015/0123887 A1 5/2015 Shadle
2015/0128251 A1 5/2015 Yoon
2015/0143297 A1 5/2015 Wheeler
2015/0145839 A1 5/2015 Hack
2015/0147000 A1 5/2015 Salvador Marcos
2015/0156716 A1 6/2015 Raffle
2015/0168730 A1 6/2015 Ashkenazi
2015/0168731 A1 6/2015 Robbins
2015/0178932 A1 6/2015 Wyatt
2015/0185476 A1 7/2015 Lee
2015/0185480 A1 7/2015 Ouderkirk
2015/0198807 A1 7/2015 Hirai
2015/0202962 A1 7/2015 Habashima
2015/0205035 A1 7/2015 Border
2015/0205107 A1 7/2015 Border
2015/0205108 A1 7/2015 Border
2015/0205111 A1 7/2015 Border
2015/0205113 A1 7/2015 Border
2015/0205114 A1 7/2015 Border
2015/0205115 A1 7/2015 Border
2015/0205116 A1 7/2015 Border
2015/0205117 A1 7/2015 Border
2015/0205118 A1 7/2015 Border
2015/0205119 A1 7/2015 Osterhout
2015/0205120 A1 7/2015 Border
2015/0205121 A1 7/2015 Border
2015/0205122 A1 7/2015 Border
2015/0205125 A1 7/2015 Border
2015/0205127 A1 7/2015 Border
2015/0205128 A1 7/2015 Border
2015/0205129 A1 7/2015 Border
2015/0205130 A1 7/2015 Border
2015/0205131 A1 7/2015 Border
2015/0205132 A1 7/2015 Osterhout
2015/0205135 A1 7/2015 Border
2015/0205348 A1 7/2015 Nortrup
2015/0205349 A1 7/2015 Nortrup
2015/0205351 A1 7/2015 Osterhout
2015/0205373 A1 7/2015 Osterhout

(56) References Cited

U.S. PATENT DOCUMENTS

2015/0205378 A1 7/2015 Osterhout
2015/0205384 A1 7/2015 Osterhout
2015/0205385 A1 7/2015 Osterhout
2015/0205387 A1 7/2015 Osterhout
2015/0205388 A1 7/2015 Osterhout
2015/0205401 A1 7/2015 Osterhout
2015/0205402 A1 7/2015 Osterhout
2015/0205566 A1 7/2015 Osterhout
2015/0206173 A1 7/2015 Nortrup
2015/0212324 A1 7/2015 Osterhout
2015/0212327 A1 7/2015 Osterhout
2015/0212647 A1 7/2015 Kim
2015/0213584 A1 7/2015 Ishikawa
2015/0213754 A1 7/2015 Amjad
2015/0226966 A1 8/2015 Osterhout
2015/0226967 A1 8/2015 Osterhout
2015/0228099 A1 8/2015 Osterhout
2015/0228119 A1 8/2015 Osterhout
2015/0228120 A1 8/2015 Osterhout
2015/0229019 A1 8/2015 Osterhout
2015/0234456 A1 8/2015 Cho
2015/0241963 A1 8/2015 Nortrup
2015/0241964 A1 8/2015 Nortrup
2015/0241965 A1 8/2015 Nortrup
2015/0241966 A1 8/2015 Nortrup
2015/0243039 A1 8/2015 Holz
2015/0260887 A1 9/2015 Salisbury
2015/0260986 A1 9/2015 Nortrup
2015/0277116 A1 10/2015 Richards
2015/0277120 A1 10/2015 Border
2015/0277559 A1 10/2015 Vescovi
2015/0293587 A1 10/2015 Wilairat
2015/0293738 A1 10/2015 Lee
2015/0294627 A1 10/2015 Yoo
2015/0296150 A1 10/2015 Benmokhtar Benabdellah
2015/0302646 A1 10/2015 Osterhout
2015/0302647 A1 10/2015 Osterhout
2015/0309313 A1 10/2015 Border
2015/0309314 A1 10/2015 Border
2015/0309317 A1 10/2015 Osterhout
2015/0309534 A1 10/2015 Osterhout
2015/0309995 A1 10/2015 Osterhout
2015/0316769 A1 11/2015 Border
2015/0316770 A1 11/2015 Border
2015/0316771 A1 11/2015 Border
2015/0316772 A1 11/2015 Border
2015/0338661 A1 11/2015 Osterhout
2015/0346496 A1 12/2015 Haddick
2015/0346511 A1 12/2015 Osterhout
2015/0347823 A1 12/2015 Monnerat
2015/0355466 A1 12/2015 Border
2015/0355468 A1 12/2015 Osterhout
2015/0356772 A1 12/2015 Osterhout
2015/0356775 A1 12/2015 Osterhout
2015/0356776 A1 12/2015 Osterhout
2015/0356777 A1 12/2015 Osterhout
2015/0356778 A1 12/2015 Osterhout
2015/0356779 A1 12/2015 Osterhout
2015/0363975 A1 12/2015 Osterhout
2015/0365628 A1 12/2015 Ben-bassat
2015/0378074 A1 12/2015 Kollin
2015/0382305 A1 12/2015 Drincic
2016/0007849 A1 1/2016 Krueger
2016/0011417 A1 1/2016 Border
2016/0018640 A1 1/2016 Haddick
2016/0018641 A1 1/2016 Haddick
2016/0018642 A1 1/2016 Haddick
2016/0018644 A1 1/2016 Border
2016/0018645 A1 1/2016 Haddick
2016/0018646 A1 1/2016 Osterhout
2016/0018647 A1 1/2016 Osterhout
2016/0018648 A1 1/2016 Osterhout
2016/0018649 A1 1/2016 Osterhout
2016/0018650 A1 1/2016 Haddick
2016/0018651 A1 1/2016 Haddick
2016/0018652 A1 1/2016 Haddick
2016/0018653 A1 1/2016 Haddick
2016/0018654 A1 1/2016 Haddick
2016/0019715 A1 1/2016 Haddick
2016/0019719 A1 1/2016 Osterhout
2016/0021304 A1 1/2016 Osterhout
2016/0025974 A1 1/2016 Osterhout
2016/0025977 A1 1/2016 Osterhout
2016/0025979 A1 1/2016 Border
2016/0025980 A1 1/2016 Osterhout
2016/0026239 A1 1/2016 Border
2016/0027211 A1 1/2016 Osterhout
2016/0027414 A1 1/2016 Osterhout
2016/0035139 A1 2/2016 Fuchs
2016/0041618 A1 2/2016 Poupyrev
2016/0048018 A1 2/2016 De Matos Pereira Vieira
2016/0048021 A1 2/2016 Border
2016/0048025 A1 2/2016 Cazalet
2016/0055675 A1 2/2016 Kasahara
2016/0056647 A1 2/2016 Choi
2016/0062118 A1 3/2016 Osterhout
2016/0062121 A1 3/2016 Border
2016/0062122 A1 3/2016 Border
2016/0078278 A1 3/2016 Moore
2016/0080897 A1 3/2016 Moore
2016/0085071 A1 3/2016 Border
2016/0085072 A1 3/2016 Haddick
2016/0085278 A1 3/2016 Osterhout
2016/0091718 A1 3/2016 Border
2016/0091719 A1 3/2016 Border
2016/0098086 A1 4/2016 Li
2016/0103320 A1 4/2016 Kovaluk
2016/0103325 A1 4/2016 Mirza
2016/0109709 A1 4/2016 Osterhout
2016/0109711 A1 4/2016 Border
2016/0109713 A1 4/2016 Osterhout
2016/0116738 A1 4/2016 Osterhout
2016/0116745 A1 4/2016 Osterhout
2016/0131904 A1 5/2016 Border
2016/0131911 A1 5/2016 Border
2016/0131912 A1 5/2016 Border
2016/0132082 A1 5/2016 Border
2016/0133201 A1 5/2016 Border
2016/0140766 A1 5/2016 Balachandreswaran
2016/0147070 A1 5/2016 Border
2016/0154242 A1 6/2016 Border
2016/0154244 A1 6/2016 Border
2016/0154475 A1 6/2016 Eriksson
2016/0161743 A1 6/2016 Osterhout
2016/0161747 A1 6/2016 Osterhout
2016/0170207 A1 6/2016 Haddick
2016/0170208 A1 6/2016 Border
2016/0170209 A1 6/2016 Border
2016/0171769 A1 6/2016 Haddick
2016/0171846 A1 6/2016 Brav
2016/0178904 A1 6/2016 Deleeuw
2016/0187658 A1 6/2016 Osterhout
2016/0202946 A1 7/2016 Osterhout
2016/0209674 A1 7/2016 Montalban
2016/0216516 A1 7/2016 Border
2016/0216517 A1 7/2016 Border
2016/0231571 A1 8/2016 Border
2016/0246055 A1 8/2016 Border
2016/0252731 A1 9/2016 Border
2016/0259166 A1 9/2016 Border
2016/0274361 A1 9/2016 Border
2016/0274365 A1 9/2016 Bailey
2016/0282626 A1 9/2016 Border
2016/0286177 A1 9/2016 Border
2016/0286203 A1 9/2016 Border
2016/0286210 A1 9/2016 Border
2016/0299569 A1 10/2016 Fisher
2016/0329634 A1 11/2016 Osterhout
2016/0357019 A1 12/2016 Border
2016/0370606 A1 12/2016 Huynh
2016/0375306 A1 12/2016 Gu
2017/0017323 A1 1/2017 Yu
2017/0023790 A1 1/2017 Border
2017/0024007 A1 1/2017 Pelis

(56) References Cited

U.S. PATENT DOCUMENTS

2017/0024035 A1 1/2017 Pelis
2017/0031395 A1 2/2017 Osterhout
2017/0052802 A1* 2/2017 Ko .......................... H04W 4/80
2017/0075155 A1 3/2017 Oikawa
2017/0100664 A1 4/2017 Osterhout
2017/0115486 A1 4/2017 Border
2017/0123492 A1 5/2017 Marggraff
2017/0153455 A1 6/2017 Takahashi
2017/0153672 A1 6/2017 Shin
2017/0160812 A1 6/2017 Park
2017/0185214 A1 6/2017 Kojima
2017/0187855 A1 6/2017 Hoellwarth
2017/0219831 A1 8/2017 Haddick
2017/0220865 A1 8/2017 Osterhout
2017/0227778 A1 8/2017 Osterhout
2017/0227793 A1 8/2017 Abreu
2017/0235133 A1 8/2017 Border
2017/0235134 A1 8/2017 Border
2017/0235152 A1 8/2017 Border
2017/0242250 A1 8/2017 Border
2017/0242251 A1 8/2017 Border
2017/0242255 A1 8/2017 Border
2017/0242256 A1 8/2017 Border
2017/0243561 A1 8/2017 Border
2017/0256029 A1 9/2017 Shams
2017/0293351 A1 10/2017 Li
2017/0295229 A1 10/2017 Shams et al.
2017/0322627 A1 11/2017 Osterhout
2017/0324860 A1 11/2017 Novet
2017/0329138 A1 11/2017 Haddick
2017/0336872 A1 11/2017 Osterhout
2017/0337187 A1 11/2017 Osterhout
2017/0343810 A1 11/2017 Bietry
2017/0343812 A1 11/2017 Border
2017/0343813 A1 11/2017 Bietry
2017/0343814 A1 11/2017 Bietry
2017/0343815 A1 11/2017 Border
2017/0343816 A1 11/2017 Bietry
2017/0343817 A1 11/2017 Bietry
2017/0343822 A1 11/2017 Border
2017/0345194 A1 11/2017 Park
2017/0358139 A1 12/2017 Balan
2017/0363872 A1 12/2017 Border
2018/0003988 A1 1/2018 Osterhout
2018/0011571 A1 1/2018 Colgate
2018/0035101 A1 2/2018 Osterhout
2018/0059434 A1 3/2018 Heisey
2018/0067314 A1 3/2018 Nortrup
2018/0067319 A1 3/2018 Border
2018/0108179 A1 4/2018 Tomlin
2018/0113504 A1 4/2018 Osterhout
2018/0113524 A1 4/2018 Osterhout
2018/0113590 A1 4/2018 Osterhout
2018/0129056 A1 5/2018 Nortrup
2018/0253159 A1 9/2018 Ramaiah
2019/0361716 A1* 11/2019 Ko .......................... H04W 4/80
2021/0096372 A1 4/2021 Osterhout

FOREIGN PATENT DOCUMENTS

CA 2388766 A1 12/2003
CN 107250882 A 10/2017
EP 368898 A1 5/1990
EP 777867 A1 6/1997
EP 2486450 A1 8/2012
EP 2502410 A1 9/2012
JP 2009171505 A 7/2009
JP 5017989 B2 9/2012
JP 2012212990 A 11/2012
KR 1020110101944 9/2011
WO 8809942 A1 12/1988
WO 9606378 A1 2/1996
WO 2010062481 A1 6/2010
WO 2011060525 A1 5/2011
WO 2011143655 A1 11/2011
WO 2012058175 A1 5/2012
WO 2013050650 A1 4/2013
WO 2013103825 A1 7/2013
WO 2013110846 A1 8/2013
WO 2013076079 A1 11/2013
WO 2013170073 A1 11/2013
WO 2016044035 A1 3/2016
WO 2016073734 A1 5/2016
WO 2016205601 A1 12/2016
WO 2017100074 A1 6/2017
WO 2018044537 A1 3/2018

OTHER PUBLICATIONS

US 8,792,178 B2, 07/2014, Totani (withdrawn)

PCT/US2015/059264, , "International Application Serial No. PCT/US2015/059264, International Search Report and Written Opinion mailed Feb. 19, 2016", Osterhout Group, Inc., 11 Pages.

15857713.0 European Application Serial No. 15857713.0, Extended European Search Report Received mailed Oct. 16, 2017, Osterhout Group, Inc., seven pages.

ARToolKit. (Oct. 13, 2005). "Hardware," located at: https://web.archive.org/web/20051013062315/http://www.hitl.washington.edu:80/artoolkit/documentation/hardware.htm , retrieved on Oct. 26, 2020.

Clements-Cortes, et al. "Short-Term Effects of Rhythmic Sensory Stimulation in Alzheimer's Disease: An Exploratory Pilot Study," Journal of Alzheimer's Disease 52 (2016), IOS Press Feb. 9, 2016, pp. 651-660.

Final Office Action mailed Aug. 29, 2018, for U.S. Appl. No. 15/149,456, filed May 9, 2016, 25 pages.

Final Office Action mailed Jan. 17, 2019, for U.S. Appl. No. 15/242,893, filed Aug. 22, 2016, eight pages.

Final Office Action mailed Nov. 1, 2017, for U.S. Appl. No. 15/170,256, filed Jun. 1, 2016, 10 pages.

Final Office Action mailed Sep. 17, 2019, for U.S. Appl. No. 15/149,456, filed May 9, 2016, 24 pages.

Final Office Action mailed Sep. 17, 2019, for U.S. Appl. No. 15/242,893, filed Aug. 22, 2016, eleven pages.

Jacob, R. "Eye Tracking in Advanced Interface Design", Virtual Environments and Advanced Interface Design, Oxford University Press, Inc. (Jun. 1995).

Logbar Inc., "Ring: Shortcut Everything", https://www.kickstarter.com/projects/1761670738/ring-shortcut-everything, Dec. 2014, 22 pages.

Non-Final Office Action mailed Apr. 12, 2017, for U.S. Appl. No. 15/170,256, filed Jun. 1, 2016, seven pages.

Non-Final Office Action mailed Aug. 10, 2017, for U.S. Appl. No. 15/149,456, filed May 9, 2016, seven pages.

Non-Final Office Action mailed Aug. 10, 2017, for U.S. Appl. No. 15/242,893, filed Aug. 22, 2016, seven pages. (43.20).

Non-Final Office Action mailed Jun. 26, 2020, for U.S. Appl. No. 16/670,943, filed Oct. 31, 2019, six pages.

Non-Final Office Action mailed Mar. 29, 2018, for U.S. Appl. No. 15/242,893, filed Aug. 22, 2016, eight pages.

Non-Final Office Action mailed Mar. 30, 2018, for U.S. Appl. No. 15/149,456, filed May 9, 2016, 23 pages.

Non-Final Office Action mailed Mar. 5, 2019, for U.S. Appl. No. 15/149,456, filed May 9, 2016, 24 pages.

Non-Final Office Action mailed May 31, 2019, for U.S. Appl. No. 15/242,893, filed Aug. 22, 2016, eight pages.

Non-Final Office Action mailed Nov. 1, 2018, for U.S. Appl. No. 15/170,256, filed Jun. 1, 2016, 10 pages.

Notice of Allowance mailed Jan. 28, 2021 U.S. Appl. No. 16/670,943, filed Oct. 31, 2019, eight pages.

Notice of Allowance mailed Jan. 31, 2020, for U.S. Appl. No. 15/242,893, filed Aug. 22, 2016, eight pages.

Notice of Allowance mailed Jul. 21, 2022, for U.S. Appl. No. 17/242,550, filed Apr. 28, 2021, seven pages.

Notice of Allowance mailed Jun. 17, 2020, for U.S. Appl. No. 15/149,456, filed May 9, 2016, 8 pages.

Notice of Allowance mailed Jun. 28, 2019, for U.S. Appl. No. 15/170,256, filed Jun. 1, 2016, nine pages.

(56) References Cited

OTHER PUBLICATIONS

Notice of Allowance mailed Oct. 19, 2020, for U.S. Appl. No. 16/670,943, filed Oct. 31, 2019, eight pages.
Osterhout. (Oct. 14, 2015). "Commercial and Social Implications", 12 pages.
PCT/2016/064441, Application Serial No. PCT/US2016/064441, international Search Report and Written Opinion mailed Feb. 7, 2017, Osterhout Group, Inc., 11 pages.
PCT/US2015/059264, International Application Serial No. PCT/US2015/059264, International Preliminary report on Patentability and Written Opinion mailed May 18, 2017, Osterhout Group, Inc., eight pages.
PCT/US2016/038008, International Application Serial No. PCT/US2016/038008, International Preliminary Report on Patentability mailed on Dec. 28, 2017, Osterhout Group, Inc. six pages.
PCT/US2016/038008, International Application Serial No. PCT/US2016/038008, International Search Report and Written Opinion mailed on Oct. 27, 2016, Osterhout Group, Inc. eight pages.
PCTUS2017046701, "Application Serial No. PCTUS2017046701, International Search Report and the Written Opinion mailed Nov. 6, 2017", 7 pages.
Rolland, J. et al., "High-resolution inset head-mounted display", Optical Society of America, vol. 37, No. 19, Applied Optics, (Jul. 1, 1998).
Schedwill, "Bidirectional OLED Microdisplay", Fraunhofer Research Institution for Organics, Materials and Electronic Device COMEDD, Apr. 11, 2014, 2 pages.
Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.
Vogel, et al., "Data glasses controlled by eye movements", Information and communication, Fraunhofer-Gesellschaft, Sep. 22, 2013, 2 pages.
Walton, Z. "Wear This Smartphone Controller on Your Finger," http://www.webpronews.com/wear-this-smartphone-controller-on-your-finger-2012-06, 5 pages.
Ye, Hui et al., "High Quality Voice Morphing", Cambridge University Engineering Department Trumpington Street, Cambridge, England, CB2 1PZ, 2004, I-9-I-12.
Yoshida, A. et al., "Design and Applications of a High Resolution Insert Head Mounted Display", (Jun. 1994).
"Audio Spotlight," by Holosonics, http://www.holosonics.com, accessed Jul. 3, 2014, three pages.
"Genius Ring Mice," http://www.geniusnet.com/Genius/wSite/productCompare/compare.jsp, Dec. 23, 2014, one page.
"Meet Nod, the Bluetooth Ring That Wants to Replace your Mouse," http://www.pcmag.com/article2/0.2817.2457238.00.asp, Apr. 29, 2014, 6 pages.
"Sound from Ultrasound," Wikipedia entry, http://en.m.wikipedia.org/wiki/Sound_from_ultrasound, accessed Jul. 3, 2014, 13 pages.
Notice of Allowance mailed Dec. 13, 2022, for U.S. Appl. No. 17/894,926, filed Aug. 24, 2022, eight pages.
Notice of Allowance mailed Jun. 22, 2023, for U.S. Appl. No. 18/153,957, filed Jan. 12, 2023, eight pages.
Notice of Allowance mailed Feb. 15, 2024, for U.S. Appl. No. 18/355,153, filed Jul. 19, 2023, eight pages.
Notice of Allowance mailed Oct. 1, 2024, for U.S. Appl. No. 18/607,238, filed Mar. 15, 2024, eight pages.

* cited by examiner

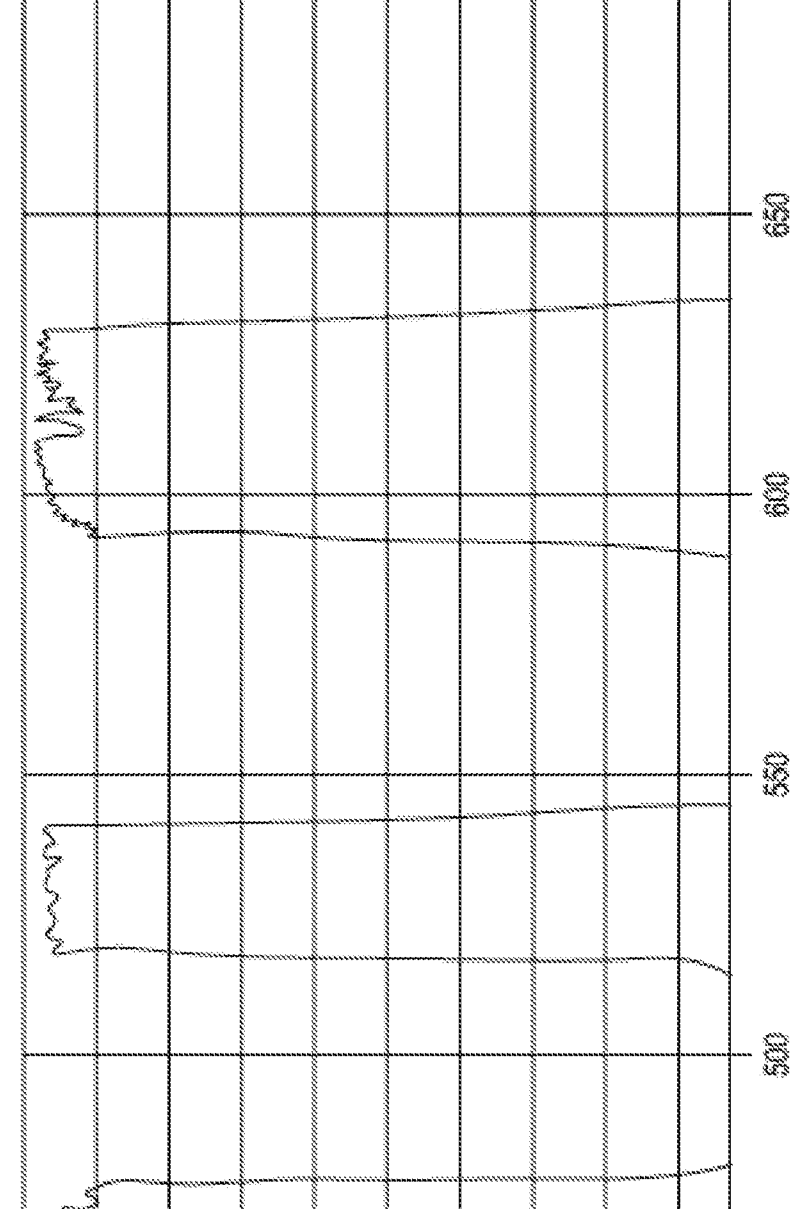
Figure 10b

11704a
11704b
11704c
11702
11702
11702

MODULAR SYSTEMS FOR HEAD-WORN COMPUTERS

REFERENCE TO RELATED APPLICATIONS

This application is a continuation of U.S. Non-Provisional application Ser. No. 18/607,238, which is a continuation of U.S. Non-Provisional application Ser. No. 18/355,153, filed Jul. 19, 2023, now U.S. Pat. No. 11,772,238, issued May 7, 2024, which is a continuation of U.S. Non-Provisional application Ser. No. 18/153,957, filed Jan. 12, 2023, now U.S. Pat. No. 11,754,845, issued Sep. 12, 2023, which is a continuation of U.S. Non-Provisional application Ser. No. 17/894,926, filed Aug. 24, 2022, now U.S. Pat. No. 11,586,048, issued Feb. 21, 2023, which is a continuation of U.S. Non-Provisional application Ser. No. 17/242,550, filed on Apr. 28, 2021, now U.S. Pat. No. 11,460,708, issued Oct. 4, 2022, which is a continuation of U.S. Non-Provisional application Ser. No. 16/670,943, filed on Oct. 31, 2019, now U.S. Pat. No. 11,022,808, issued on Jun. 1, 2021, which is a continuation of U.S. Non-Provisional application Ser. No. 15/170,256, filed on Jun. 1, 2016, now U.S. Pat. No. 10,466,491, issued on Nov. 5, 2019, the contents of which are incorporated by reference herein in their entirety.

FIELD OF THE INVENTION

This disclosure relates to head-worn computer systems with modular attachment systems for the expansion of capabilities.

DESCRIPTION OF RELATED ART

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to methods and systems for modular attachment systems for the expansion of capabilities.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIGS. 9, 10*a*, 10*b* and 11 illustrate light sources and filters in accordance with the principles of the present disclosure.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, compass heading, head tilt, where the user is looking and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
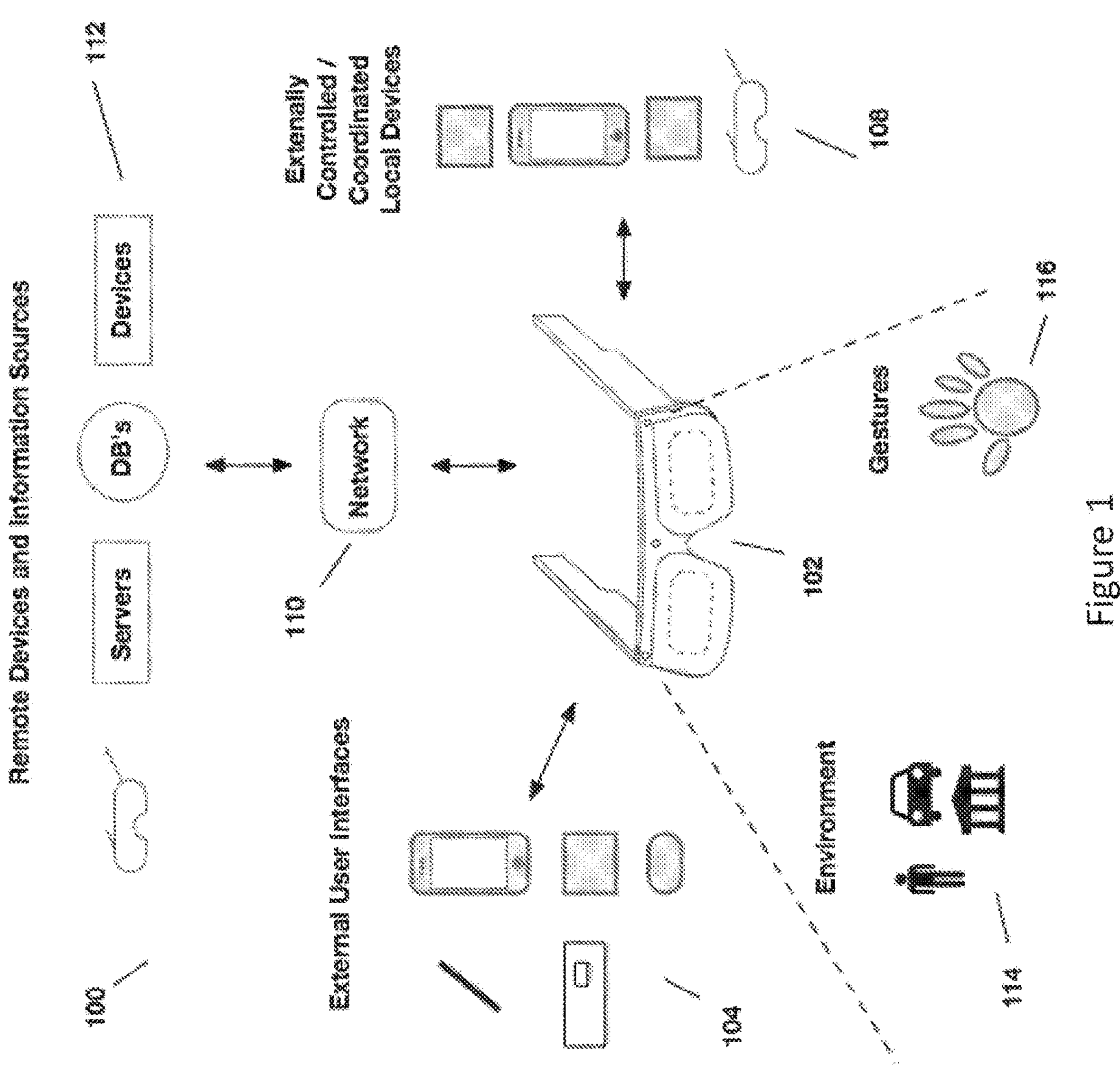
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyper-spectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI (e.g. air mouse, finger mounted mouse), such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
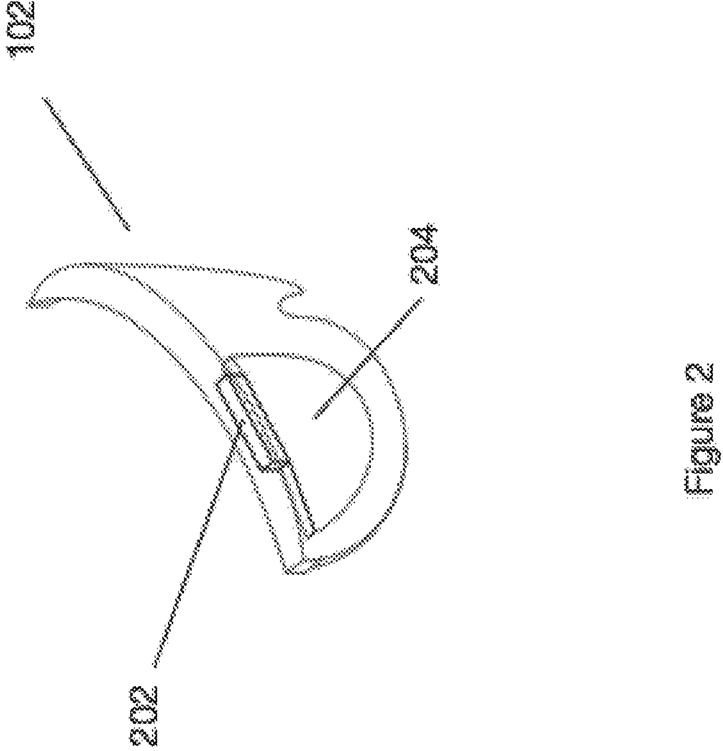
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, FLCoS, DLP, OLED, backlit LCD, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3:
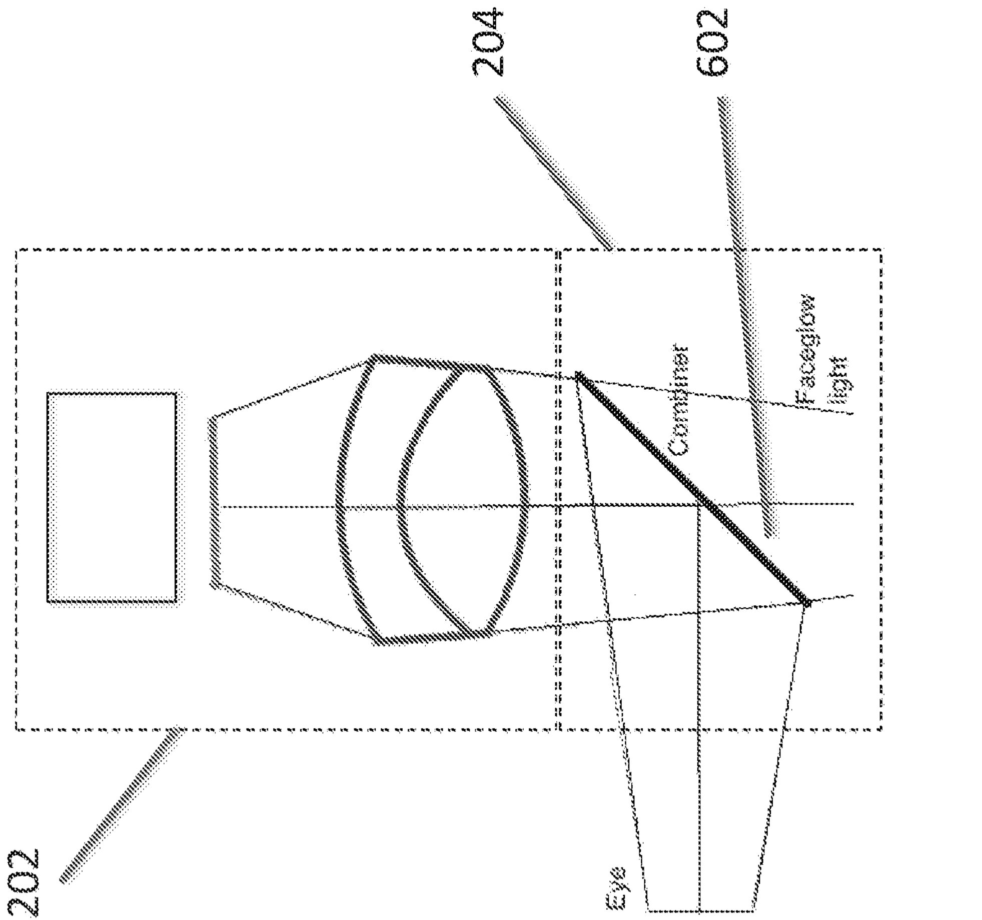
FIG. 3 illustrates upper and lower optical modules in accordance with the principles of the present disclosure.

FIG. 3 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided in the image light. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the environmental surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided in the image light by the light source and substantially transmit the remaining wavelengths in the visible spectrum. For example, in the case where red, green and blue light is provided by the light source in the upper optics to enable full color images to be provided to the user, the notch mirror is a tristimulus notch mirror wherein the multilayer coating is designed to substantially reflect narrow bands of red, green and blue light that are matched to the what is provided by the light source and the remaining visible wavelengths are substantially transmitted through the coating to enable a view of the environment through the combiner. In another example where monochrome images are provided to the user, the notch mirror is designed to reflect a single narrow band of light that is matched to the wavelength range of the image light provided by the upper optics while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect image light associated with pixels, to the eye because of the match between the reflective wavelengths of the notch mirror and the wavelengths or color of the image light, and the wearer would simultaneously be able to see with high clarity the environmental surroundings. The transparency between the user's eye and the surrounding may be approximately 80% when using the tristimulus notch mirror. In addition, the image provided with the notch mirror combiner can provide higher contrast images than the holographic mirror combiner because the notch mirror acts in a purely reflective manner compared to the holographic mirror which operates through diffraction, and as such the notch mirror is subject to less scattering of the imaging light by the combiner. In another embodiment, the combiner element 602 may include a simple partial mirror that reflects a portion (e.g. 50%) of all wavelengths of light in the visible.

Image light can escape through the combiner 602 and may produce face glow from the optics shown in FIG. 3, as the escaping image light is generally directed downward onto the check of the user. When using a holographic mirror combiner or a tristimulus notch mirror combiner, the escaping light can be trapped to avoid face glow. In embodiments, if the image light is polarized before the combiner, a linear polarizer can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film such as a privacy filter can be used to absorb the escaping image light while providing the user with a see-thru view of the environment. In this case, the absorbance or transmittance of the microlouvered film is dependent on the angle of the light. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

Figure 4:
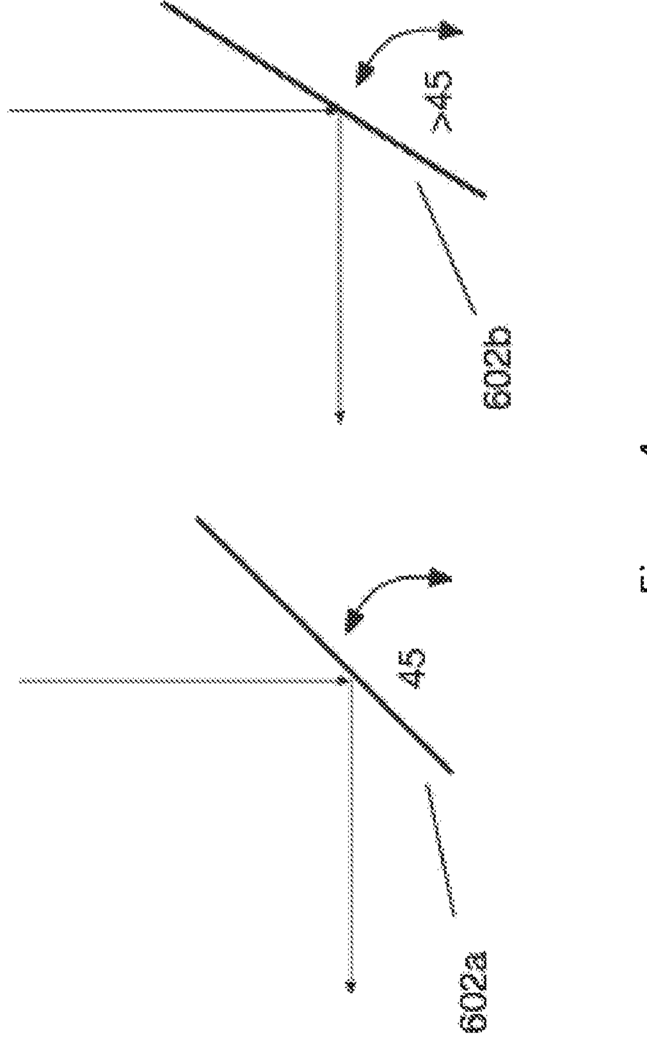
FIG. 4 illustrates angles of combiner elements in accordance with the principles of the present disclosure.

FIG. 4 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602*a*, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602*a* requires that the incident image light be presented to the combiner 602*a* at a different angle which positions the upper optical module 202 to the left of the combiner as shown in FIG. 4. In contrast, a holographic mirror combiner, included in embodiments, can be made such that light is reflected at a different angle from the angle that the light is incident onto the holographic mirrored surface. This allows freedom to select the angle of the combiner element 602*b* independent of the angle of the incident image light and the angle of the light reflected into the wearer's eye. In embodiments, the angle of the combiner element 602*b* is greater than 45 degrees (shown in FIG. 4) as this allows a more laterally compact HWC design. The increased angle of the combiner element 602*b* decreases the front to back width of the lower optical module 204 and may allow for a thinner HWC display (i.e. the furthest element from the wearer's eye can be closer to the wearer's face).

Figure 5:
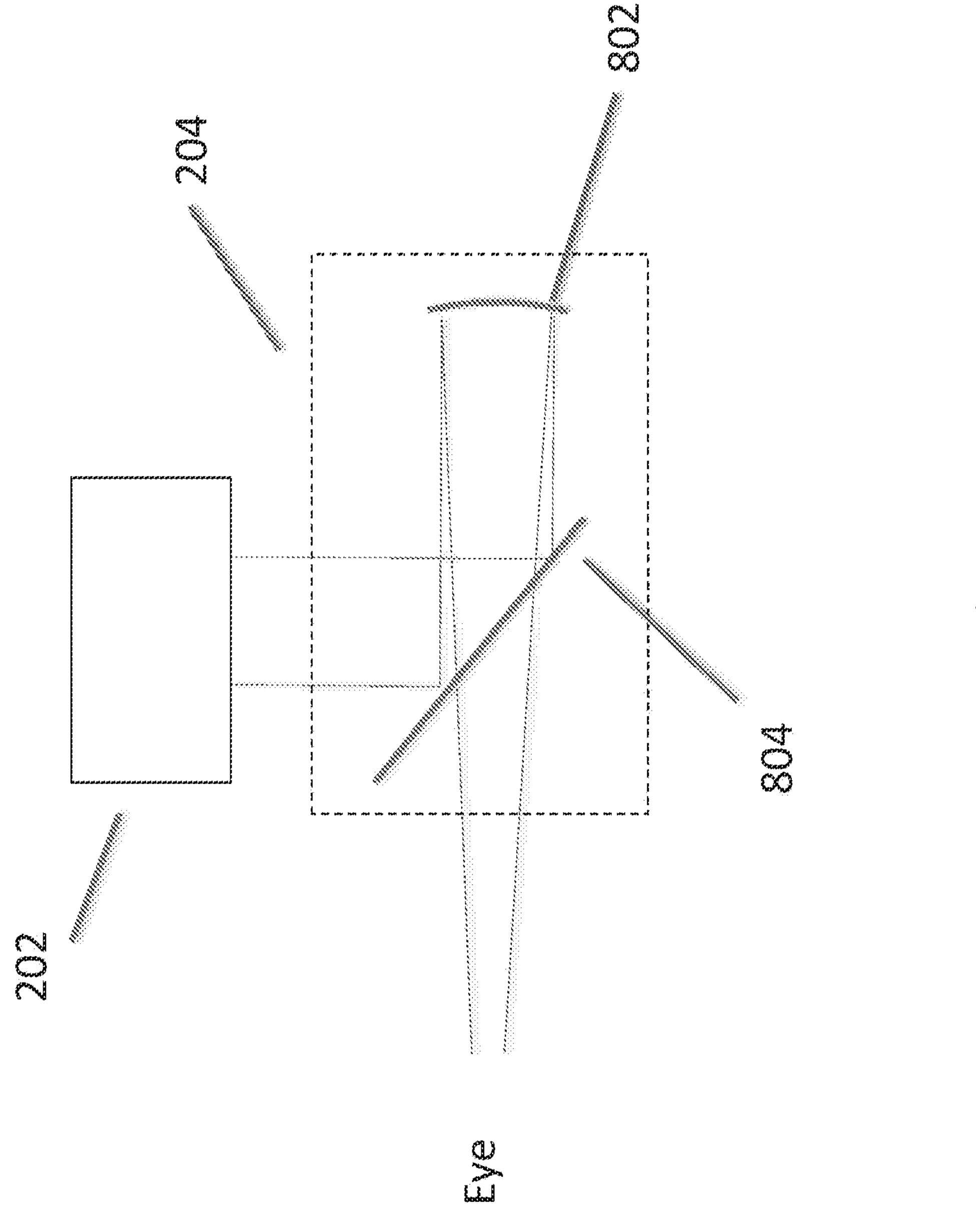
FIG. 5 illustrates upper and lower optical modules in accordance with the principles of the present disclosure.

FIG. 5 illustrates another embodiment of a lower optical module 204. In this embodiment, polarized or unpolarized image light provided by the upper optical module 202, is directed into the lower optical module 204. The image light reflects off a partial mirror 804 (e.g. polarized mirror, notch mirror, holographic mirror, etc.) and is directed toward a curved partially reflective mirror 802. The curved partial mirror 802 then reflects the image light back towards the user's eye, which passes through the partial mirror 804. The user can also see through the partial mirror 804 and the curved partial mirror 802 to see the surrounding environment. As a result, the user perceives a combined image comprised of the displayed image light overlaid onto the see-thru view of the environment. In a preferred embodiment, the partial mirror 804 and the curved partial mirror 802 are both non-polarizing so that the transmitted light from the surrounding environment is unpolarized so that rainbow interference patterns are eliminated when looking at polarized light in the environment such as provided by a computer monitor or in the reflected light from a lake.

While many of the embodiments of the present disclosure have been referred to as upper and lower modules containing certain optical components, it should be understood that the image light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 6:
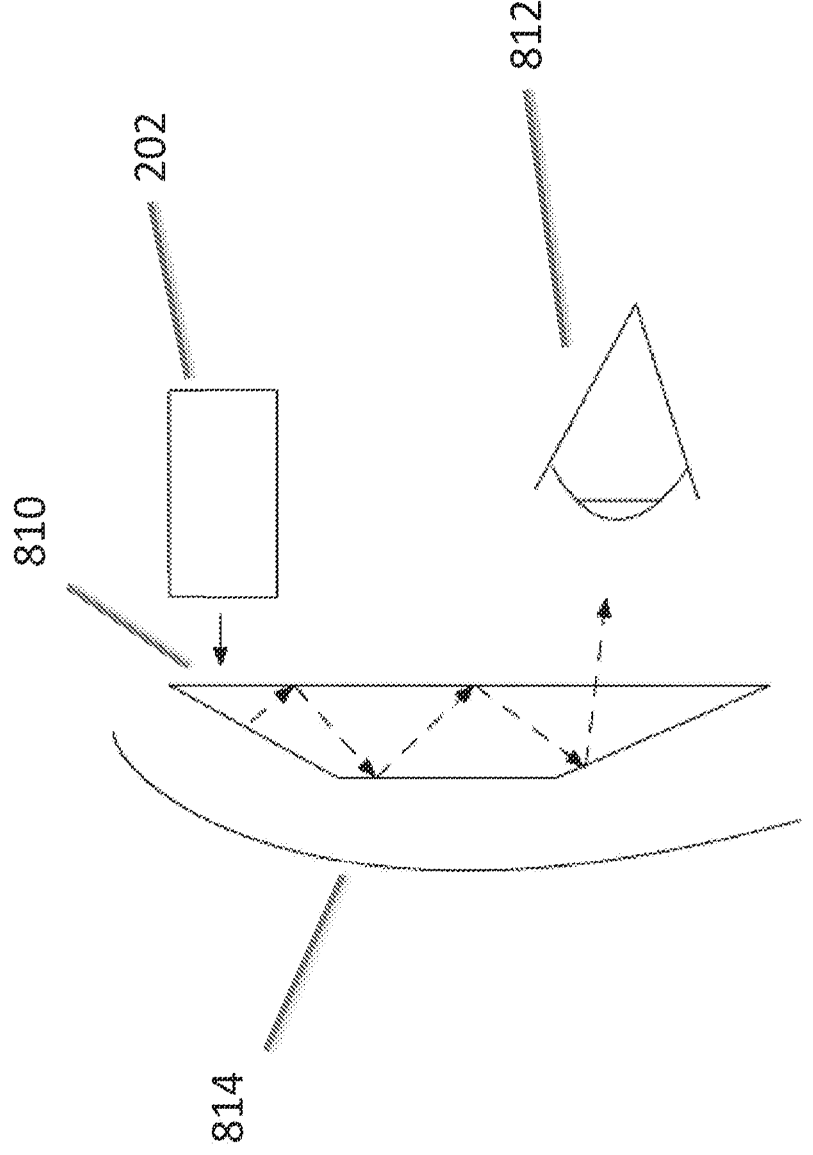
FIG. 6 illustrates upper and lower optical modules in accordance with the principles of the present disclosure.

FIG. 6 illustrates an embodiment of the present disclosure where the upper optical module 202 is arranged to direct image light into a total internal reflection (TIR) waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 in a direction toward the wearer's eye. In this embodiment, an outer shield 814 may be positioned in front of the TIR waveguide 810.

Figure 7:
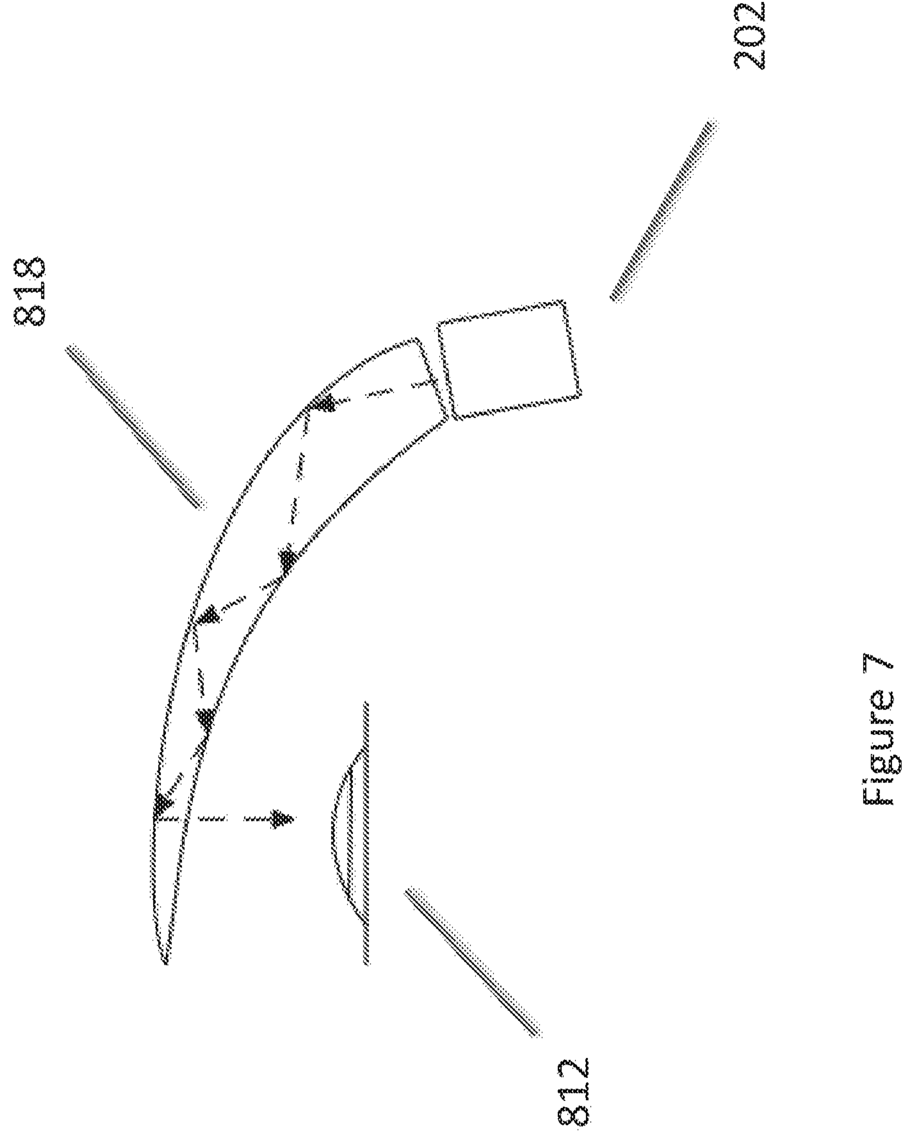
FIG. 7 illustrates upper and lower optical modules in accordance with the principles of the present disclosure.

FIG. 7 illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 818 in a direction toward the wearer's eye 812.

Figure 8:
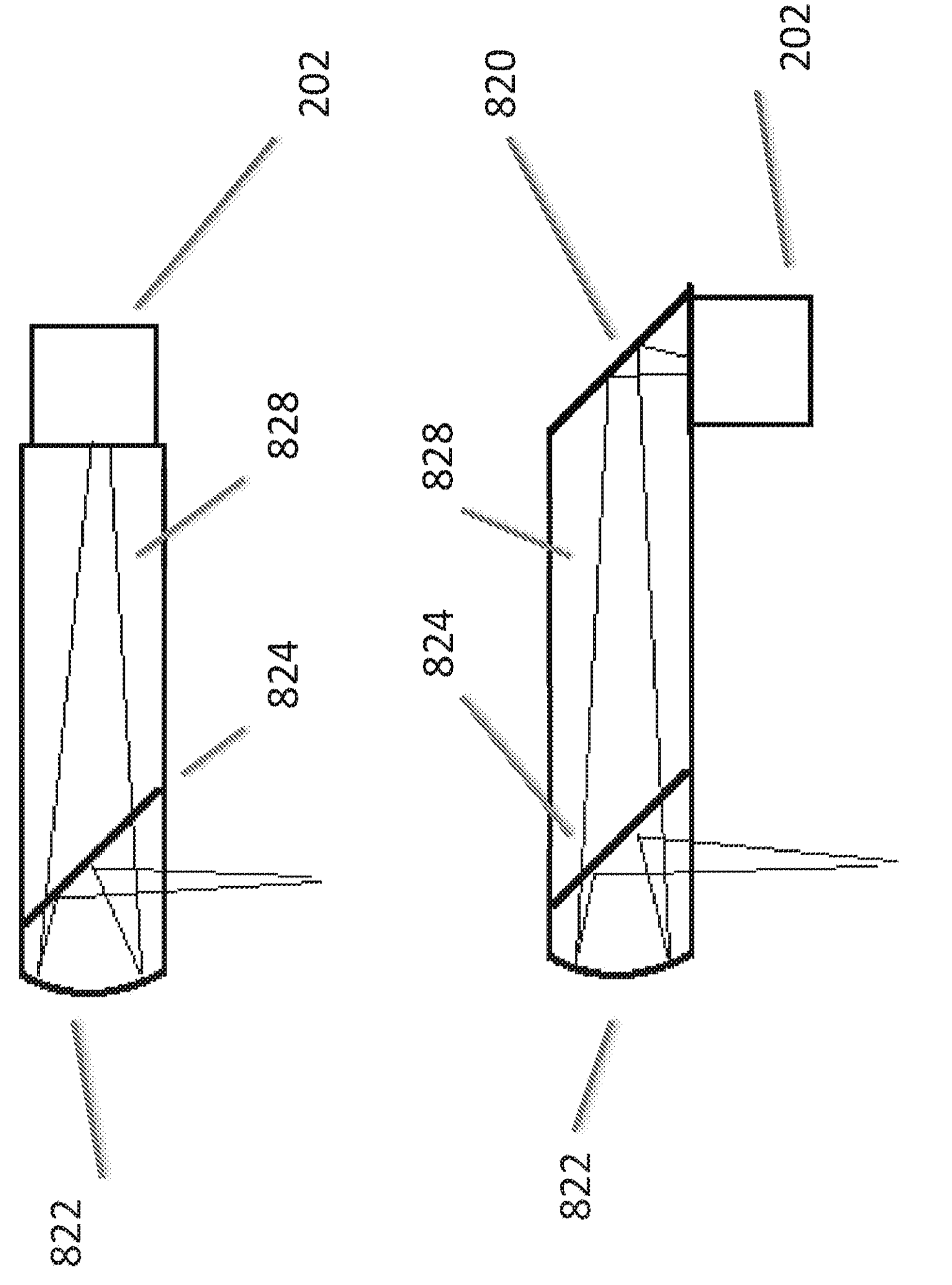
FIG. 8 illustrates upper and lower optical modules in accordance with the principles of the present disclosure.

FIG. 8 illustrates yet further embodiments of the present disclosure where an upper optical module 202 directs polarized image light into an optical guide 828 where the image light passes through a polarized reflector 824, changes polarization state upon reflection of the optical element 822 which includes a¼ wave film for example and then is reflected by the polarized reflector 824 towards the wearer's eye, due to the change in polarization of the image light. The upper optical module 202 may be positioned behind the optical guide 828 wherein the image light is directed toward a mirror 820 that reflects the image light along the optical guide 828 and towards the polarized reflector 824. Alternatively, in other embodiments, the upper optical module 202 may direct the image light directly along the optical guide 828 and towards the polarized reflector 824. It should be understood that the present disclosure comprises other optical arrangements intended to direct image light into the wearer's eye.

Figure 9:
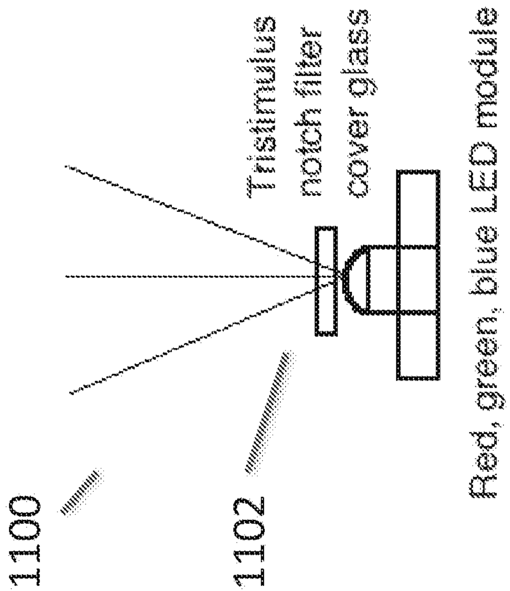
Figure 10A:
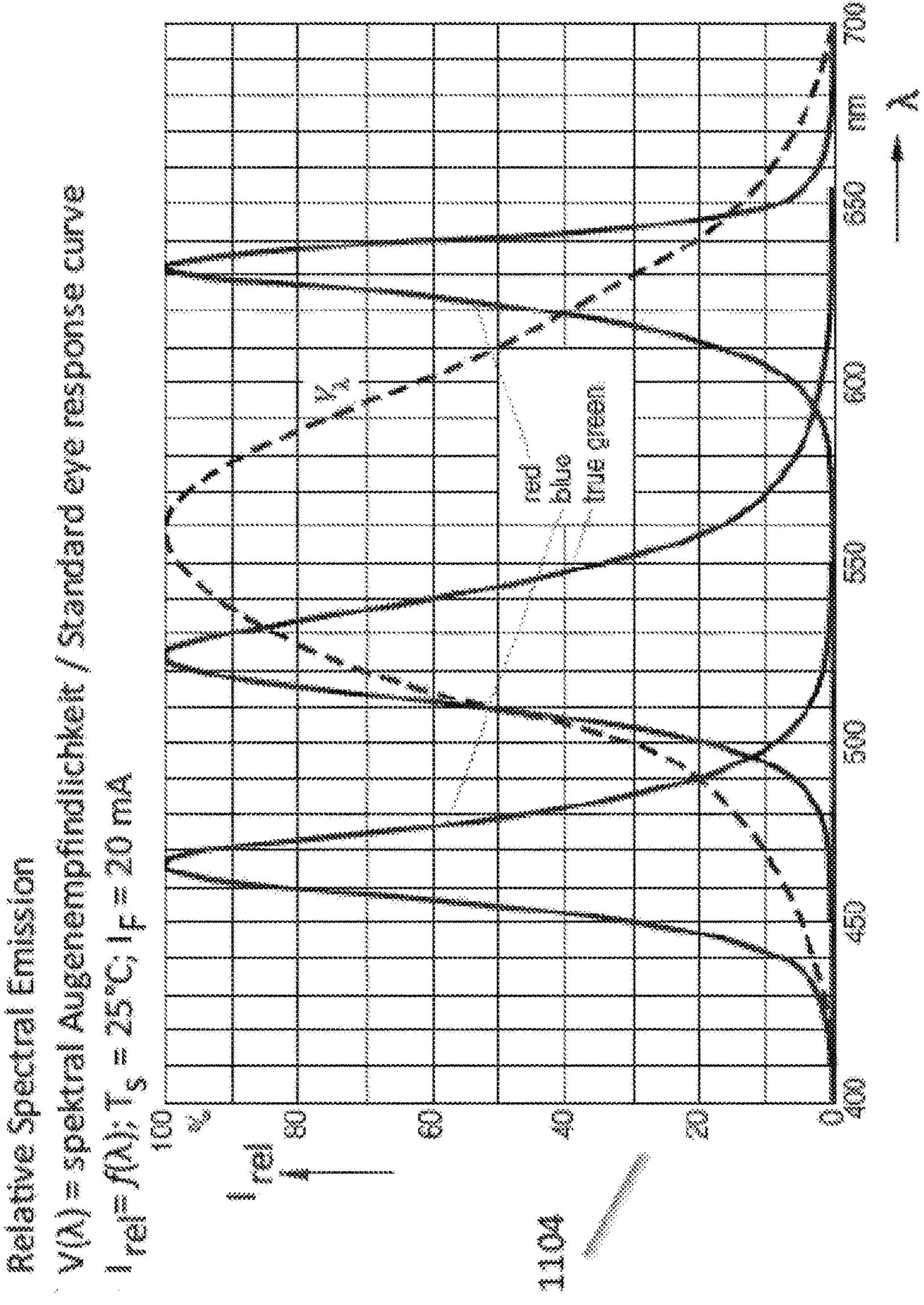
Figure 11:
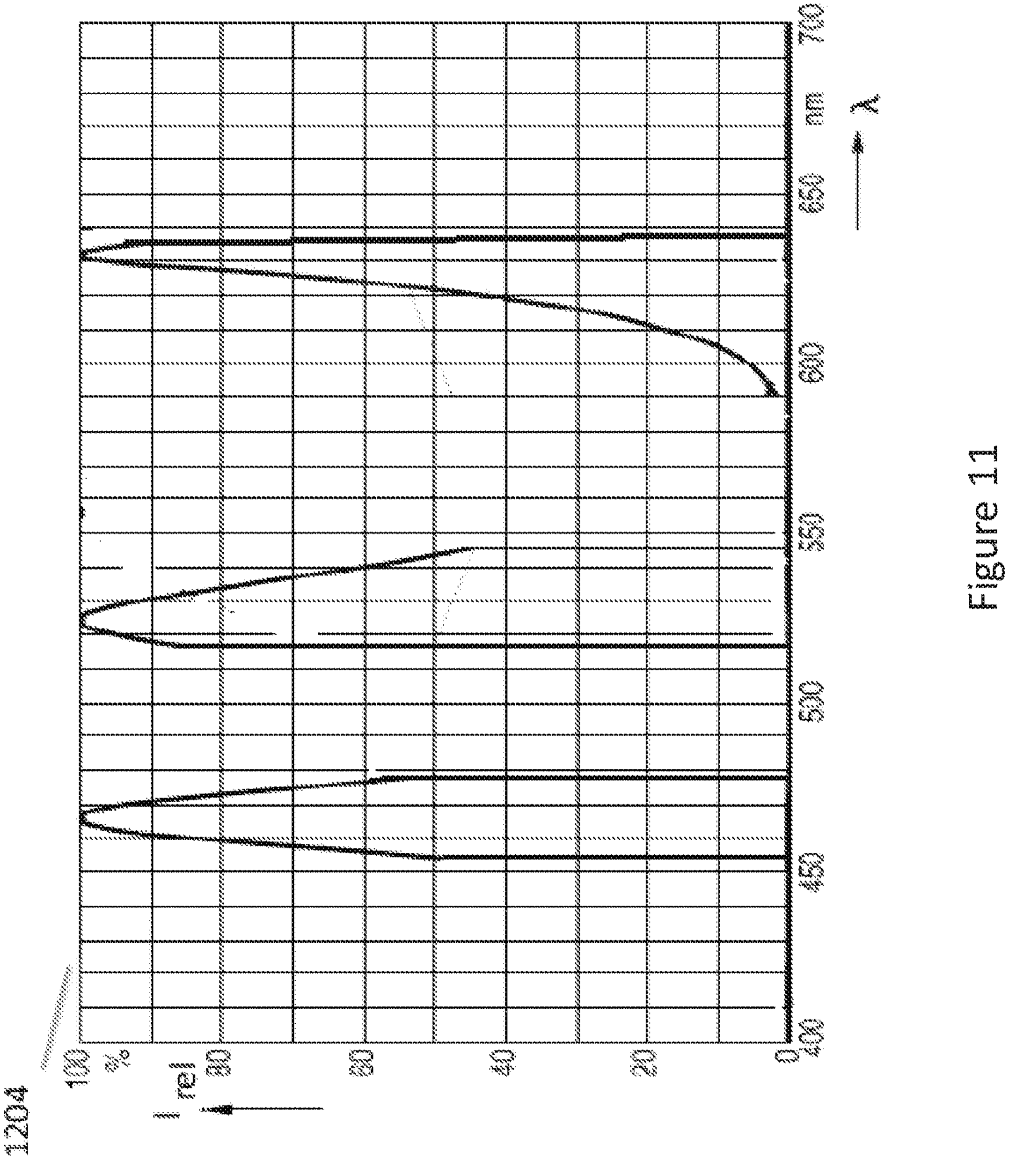

FIG. 9 illustrates a light source 1100 that may be used in association with the upper optics module 202. In embodiments, the light source 1100 may provide light to a backlighting optical system that is associated with the light source 1100 and which serves to homogenize the light and thereby provide uniform illuminating light to an image source in the upper optics. In embodiments, the light source 1100 includes a tristimulus notch filter 1102. The tristimulus notch filter 1102 has narrow band pass filters for three wavelengths, as indicated in FIG. 10*b* in a transmission graph 1108. The graph shown in FIG. 10*a*, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11 as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a matched combiner 602 that includes a holographic mirror or tristimulus notch mirror that substantially reflects the narrow bands of image light toward the wearer's eye with a reduced amount of image light that does not get reflected by the combiner, thereby improving efficiency of the head-worn computer (HWC) or head-mounted display (HMD) and reducing escaping light that can cause faceglow.

Figure 12A:
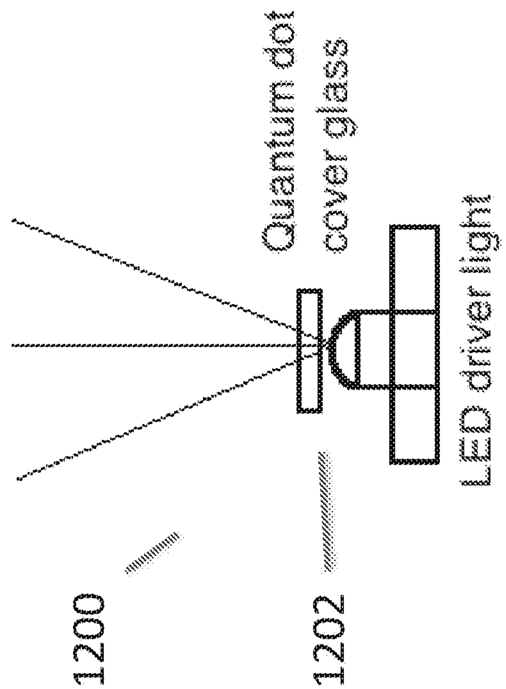
FIGS. 12*a* to 12*c* illustrate light sources and quantum dot systems in accordance with the principles of the present disclosure.
Figure 12B:
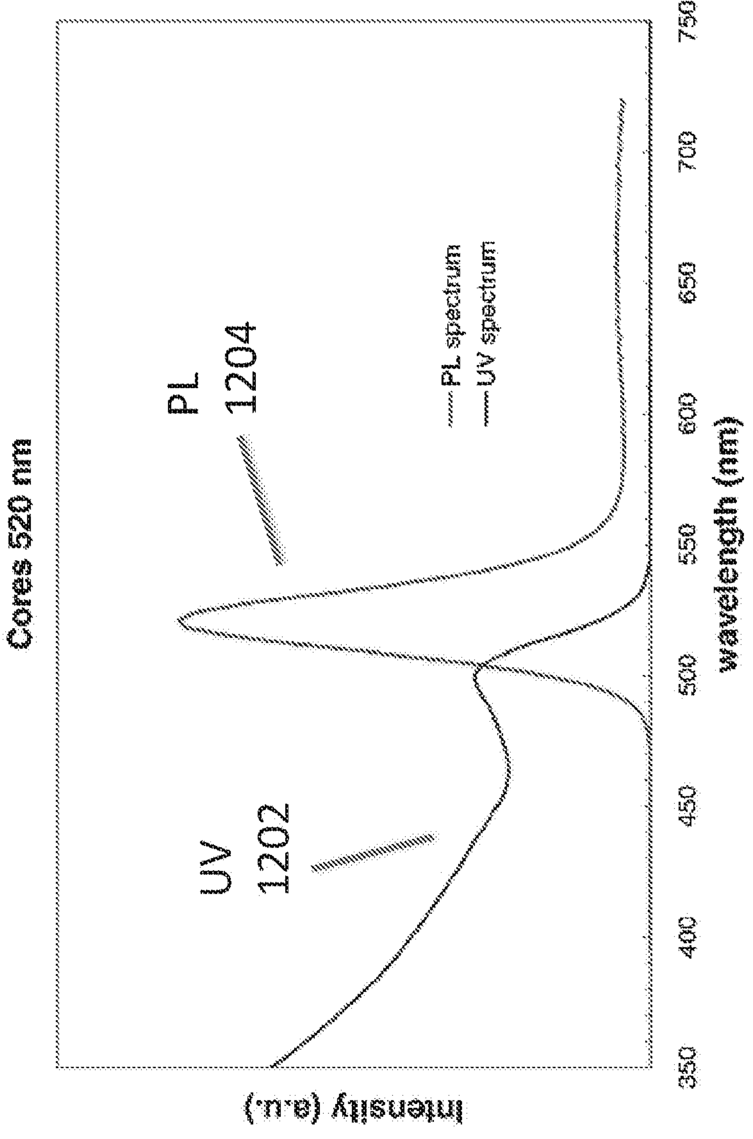
Figure 12C:
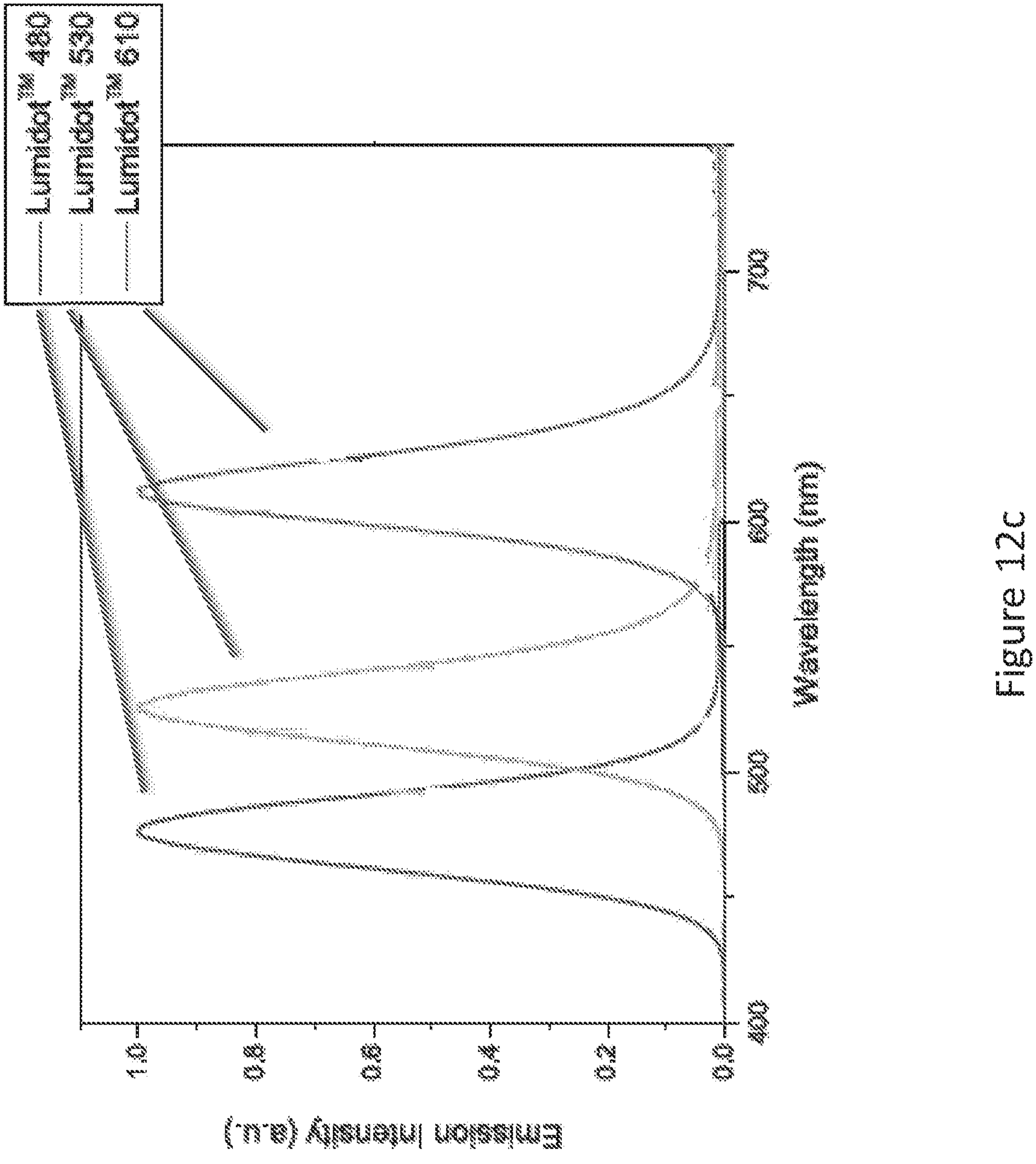

FIG. 12*a* illustrates another light source 1200 that may be used in association with the upper optics module 202. In embodiments, the light source 1200 may provide light to a backlighting optical system that homogenizes the light prior to illuminating the image source in the upper optics as described previously herein. In embodiments, the light source 1200 includes a quantum dot cover glass 1202. Where the quantum dots absorb light of a shorter wavelength and emit light of a longer wavelength (FIG. 12*b* shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12*c* where three different quantum dots are used. In embodiments, the LED driver light emits UV light, deep blue or blue light. For sequential illumination of different colors, multiple light sources 1200 would be used where each light source 1200 would include a quantum dot cover glass 1202 with at least one type of quantum dot selected to emit at one of each of the desired colors. The light source 1100 can be used in connection with a combiner 602 with a holographic mirror or tristimulus notch mirror to provide narrow bands of image light that are reflected toward the wearer's eye with less wasted image light that does not get reflected.

Another aspect of the present disclosure relates to the generation of peripheral image lighting effects for a person wearing a HWC. In embodiments, a solid state lighting system (e.g. LED, OLED, etc), or other lighting system, may be included inside the optical elements of an lower optical module 204. The solid state lighting system may be arranged such that lighting effects outside of a field of view (FOV) associated with displayed digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
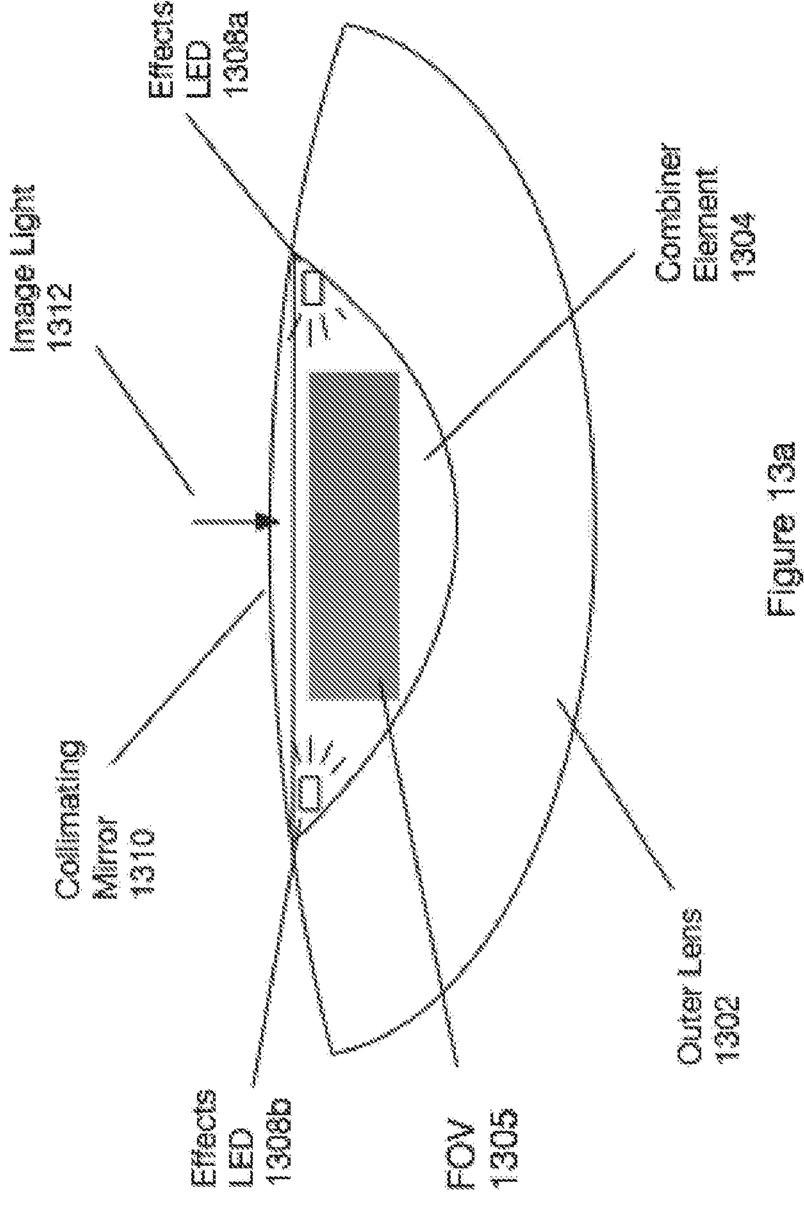
FIGS. 13*a* to 13*c* illustrate peripheral lighting systems in accordance with the principles of the present disclosure.

FIG. 13*a* illustrates optical components of a lower optical module 204 together with an outer lens 1302. FIG. 13*a* also shows an embodiment including effects LED's 1308*a* and 1308*b*. FIG. 13*a* illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13*a*) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, the image light may or may not be polarized and the see-through view of the surrounding environment is preferably non-polarized to provide a view of the surrounding environment that does not include rainbow interference patterns if the light from the surrounding environment is polarized such as from a computer monitor or reflections from a lake. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13*a*, the effects LEDs 1308*a* and 1308*b* are positioned at the sides of the combiner element 1304 and the outer lens 1302 and/or the collimating mirror 1310. In embodiments, the effects LEDs 1308*a* are positioned within the confines defined by the combiner element 1304 and the outer lens 1302 and/or the collimating mirror. The effects LEDs 1308*a* and 1308*b* are also positioned outside of the FOV 1305 associated with the displayed digital content. In this arrangement, the effects LEDs 1308*a* and 1308*b* can provide lighting effects within the lower optical module outside of the FOV 1305. In embodiments the light emitted from the effects LEDs 1308*a* and 1308*b* may be polarized and the outer lens 1302 may include a polarizer such that the light from the effects LEDs 1308*a* and 1308*b* will pass through the combiner element

1304 toward the wearer's eye and will be absorbed by the outer lens 1302. This arrangement provides peripheral lighting effects to the wearer in a more private setting by not transmitting the lighting effects through the front of the HWC into the surrounding environment. However, in other embodiments, the effects LEDs 1308*a* and 1308*b* may be non-polarized so the lighting effects provided are made to be purposefully viewable by others in the environment for entertainment such as giving the effect of the wearer's eye glowing in correspondence to the image content being viewed by the wearer.

Figure 13B:
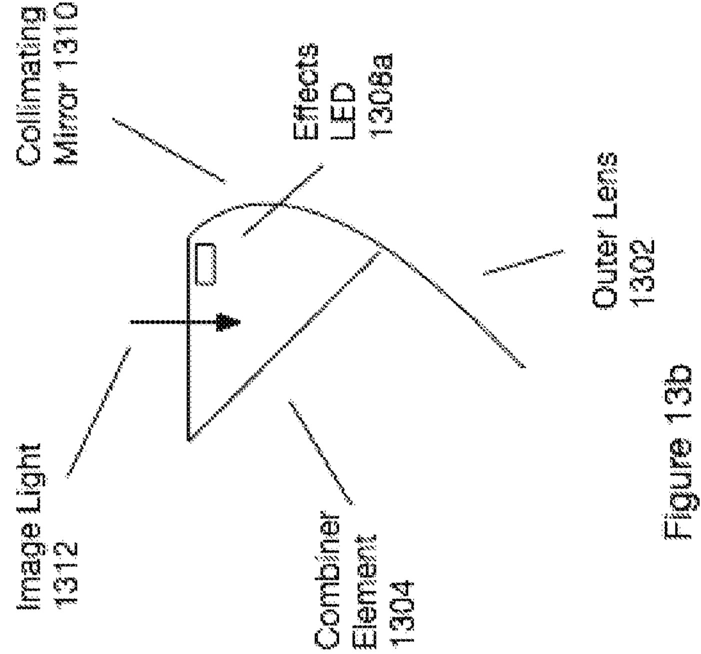

FIG. 13*b* illustrates a cross section of the embodiment described in connection with FIG. 13*a*. As illustrated, the effects LED 1308*a* is located in the upper-front area inside of the optical components of the lower optical module. It should be understood that the effects LED 1308*a* position in the described embodiments is only illustrative and alternate placements are encompassed by the present disclosure. Additionally, in embodiments, there may be one or more effects LEDs 1308*a* in each of the two sides of HWC to provide peripheral lighting effects near one or both eyes of the wearer.

Figure 13C:
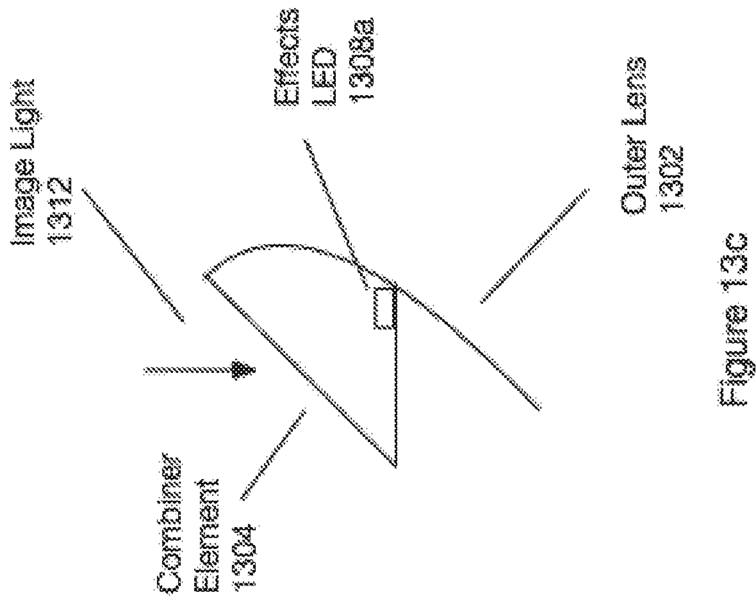

FIG. 13*c* illustrates an embodiment where the combiner element 1304 is angled away from the eye at the top and towards the eye at the bottom (e.g. in accordance with the holographic or notch filter embodiments described herein). In this embodiment, the effects LED 1308*a* may be located on the outer lens 1302 side of the combiner element 1304 to provide a concealed appearance of the lighting effects. As with other embodiments, the effects LED 1308*a* of FIG. 13*c* may include a polarizer such that the emitted light can pass through a polarized element associated with the combiner element 1304 and be blocked by a polarized element associated with the outer lens 1302. Alternatively the effects LED 13087*a* can be configured such that at least a portion of the light is reflected away from the wearer's eye so that it is visible to people in the surrounding environment. This can be accomplished for example by using a combiner 1304 that is a simple partial mirror so that a portion of the image light 1312 is reflected toward the wearer's eye and a first portion of the light from the effects LED 13087*a* is transmitted toward the wearer's eye and a second portion of the light from the effects LED 1308*a* is reflected outward toward the surrounding environment.

FIGS. 14*a*, 14*b*, 14*c* and 14*d* show illustrations of a HWC that includes eye covers 1402 to restrict loss of image light to the surrounding environment and to restrict the ingress of stray light from the environment. Where the eye covers 1402 can be removably attached to the HWC with magnets 1404. Another aspect of the present disclosure relates to automatically configuring the lighting system(s) used in the HWC 102. In embodiments, the display lighting and/or effects lighting, as described herein, may be controlled in a manner suitable for when an eye cover 1402 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1402 and then the HWC may go into a low light mode. The low light mode may, in some embodiments, only go into a low light mode when the eye cover 1402 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1402 are attached or removed from the HWC. In embodiments, when the eye cover(s) 1402 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Another aspect of the present disclosure relates to a system adapted to quickly convert from a see-through system to a non-see-through or very low transmission see-through system for a more immersive user experience. The conversion system may include replaceable lenses, an eye cover, and optics adapted to provide user experiences in both modes. The outer lenses, for example, may be 'blacked-out' with an opaque cover 1412 to provide an experience where all of the user's attention is dedicated to the digital content and then the outer lenses may be switched out for high see-through lenses so the digital content is augmenting the user's view of the surrounding environment. Another aspect of the disclosure relates to low transmission outer lenses that permit the user to see through the outer lenses but remain dark enough to maintain most of the user's attention on the digital content. The slight see-through can provide the user with a visual connection to the surrounding environment and this can reduce or eliminate nausea and other problems associated with total removal of the surrounding view when viewing digital content.

Figure 14A:
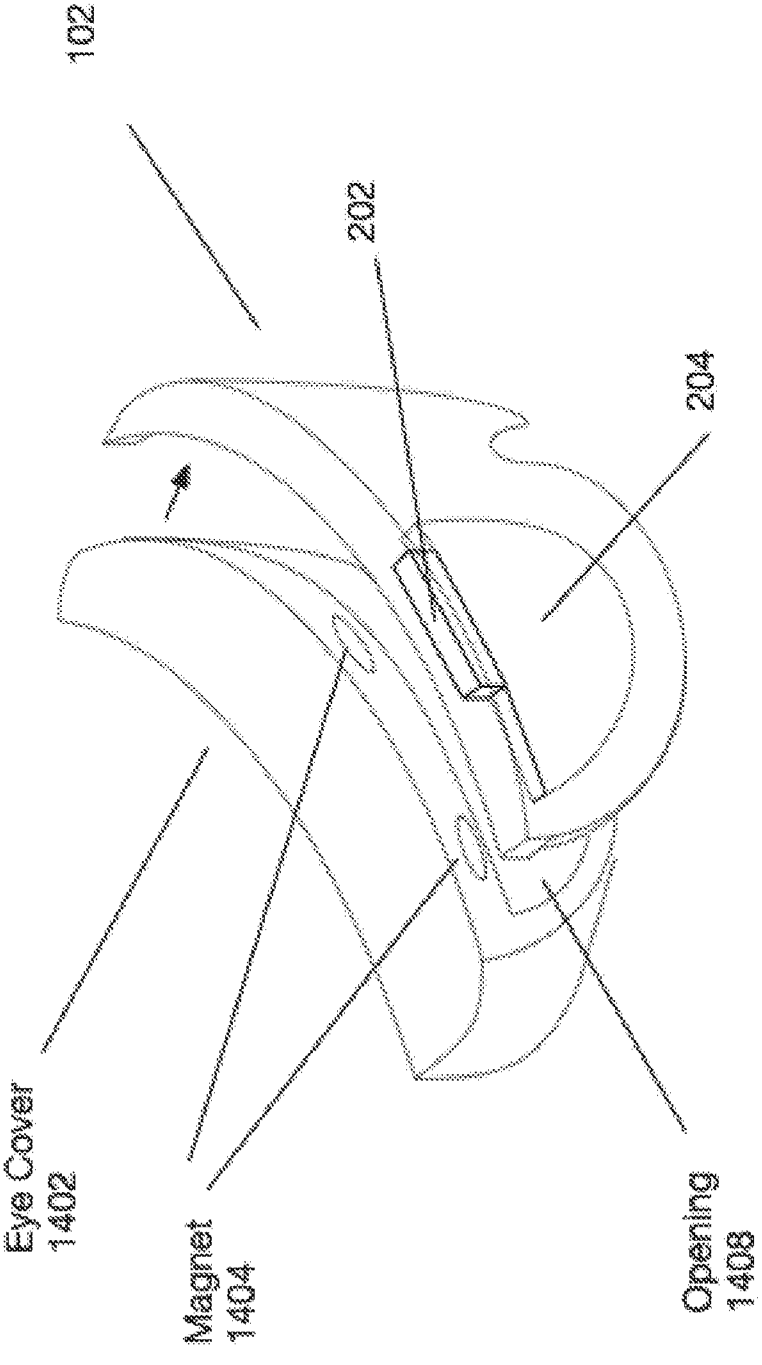
FIGS. 14*a* to 14*h* illustrate light suppression systems in accordance with the principles of the present disclosure.
Figure 14B:
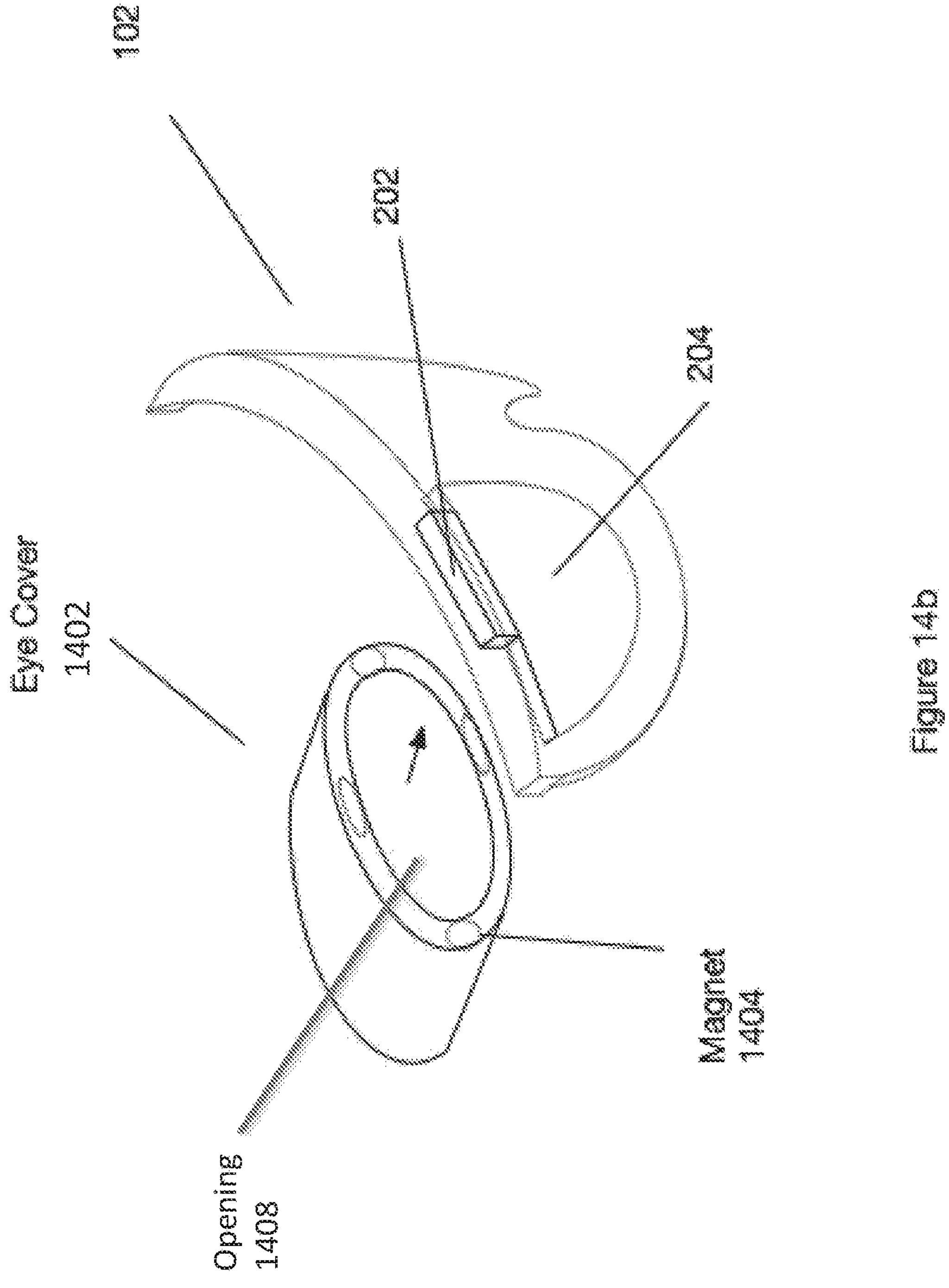
Figure 14C:
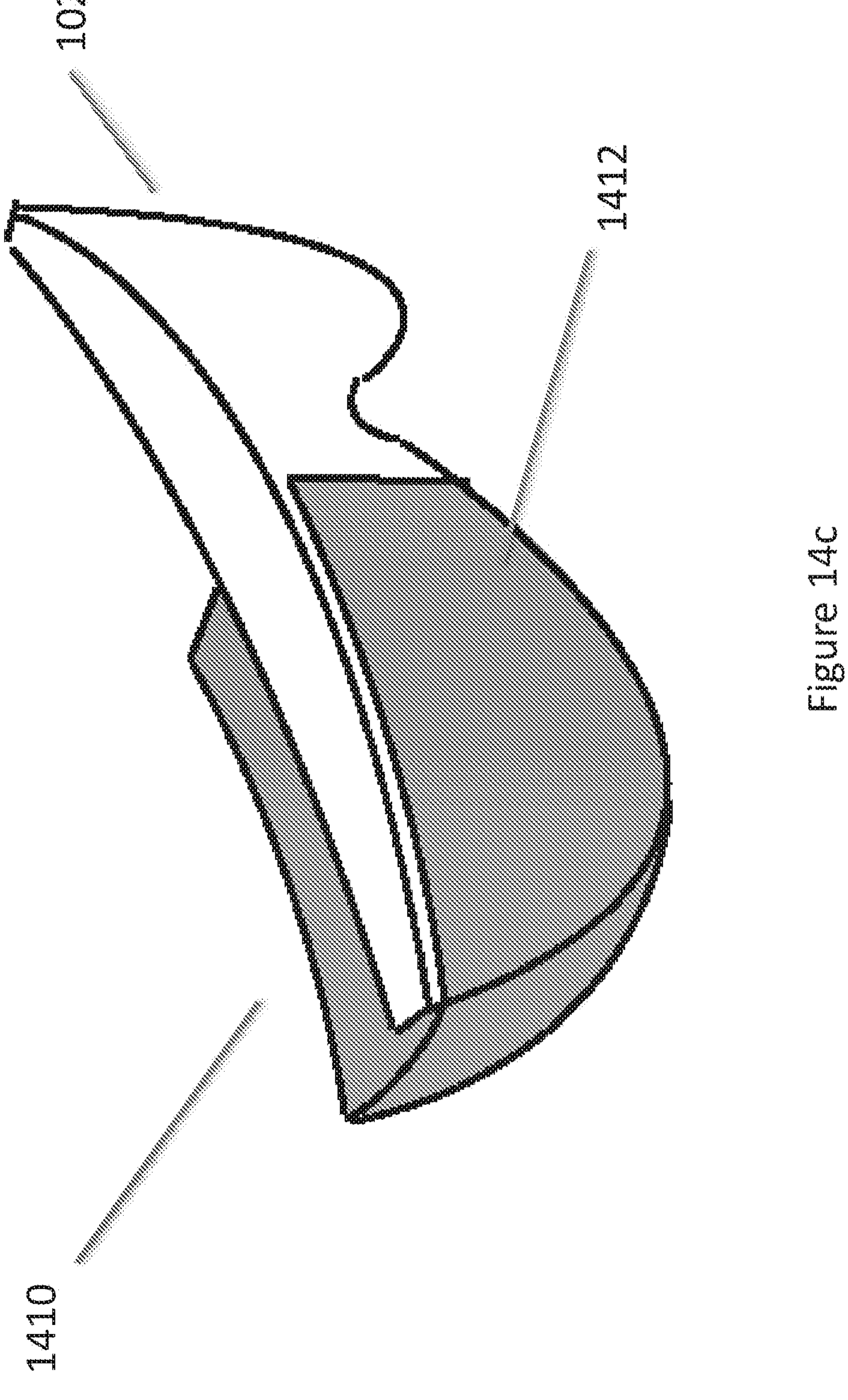
Figure 14D:
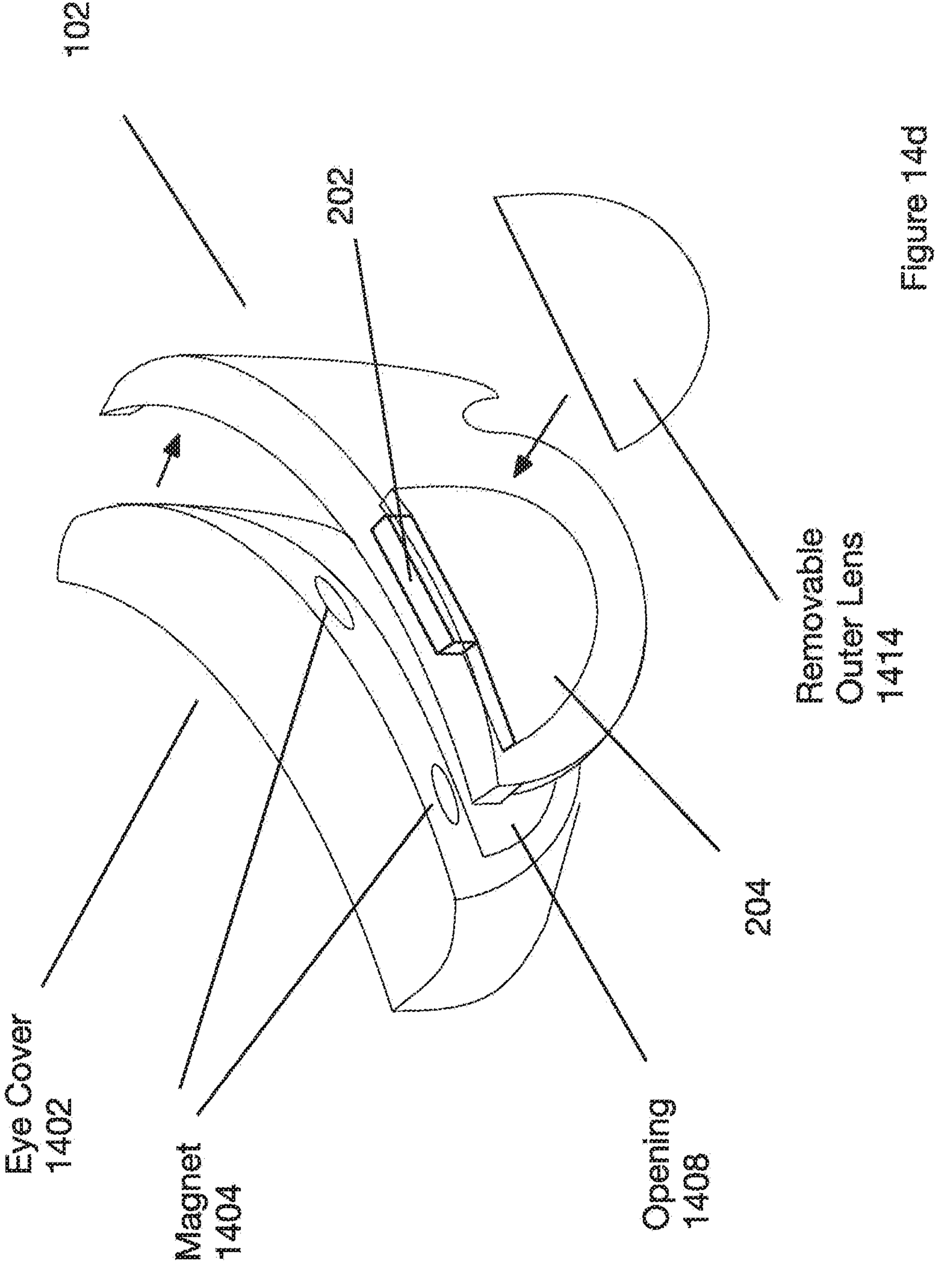
Figure 14E:
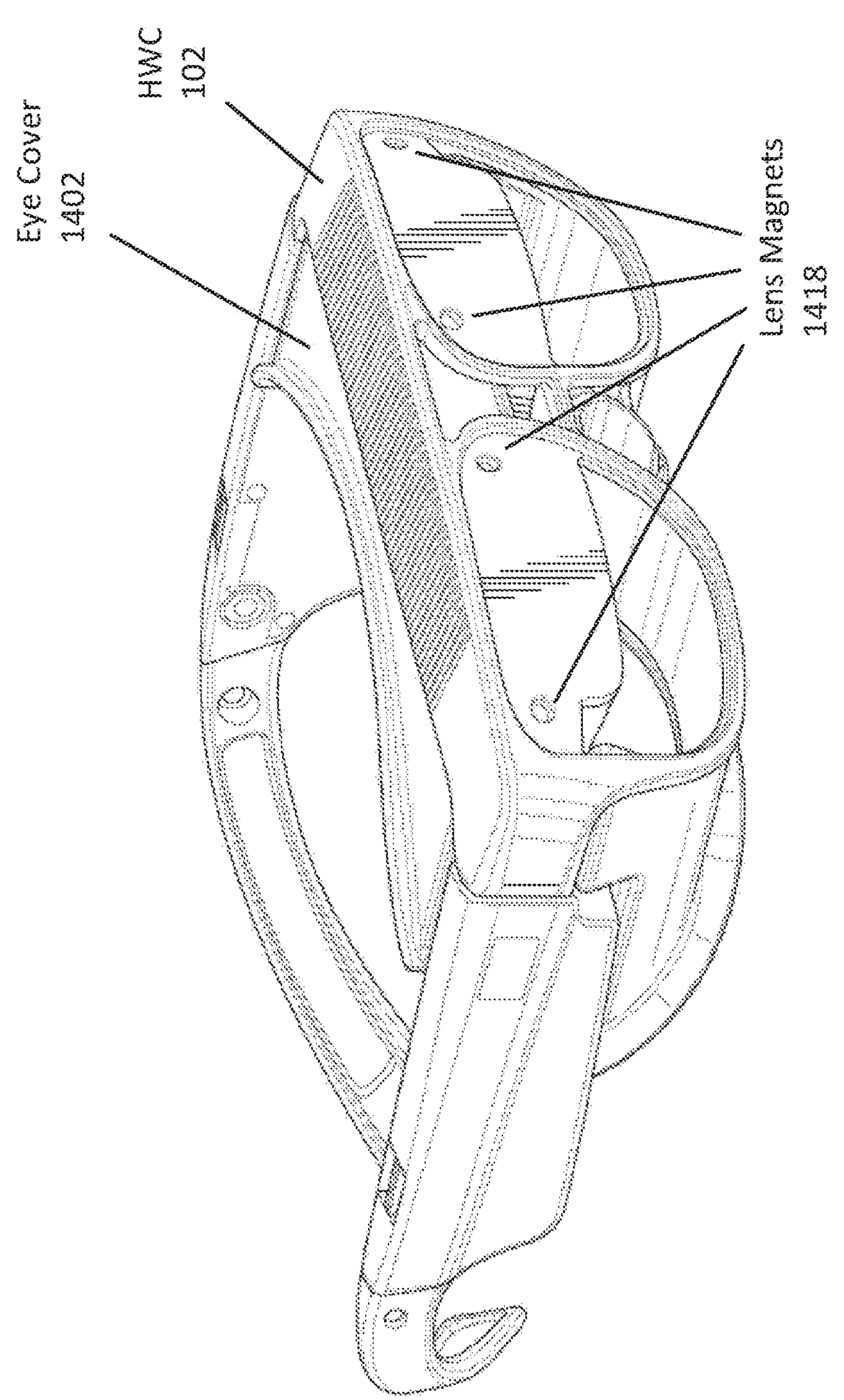

FIG. 14*d* illustrates a head-worn computer system 102 with a see-through digital content display 204 adapted to include a removable outer lens 1414 and a removable eye cover 1402. The eye cover 1402 may be attached to the head-worn computer 102 with magnets 1404 or other attachment systems (e.g. mechanical attachments, a snug friction fit between the arms of the head-worn computer 102, etc.). The eye cover 1402 may be attached when the user wants to cut stray light from escaping the confines of the head-worn computer, create a more immersive experience by removing the otherwise viewable peripheral view of the surrounding environment, etc. The removable outer lens 1414 may be of several varieties for various experiences. It may have no transmission or a very low transmission to create a dark background for the digital content, creating an immersive experience for the digital content. It may have a high transmission so the user can see through the see-through display and the outer lens 1414 to view the surrounding environment, creating a system for a heads-up display, augmented reality display, assisted reality display, etc. The outer lens 1414 may be dark in a middle portion to provide a dark background for the digital content (i.e. dark backdrop behind the see-through field of view from the user's perspective) and a higher transmission area elsewhere. The outer lenses 1414 may have a transmission in the range of 2 to 5%, 5 to 10%, 10 to 20% for the immersion effect and above 10% or 20% for the augmented reality effect, for example. The outer lenses 1414 may also have an adjustable transmission to facilitate the change in system effect. For example, the outer lenses 1414 may be electronically adjustable tint lenses (e.g. liquid crystal or have crossed polarizers with an adjustment for the level of cross).

In embodiments, the eye cover 1402 may have areas of transparency or partial transparency to provide some visual connection with the user's surrounding environment. This may also reduce or eliminate nausea or other feelings associated with the complete removal of the view of the surrounding environment.

FIG. 14*c* illustrates a HWC 102 assembled with an eye cover 1402 without outer lenses in place. The outer lenses, in embodiments, may be held in place with magnets 1418 for case of removal and replacement. In embodiments, the outer lenses may be held in place with other systems, such as mechanical systems.

Figure 14F:
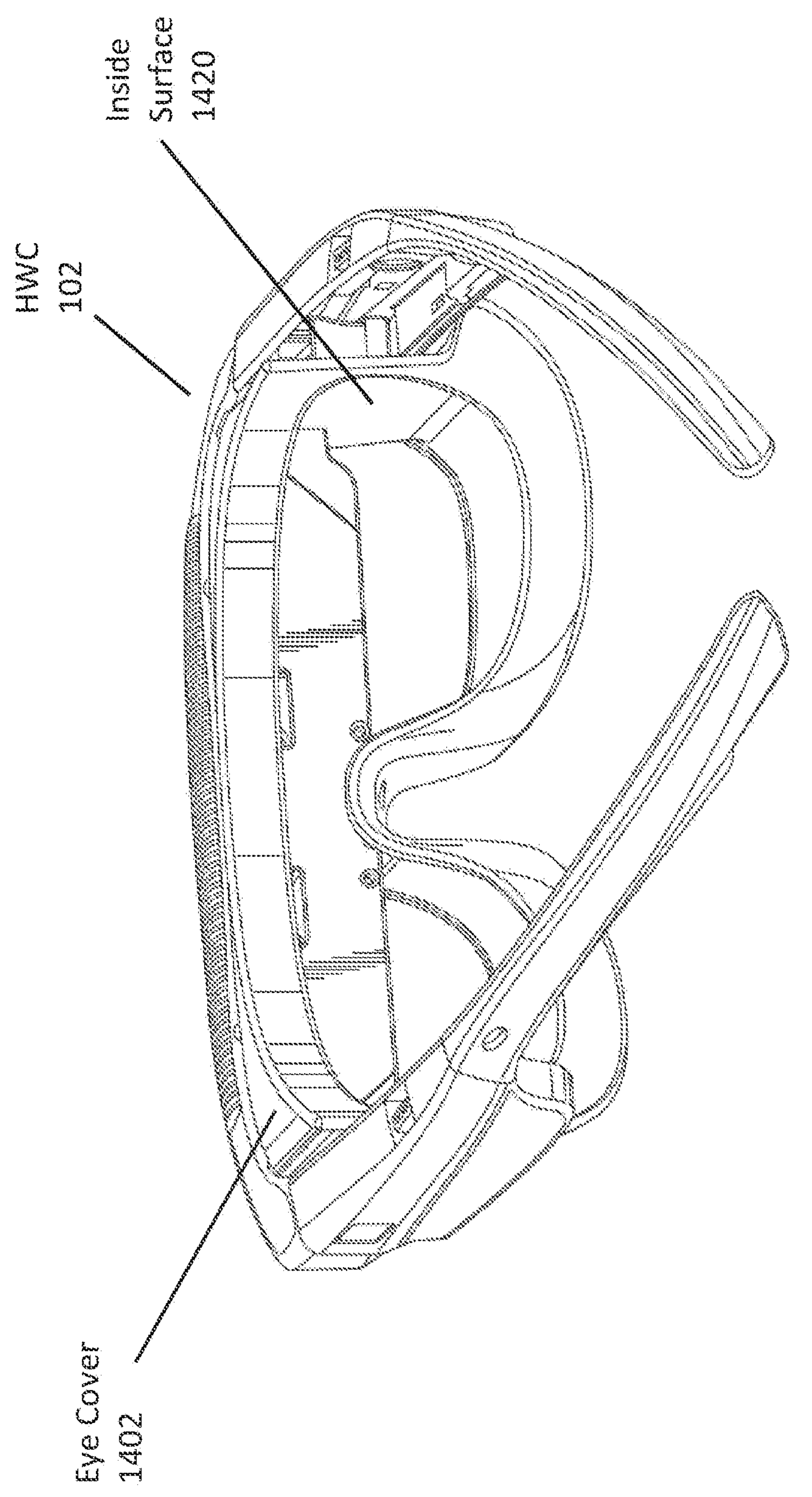

Another aspect of the present disclosure relates to an effects system that generates effects outside of the field of view in the see-through display of the head-worn computer. The effects may be, for example, lighting effects, sound effects, tactile effects (e.g. through vibration), air movement effects, etc. In embodiments, the effect generation system is mounted on the eye cover 1402. For example, a lighting system (e.g. LED(s), OLEDs, etc.) may be mounted on an inside surface 1420, or exposed through the inside surface 1420, as illustrated in FIG. 14*f*, such that they can create a lighting effect (e.g. a bright light, colored light, subtle color effect) in coordination with content being displayed in the field of view of the see-through display. The content may be a movie or a game, for example, and an explosion may happen on the right side of the content, as scripted, and matching the content, a bright flash may be generated by the effects lighting system to create a stronger effect. As another example, the effects system may include a vibratory system mounted near the sides or temples, or otherwise, and when the same explosion occurs, the vibratory system may generate a vibration on the right side to increase the user experience indicating that the explosion had a real sound wave creating the vibration. As yet a further example, the effects system may have an air system where the effect is a puff of air blown onto the user's face. This may create a feeling of closeness with some fast moving object in the content. The effects system may also have speakers directed towards the user's cars or an attachment for ear buds, etc.

In embodiments, the effects generated by the effects system may be scripted by an author to coordinate with the content. In embodiments, sensors may be placed inside of the eye cover to monitor content effects (e.g. a light sensor to measure strong lighting effects or peripheral lighting effects) that would than cause an effect(s) to be generated.

The effects system in the eye cover may be powered by an internal battery and the battery, in embodiments, may also provide additional power to the head-worn computer 102 as a back-up system. In embodiments, the effects system is powered by the batteries in the head-worn computer. Power may be delivered through the attachment system (e.g. magnets, mechanical system) or a dedicated power system.

The effects system may receive data and/or commands from the head-worn computer through a data connection that is wired or wireless. The data may come through the attachment system, a separate line, or through Bluetooth or other short range communication protocol, for example.

In embodiments, the eye cover 1402 is made of reticulated foam, which is very light and can contour to the user's face. The reticulated foam also allows air to circulate because of the open-celled nature of the material, which can reduce user fatigue and increase user comfort. The eye cover 1402 may be made of other materials, soft, stiff, priable, etc. and may have another material on the periphery that contacts the face for comfort. In embodiments, the eye cover 1402 may include a fan to exchange air between an external environment and an internal space, where the internal space is defined in part by the face of the user. The fan may operate very slowly and at low power to exchange the air to keep the face of the user cool. In embodiments the fan may have a variable speed controller and/or a temperature sensor may be positioned to measure temperature in the internal space to control the temperature in the internal space to a specified range, temperature, etc. The internal space is generally characterized by the space confined space in front of the user's eyes and upper cheeks where the eye cover encloses the area.

Another aspect of the present disclosure relates to flexibly mounting an audio headset on the head-worn computer 102 and/or the eye cover 1402. In embodiments, the audio headset is mounted with a relatively rigid system that has flexible joint(s) (e.g. a rotational joint at the connection with the eye cover, a rotational joint in the middle of a rigid arm, etc.) and extension(s) (e.g. a telescopic arm) to provide the user with adjustability to allow for a comfortable fit over, in or around the user's ear. In embodiments, the audio headset is mounted with a flexible system that is more flexible throughout, such as with a wire-based connection.

Figures 14G, 14H:
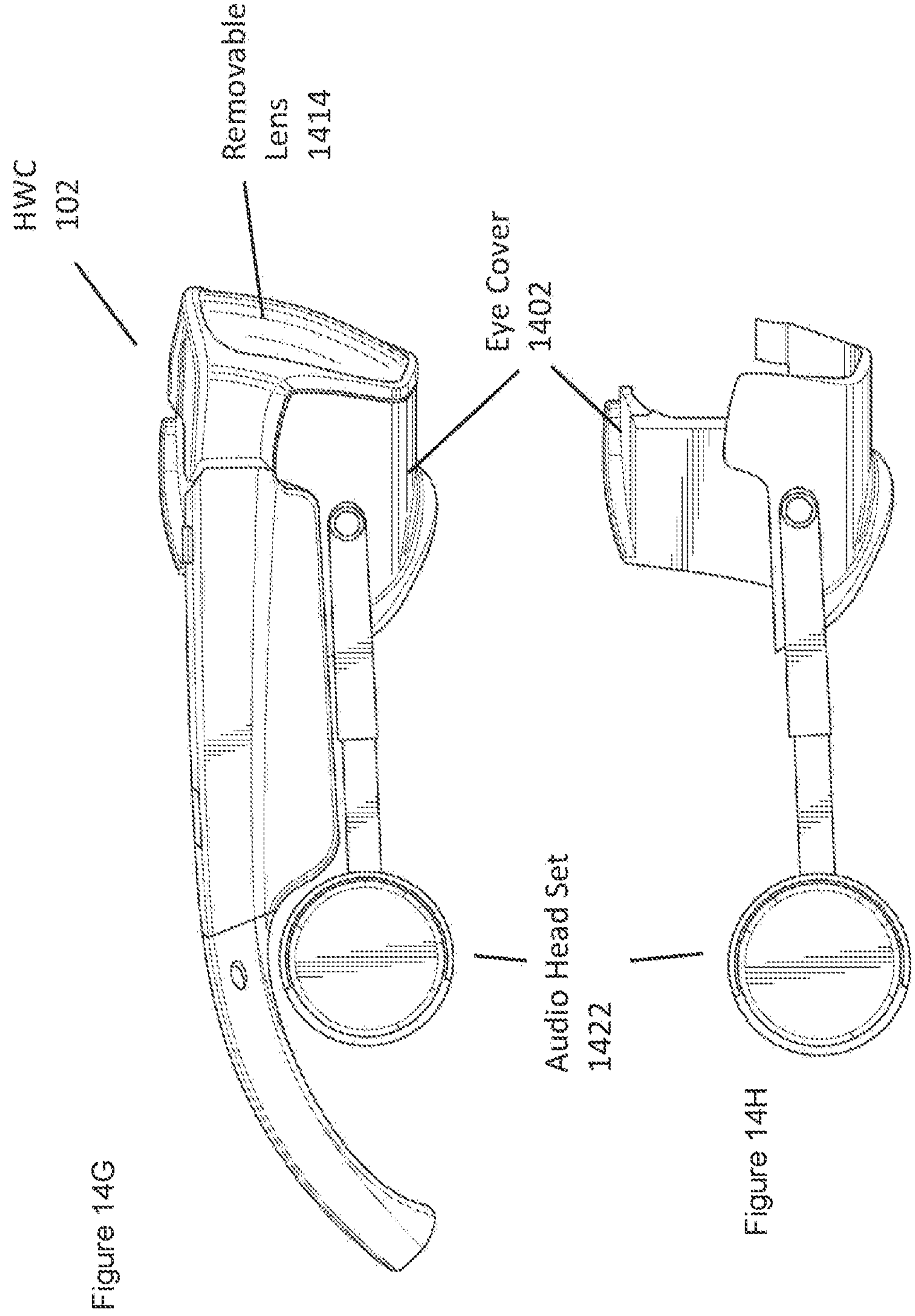

FIG. 14*g* illustrates a head-worn computer 102 with removable lenses 1414 along with a mounted eye cover 1402. The head-worn computer, in embodiments, includes a see-through display (as disclosed herein). The eye cover 1402 also includes a mounted audio headset 1422. The mounted audio headset 1422 in this embodiment is mounted to the eye cover 1402 and has audio wire connections (not shown). In embodiments, the audio wires' connections may connect to an internal wireless communication system (e.g. Bluetooth, NFC, WiFi) to make connection to the processor in the head-worn computer. In embodiments, the audio wires may connect to a magnetic connector, mechanical connector or the like to make the connection.

FIG. 14*h* illustrates an unmounted eye cover 1402 with a mounted audio headset 1422. As illustrated, the mechanical design of the eye cover is adapted to fit onto the head-worn computer to provide visual isolation or partial isolation and the audio headset.

In embodiments, the eye cover 1402 may be adapted to be removably mounted on a head-worn computer 102 with a see-through computer display. An audio headset 1422 with an adjustable mount may be connected to the eye cover, wherein the adjustable mount may provide extension and rotation to provide a user of the head-worn computer with a mechanism to align the audio headset with an ear of the user. In embodiments, the audio headset includes an audio wire connected to a connector on the eye cover and the eye cover connector may be adapted to removably mate with a connector on the head-worn computer. In embodiments, the audio headset may be adapted to receive audio signals from the head-worn computer 102 through a wireless connection (e.g. Bluetooth, WiFi). As described elsewhere herein, the head-worn computer 102 may have a removable and replaceable front lens 1414. The eye cover 1402 may include a battery to power systems internal to the eye cover 1402. The eye cover 1402 may have a battery to power systems internal to the head-worn computer 102.

In embodiments, the eye cover 1402 may include a fan adapted to exchange air between an internal space, defined in part by the user's face, and an external environment to cool the air in the internal space and the user's face. In embodiments, the audio headset 1422 may include a vibratory system (e.g. a vibration motor, piezo motor, etc. in the armature and/or in the section over the ear) adapted to provide the user with a haptic feedback coordinated with digital content presented in the see-through computer display. In embodiments, the head-worn computer 102 includes a vibratory system adapted to provide the user with a haptic feedback coordinated with digital content presented in the see-through computer display.

In embodiments, the eye cover 1402 is adapted to be removably mounted on a head-worn computer with a see-through computer display. The eye cover 1402 may also include a flexible audio headset mounted to the eye cover 1402, wherein the flexibility provides the user of the head-worn computer 102 with a mechanism to align the audio headset with an car of the user. In embodiments, the flexible audio headset is mounted to the eye cover 1402 with a magnetic connection. In embodiments, the flexible audio headset may be mounted to the eye cover 1402 with a mechanical connection.

In embodiments, the audio headset 1422 may be spring or otherwise loaded such that the head set presses inward towards the user's cars for a more secure fit.

Figure 15:
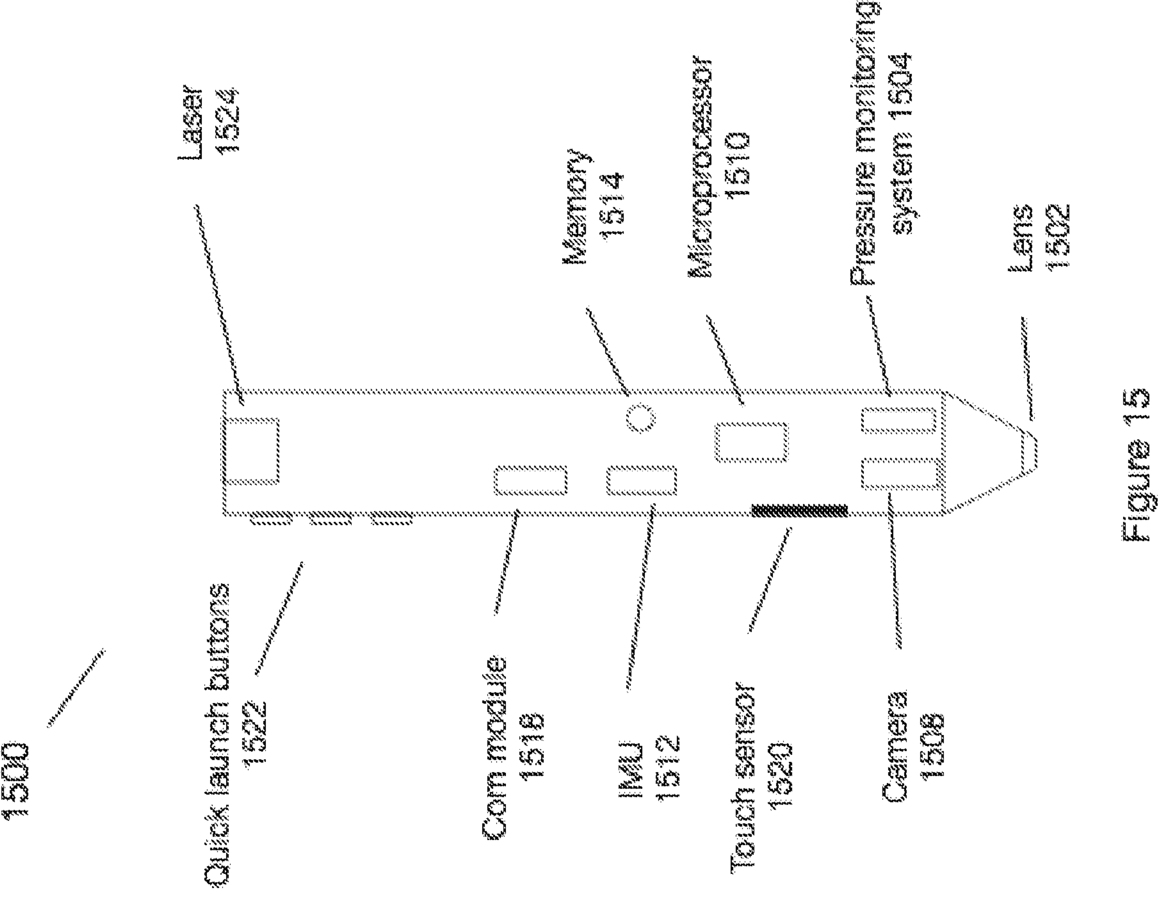
FIG. 15 illustrates an external user interface in accordance with the principles of the present disclosure.

Referring to FIG. 15, we now turn to describe a particular external user interface 104, referred to generally as a pen 1500. The pen 1500 is a specially designed external user interface 104 and can operate as a user interface, to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens 1502 configuration is described in greater detail herein. The function of the camera 1508 is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 maybe arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

Figure 16:
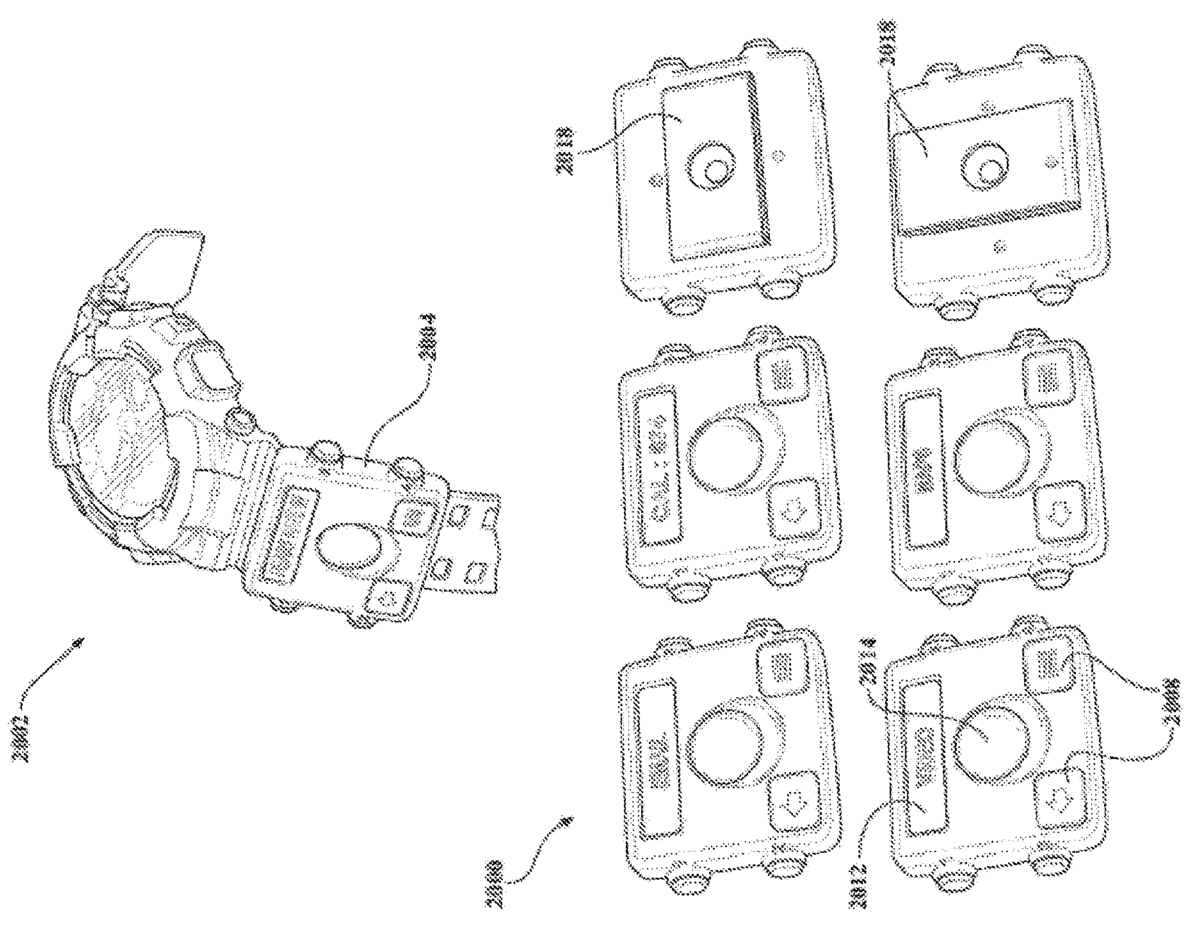
FIG. 16 illustrates external user interfaces in accordance with the principles of the present disclosure.

FIG. 16 illustrates yet another embodiment of the present disclosure. FIG. 16 illustrates a watchband clip-on controller 2000. The watchband clip-on controller may be a controller used to control the HWC 102 or devices in the HWC system 100. The watchband clip-on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replacable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller 2000 may have 3-axis motion monitoring (e.g. through an IMU, accelerometers, magnetometers, gyroscopes, etc.) to capture user motion. The user motion may then be interpreted for gesture control.

In embodiments, the watchband controller 2000 may comprise fitness sensors and a fitness computer. The sensors may track heart rate, calories burned, strides, distance covered, and the like. The data may then be compared against performance goals and/or standards for user feedback.

Figure 17:
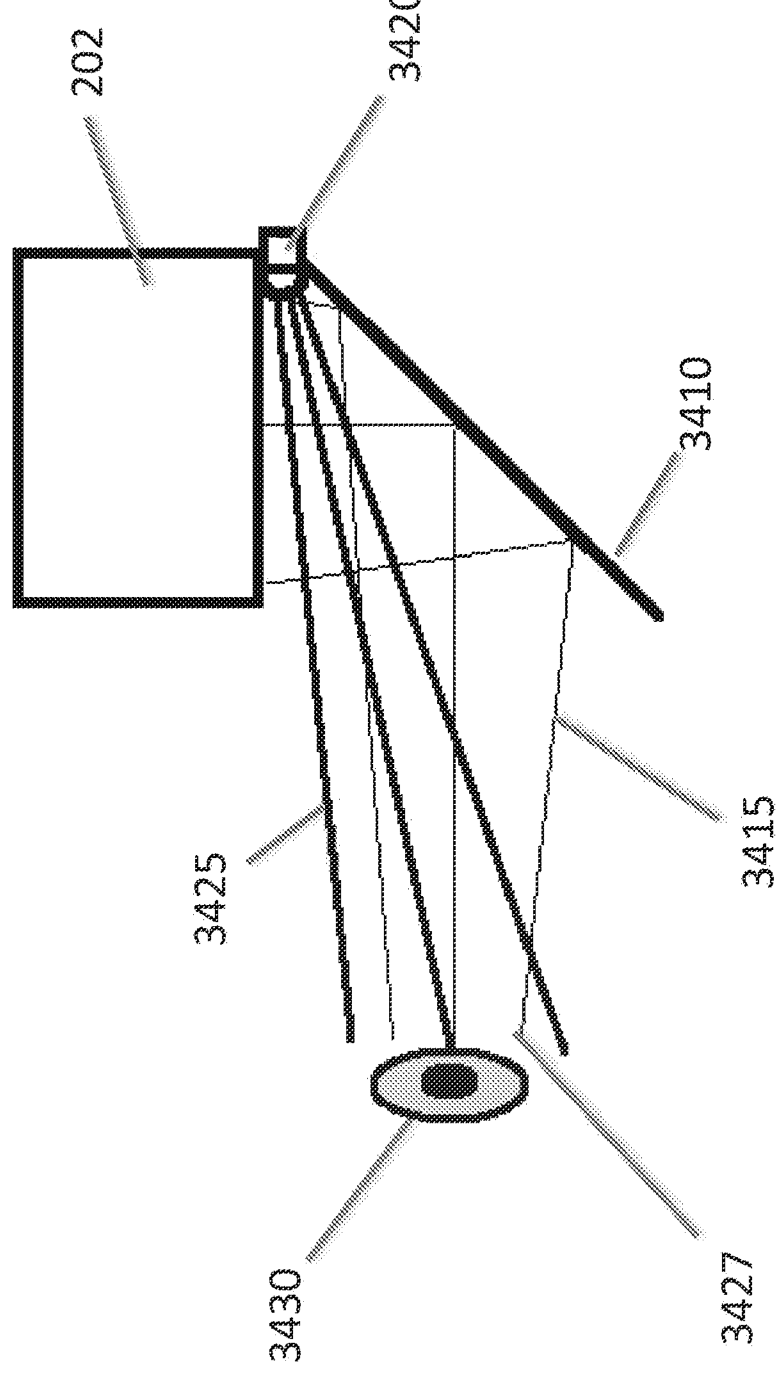
FIGS. 17 and 18 illustrate structured eye lighting systems according to the principles of the present disclosure.
Figure 18:
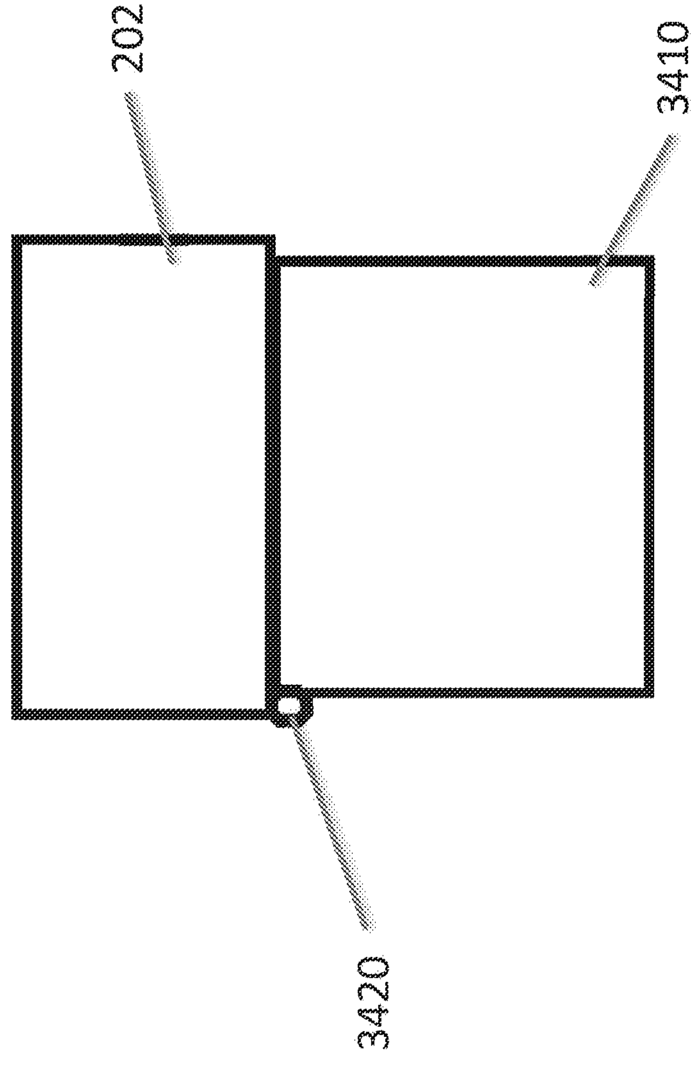

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 17 and 18 show illustrations of dedicated eye illumination lights 3420. FIG. 17 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 18 shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

In embodiments, the eye imaging camera is inline with the image light optical path, or part of the image light optical path. For example, the eye camera may be positioned in the upper module to capture eye image light that reflects back through the optical system towards the image display. The eye image light may be captured after reflecting off of the image source (e.g. in a DLP configuration where the mirrors can be positioned to reflect the light towards the eye image light camera), a partially reflective surface may be placed along the image light optical path such that when the eye image light reflects back into the upper or lower module that it is reflected in a direction that the eye imaging camera can capture light eye image light. In other embodiments, the eye image light camera is positioned outside of the image light optical path. For example, the camera(s) may be positioned near the outer lens of the platform.

Figure 19:
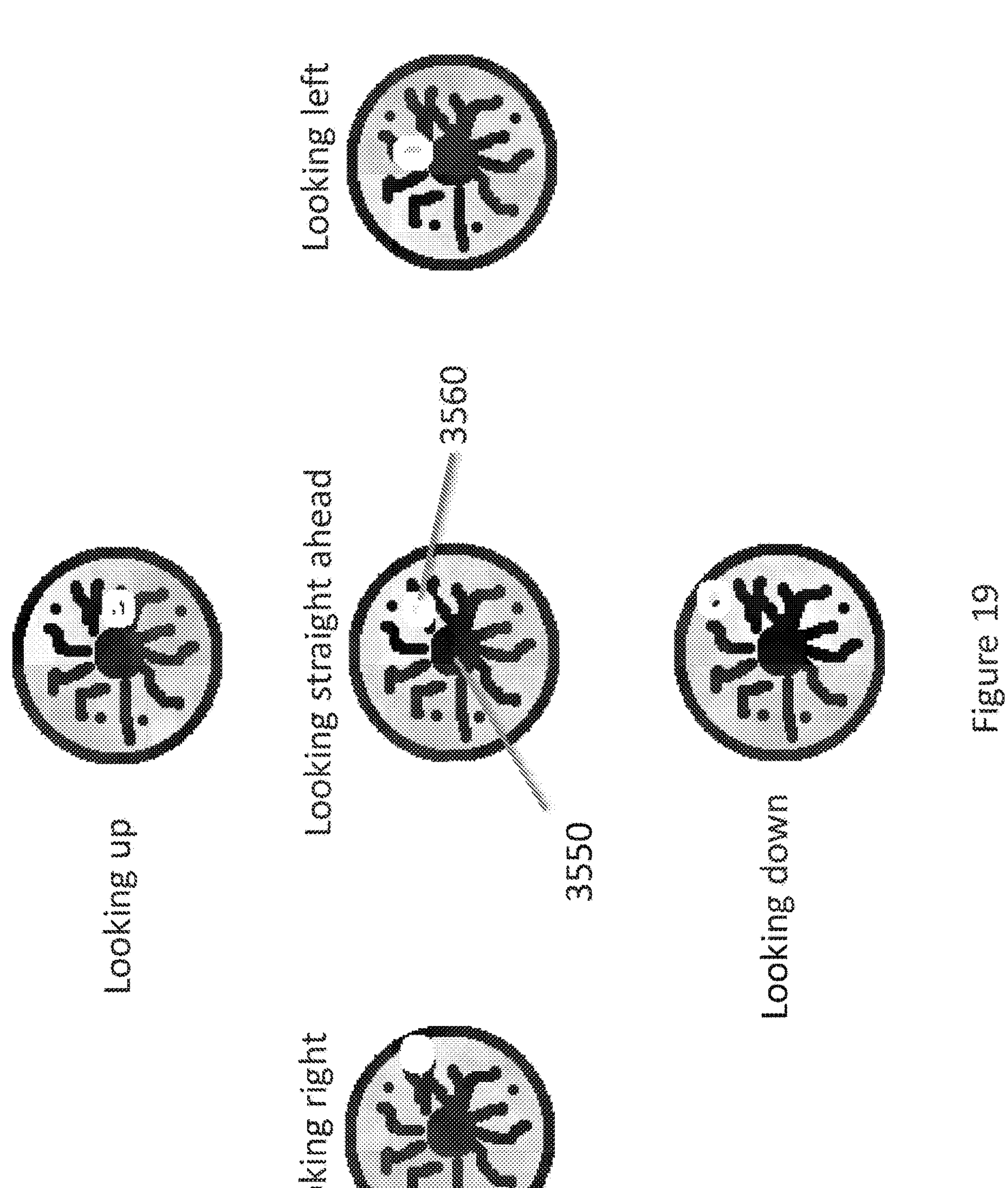
FIG. 19 illustrates eye glint in the prediction of eye direction analysis in accordance with the principles of the present disclosure.

FIG. 19 shows a series of illustrations of captured eye images that show the eye glint (i.e. light that reflects off the front of the eye) produced by a dedicated eye light mounted adjacent to the combiner as previously described herein. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 19 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the eye camera is an infrared camera, so that the eye glint 3560 is only provided by light from the dedicated eye light. For example, the combiner can include a low pass filter that passes visible light while reflecting infrared light from the environment away from the eye camera, reflecting infrared light from the dedicated eye light toward the user's eye and the eye camera can include a high pass filter that absorbs visible light associated with the displayed image while passing infrared light associated with the eye image.

In an embodiment of the eye imaging system, the lens for the eye camera is designed to take into account the optics associated with the upper module 202 and the lower module 204. This is accomplished by designing the eye camera to include the optics in the upper module 202 and optics in the lower module 204, so that a high MTF image is produced, at the image sensor in the eye camera, of the wearer's eye. In yet a further embodiment, the eye camera lens is provided with a large depth of field to eliminate the need for focusing the eye camera to enable sharp images of the eye to be captured. Where a large depth of field is typically provided by a high f/#lens (e.g. f/#>5). In this case, the reduced light gathering associated with high f/#lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figure 20B:
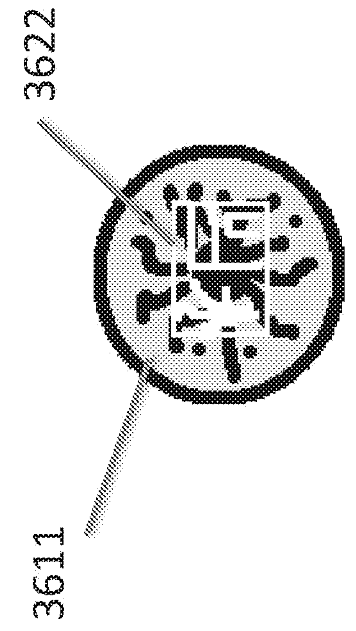
FIG. 20*b* illustrates a digital content presentation reflection off of the wearer's eye that may be analyzed in accordance with the principles of the present disclosure.
Figure 20A:
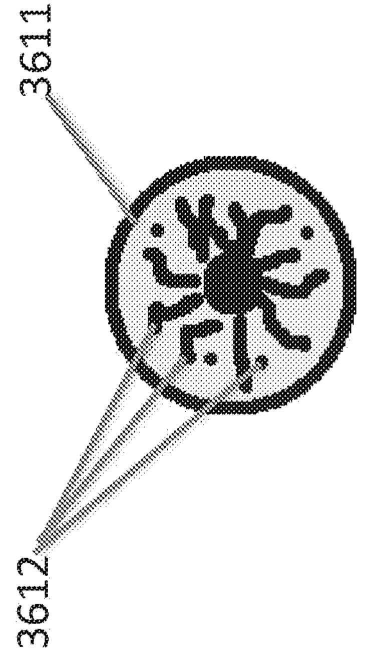
FIG. 20*a* illustrates eye characteristics that may be used in personal identification through analysis of a system according to the principles of the present disclosure.

In a further embodiment, FIG. 20*a* shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

FIG. 20*b* is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or a series of eye images for processing. The image(s) may be processed to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 21:
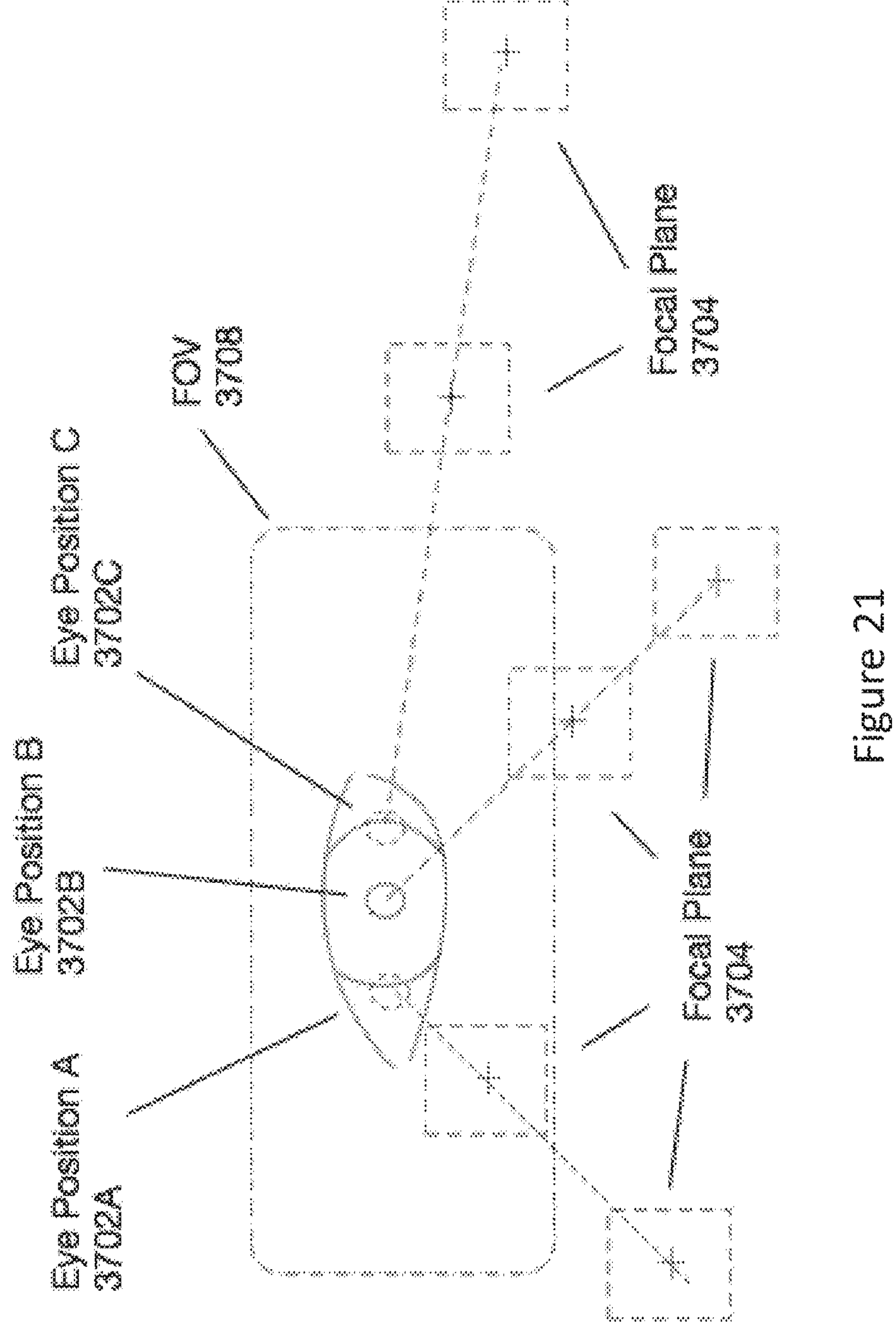
FIG. 21 illustrates eye imaging along various virtual target lines and various focal planes in accordance with the principles of the present disclosure.

FIG. 21 illustrates an eye imagery process that involves imaging the HWC 102 wearer's eye(s) and processing the images (e.g. through eye imaging technologies described herein) to determine in what position 3702 the eye is relative to it's neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 21, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2*d* or 3*d*, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, gps location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not in-line with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 22:
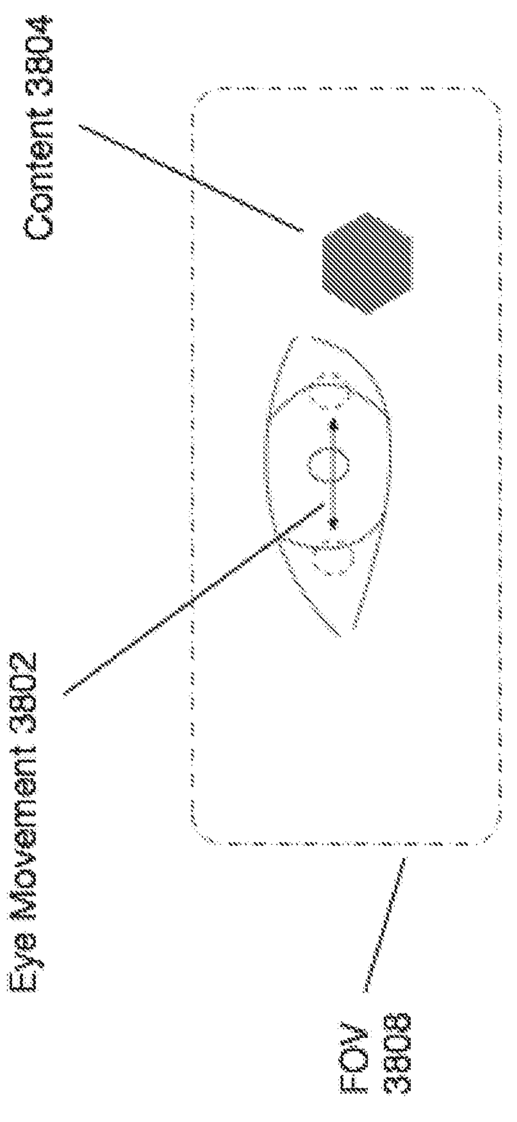
FIG. 22 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 22 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 23:
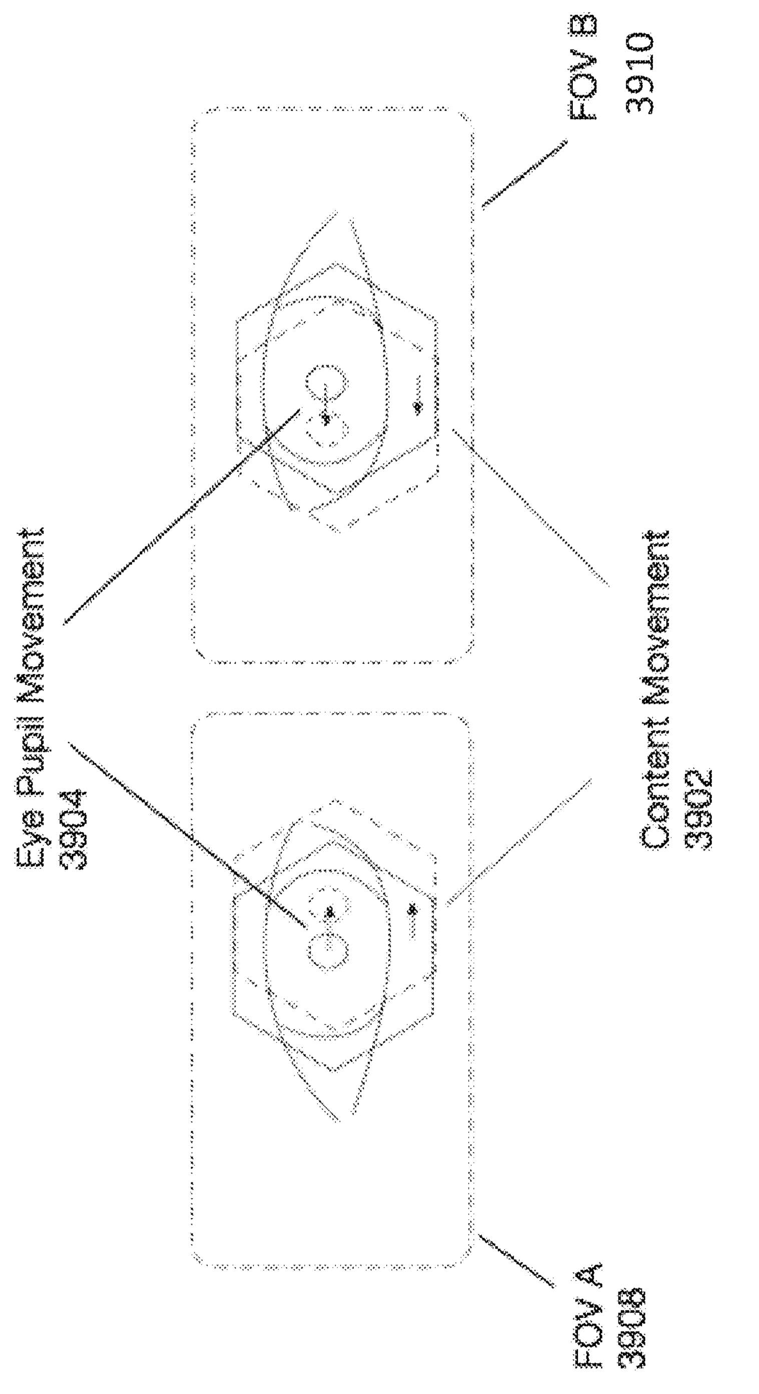
FIG. 23 illustrates eye imaging and eye convergence in accordance with the principles of the present disclosure.

FIG. 23 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head to control the security of the HWC and the associated information that is displayed to the user, wherein the orientation, movement pattern, stress or position of the ear horns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 24:
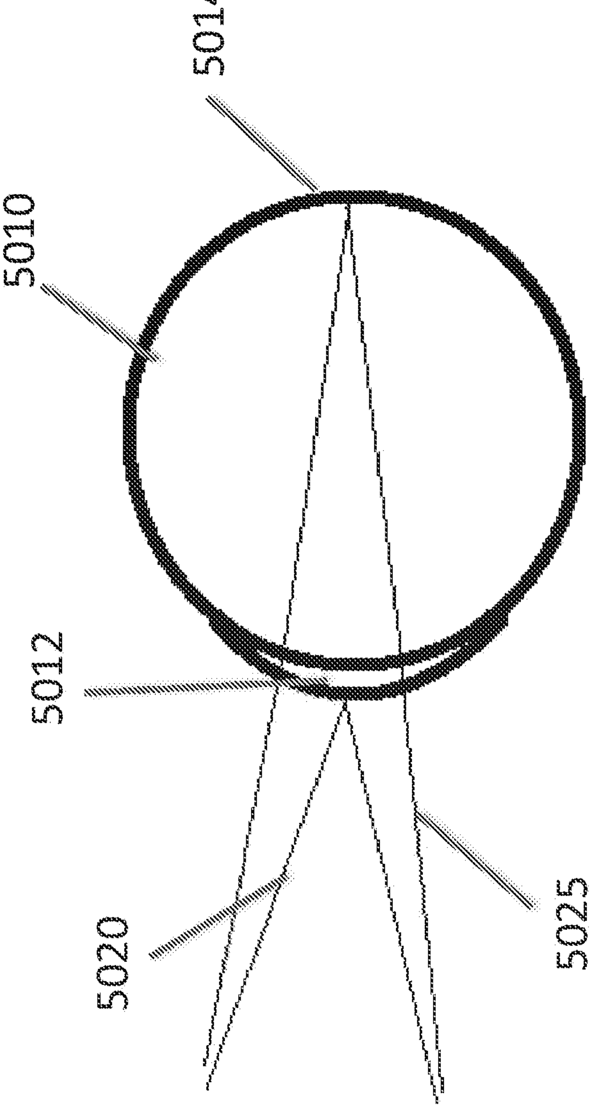
FIG. 24 illustrates light impinging an eye in accordance with the principles of the present disclosure.
Figure 25:
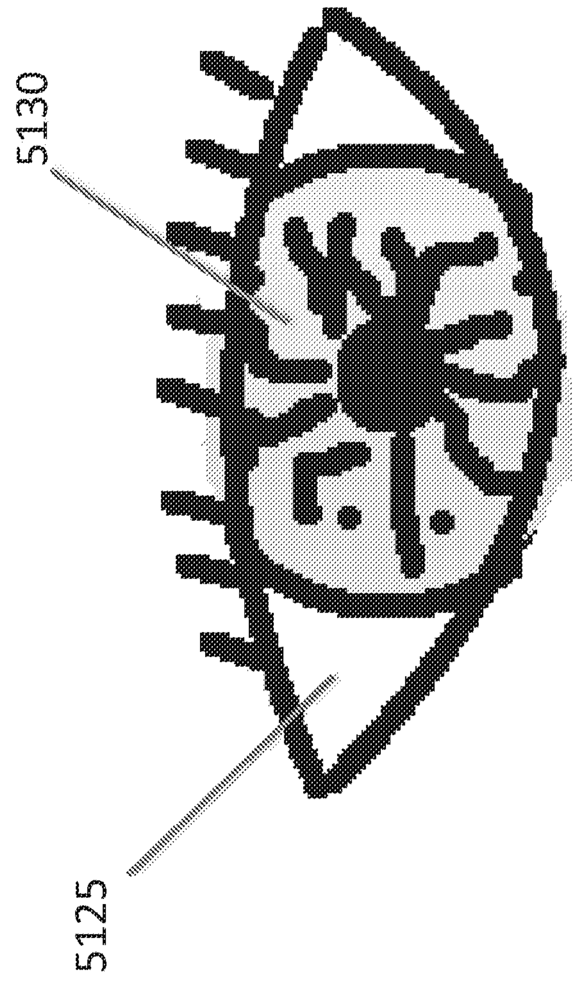
FIG. 25 illustrates a view of an eye in accordance with the principles of the present disclosure.

FIG. 24 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and inline with where the wearer is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 24 shows light rays 5020 and 5025 that are respectively associated with capturing images of the iris 5012 or the retina 5014 wherein the optics associated with the eye imaging system are respectively focused at the iris 5012 or the retina 5014. Illuminating light can also be provided in the eye imaging system to illuminate the iris 5012 or the retina 5014. FIG. 25 shows an illustration of an eye including an iris 5130 and a sclera 5125. In embodiments, the eye imaging system can be used to capture images that include the iris 5130 and portions of the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

Figure 26B:
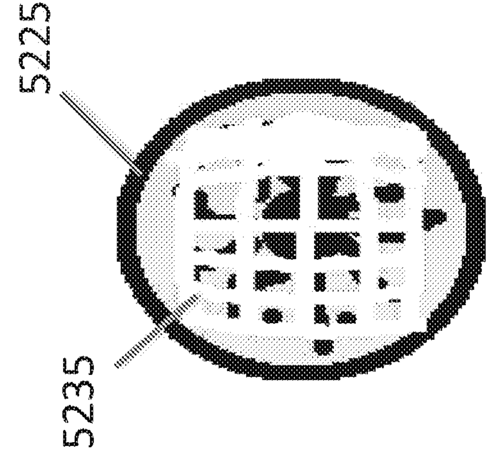
FIGS. 26*a* and 26*b* illustrate views of an eye with a structured light pattern in accordance with the principles of the present disclosure.
Figure 26A:
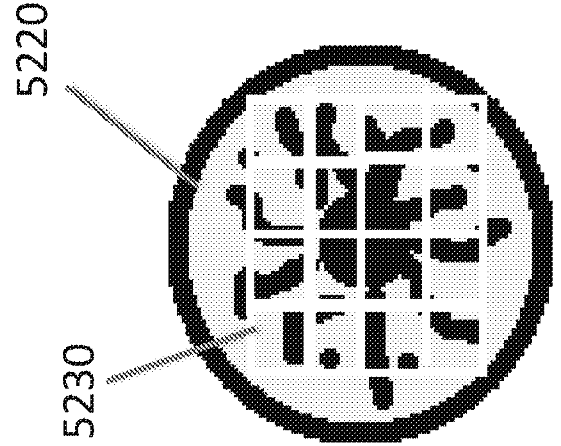

FIGS. 26*a* and 26*b* illustrate captured images of eyes where the eyes are illuminated with structured light patterns. In FIG. 26*a*, an eye 5220 is shown with a projected structured light pattern 5230, where the light pattern is a grid of lines. A light pattern of such as 5230 can be provided by the light source 5355 by including a diffractive or a refractive device to modify the light 5357 as are known by those skilled in the art. A visible light source can also be included for the second camera, which can include a diffractive or refractive to modify the light 5467 to provide a light pattern. FIG. 26*b* illustrates how the structured light pattern of 5230 becomes distorted to 5235 when the user's eye 5225 looks to the side. This distortion comes from the fact that the human eye is not completely spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

The eye imaging system can also be used for the assessment of aspects of health of the user. In this case, information gained from analyzing captured images of the iris 5130 or sclera 5125 are different from information gained from analyzing captured images of the retina 5014. Where images of the retina 5014 are captured using light that illuminates the inner portions of the eye including the retina 5014. The light can be visible light, but in an embodiment, the light is infrared light (e.g. wavelength 1 to 5 microns) and the eye camera is an infrared light sensor (e.g. an InGaAs sensor) or a low resolution infrared image sensor that is used to determine the relative amount of light that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In a further embodiment, the light source and the camera together comprise a spectrometer wherein the relative intensity of the light reflected by the eye is analyzed over a series of narrow wavelengths within the range of wavelengths provided by the light source to determine a characteristic spectrum of the light that is absorbed, reflected or scattered by the eye. For example, the light source can provide a broad range of infrared light to illuminate the eye and the camera can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source can provide a series of narrow wavelengths of light (ultraviolet, visible or infrared) to sequentially illuminate the eye and camera includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light is focused on the retina and a characteristic spectrum of the retina is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances.

Another aspect of the present disclosure relates to an intuitive user interface mounted on the HWC 102 where the user interface includes tactile feedback (otherwise referred to as haptic feedback) to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through it's predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

Figure 27:
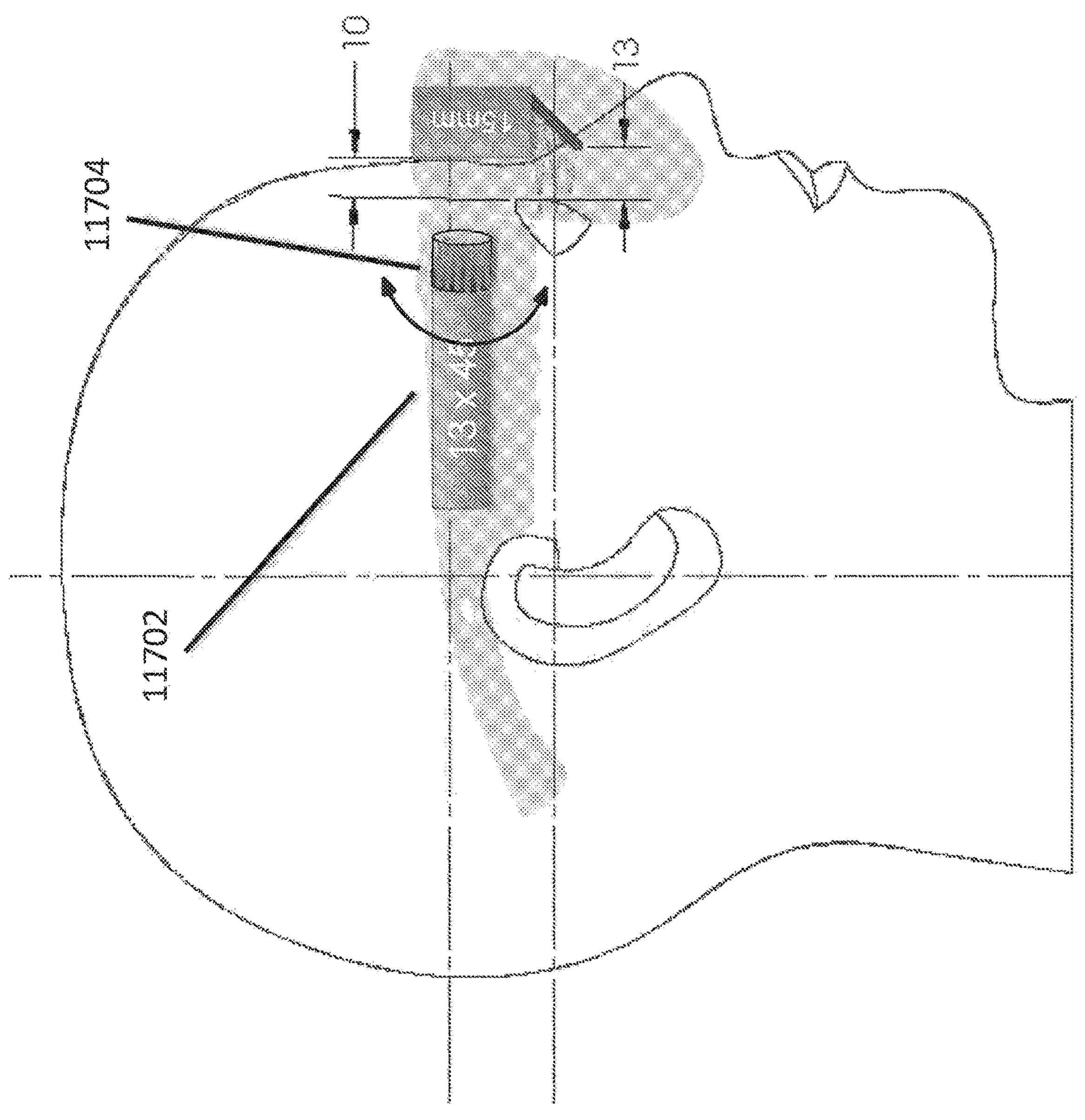
FIG. 27 illustrates a user interface in accordance with the principles of the present disclosure.
Figure 28:
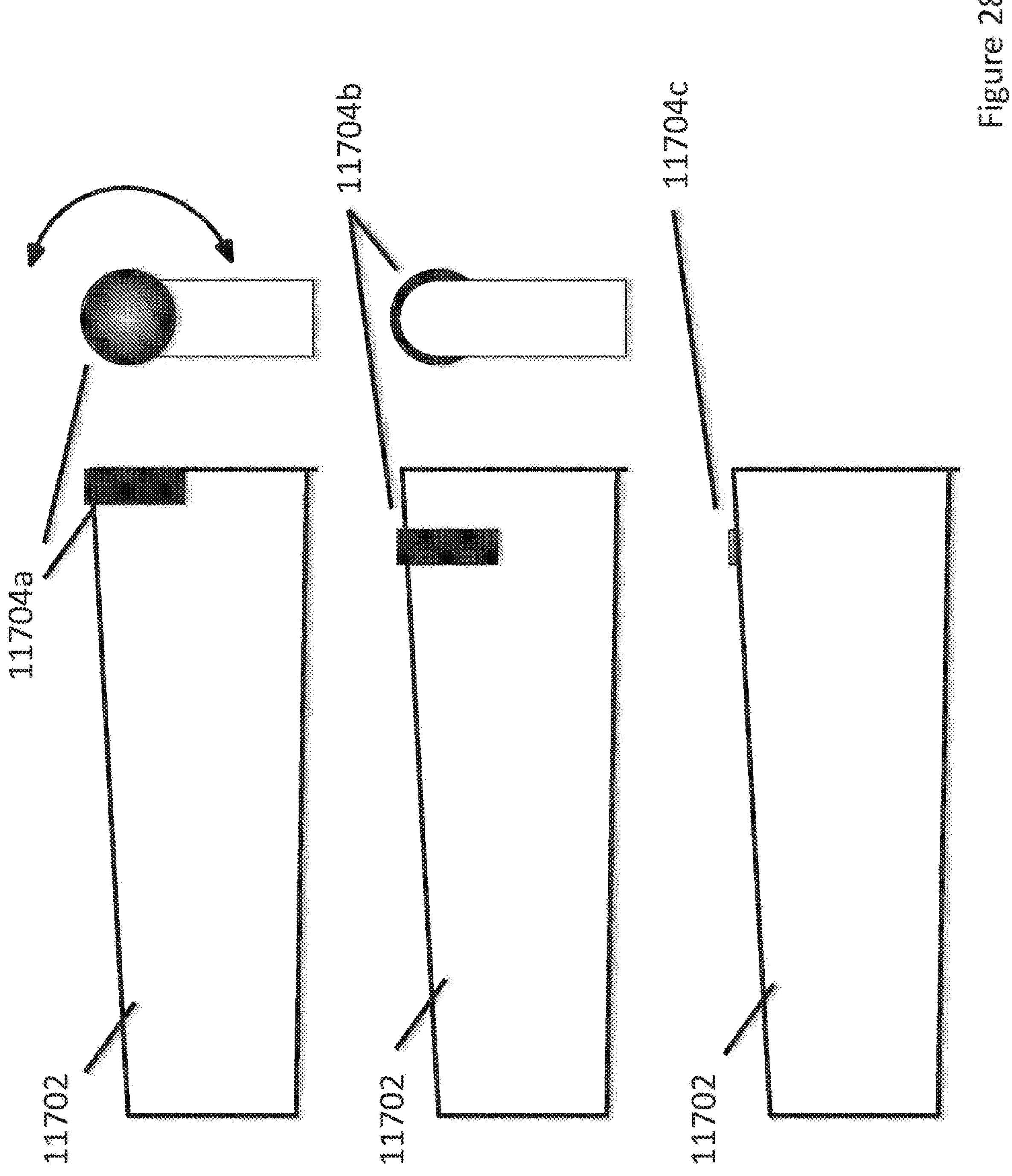
FIG. 28 illustrates a user interface in accordance with the principles of the present disclosure.

FIG. 27 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 28 illustrates several examples of different rotating user interface elements 11704*a*, 11704*b* and 11704*c*. Rotating element 11704*a* is mounted at the front end of the temple and has significant side and top exposure for user interaction. Rotating element 11704*b* is mounted further back and also has significant exposure (e.g. 270 degrees of touch). Rotating element 11704*c* has less exposure and is exposed for interaction on the top of the temple. Other embodiments may have a side or bottom exposure.

Another aspect of the present disclosure relates to a haptic system in a head-worn computer. Creating visual, audio, and haptic sensations in coordination can increase the enjoyment or effectiveness of awareness in a number of situations. For example, when viewing a movie or playing a game while digital content is presented in a computer display of a head-worn computer, it is more immersive to include coordinated sound and haptic effects. When presenting information in the head-worn computer, it may be advantageous to present a haptic effect to enhance or be the information. For example, the haptic sensation may gently cause the user of the head-worn computer believe that there is some presence on the user's right side, but out of sight. It may be a very light haptic effect to cause the 'tingling' sensation of a presence of unknown origin. It may be a high intensity haptic sensation to coordinate with an apparent explosion, cither out of sight or in-sight in the computer display. Haptic sensations can be used to generate a perception in the user that objects and events are close by. As another example, digital content may be presented to the user in the computer displays and the digital content may appear to be within reach of the user. If the user reaches out his hand in an attempt to touch the digital object, which is not a real object, the haptic system may cause a sensation and the user may interpret the sensation as a touching sensation. The haptic system may generate slight vibrations near one or both temples for example and the user may infer from those vibrations that he has touched the digital object. This additional dimension in sensory feedback can be very useful and create a more intuitive and immersive user experience.

Another aspect of the present disclosure relates to controlling and modulating the intensity of a haptic system in a head-worn computer. In embodiments, the haptic system includes separate piezo strips such that each of the separate strips can be controlled separately. Each strip may be controlled over a range of vibration levels and some of the separate strips may have a greater vibration capacity than others. For example, a set of strips may be mounted in the arm of the head-worn computer (e.g. near the user's temple, ear, rear of the head, substantially along the length of the arm, etc.) and the further forward the strip the higher capacity the strip may have. The strips of varying capacity could be arranged in any number of ways, including linear, curved, compound shape, two dimensional array, one dimensional array, three dimensional array, etc.). A processor in the head-worn computer may regulate the power applied to the strips individually, in sub-groups, as a whole, etc. In embodiments, separate strips or segments of varying capacity are individually controlled to generate a finely controlled multi-level vibration system. Patterns based on frequency, duration, intensity, segment type, and/or other control parameters can be used to generate signature haptic feedback. For example, to simulate the haptic feedback of an explosion close to the user, a high intensity, low frequency, and moderate duration may be a pattern to use. A bullet whipping by the user may be simulated with a higher frequency and shorter duration. Following this disclosure, one can imagine various patterns for various simulation scenarios.

Another aspect of the present disclosure relates to making a physical connection between the haptic system and the user's head. Typically, with a glasses format, the glasses touch the user's head in several places (e.g. cars, nose, forehead, etc.) and these areas may be satisfactory to generate the necessary haptic feedback. In embodiments, an additional mechanical element may be added to better translate the vibration from the haptic system to a desired location on the user's head. For example, a vibration or signal conduit may be added to the head-worn computer such that there is a vibration translation medium between the head-worn computers internal haptic system and the user's temple area.

Figure 29:
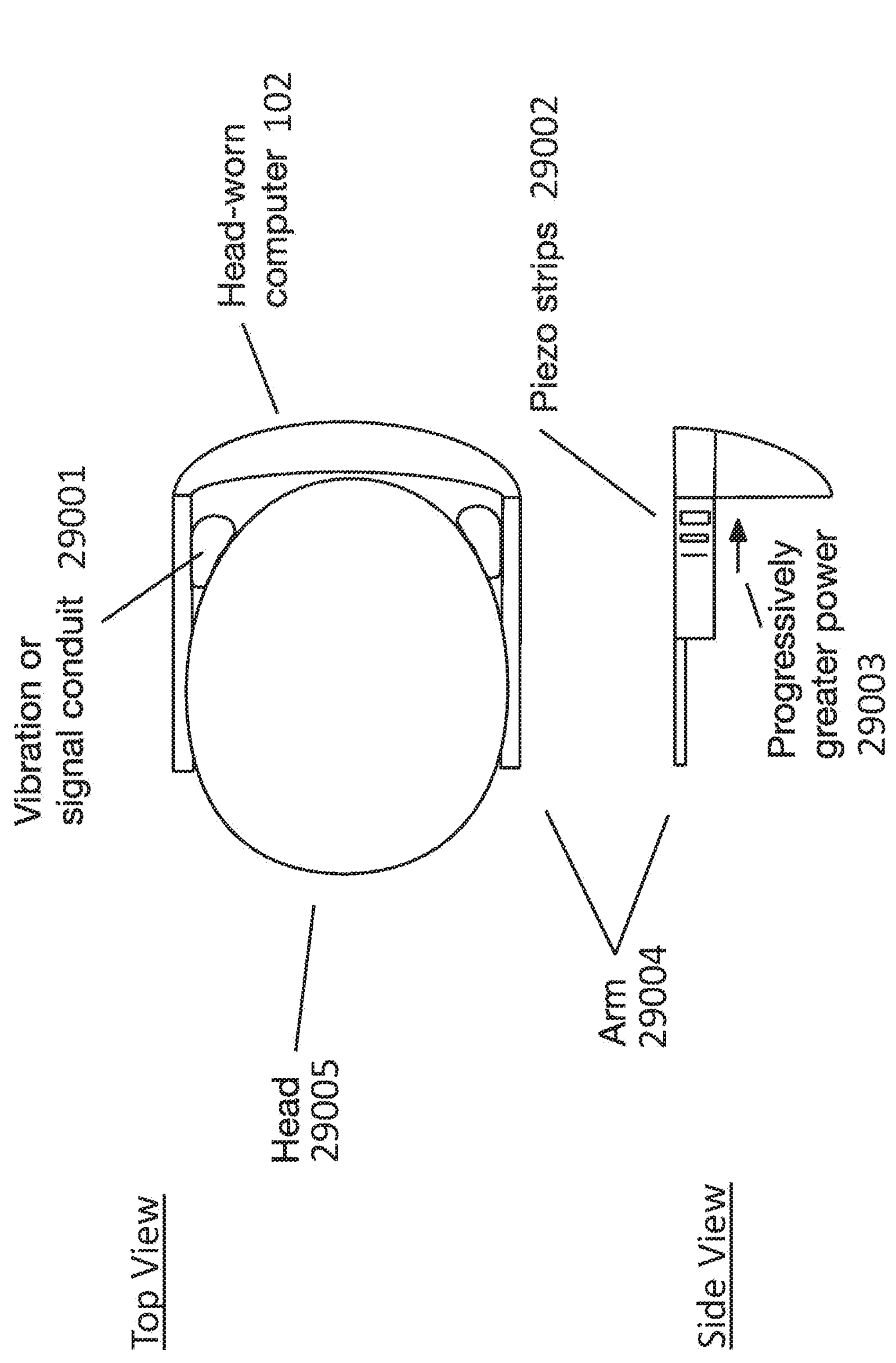
FIGS. 29 and 29*a* illustrate haptic systems in accordance with the principles of the present disclosure.

FIG. 29 illustrates a head-worn computer 102 with a haptic system comprised of piezo strips 29002. In this embodiment, the piezo strips 29002 are arranged linearly with strips of increasing vibration capacity from back to front of the arm 29004. The increasing capacity may be provided by different sized strips, for example. This arrangement can cause a progressively increased vibration power 29003 from back to front. This arrangement is provided for case of explanation; other arrangements are contemplated by the inventors of the present application and these examples should not be construed as limiting. The head-worn computer 102 may also have a vibration or signal conduit 29001 that facilitates the physical vibrations from the haptic system to the head of the user 29005. The vibration conduit may be malleable to form to the head of the user for a tighter or more appropriate fit.

An aspect of the present invention relates to a head-worn computer, comprising: a frame adapted to hold a computer display in front of a user's eye; a processor adapted to present digital content in the computer display and to produce a haptic signal in coordination with the digital content display; and a haptic system comprised of a plurality of haptic segments, wherein each of the haptic segments is individually controlled in coordination with the haptic signal. In embodiments, the haptic segments comprise a piezo strip activated by the haptic signal to generate a vibration in the frame. The intensity of the haptic system may be increased by activating more than one of the plurality of haptic segments. The intensity may be further increased by activating more than 2 of the plurality of haptic segments. In embodiments, each of the plurality of haptic segments comprises a different vibration capacity. In embodiments, the intensity of the haptic system may be regulated depending on which of the plurality of haptic segments is activated. In embodiments, each of the plurality of haptic segments are mounted in a linear arrangement and the segments are arranged such that the higher capacity segments are at one end of the linear arrangement. In embodiments, the linear arrangement is from back to front on an arm of the head-worn computer. In embodiments, the linear arrangement is proximate a temple of the user. In embodiments, the linear arrangement is proximate an ear of the user. In embodiments, the linear arrangement is proximate a rear portion of the user's head. In embodiments, the linear arrangement is from front to back on an arm of the head-worn computer, or otherwise arranged.

An aspect of the present disclosure provides a head-worn computer with a vibration conduit, wherein the vibration conduit is mounted proximate the haptic system and adapted to touch the skin of the user's head to facilitate vibration sensations from the haptic system to the user's head. In embodiments, the vibration conduit is mounted on an arm of the head-worn computer. In embodiments, the vibration conduit touches the user's head proximate a temple of the user's head. In embodiments, the vibration conduit is made of a soft material that deforms to increase contact area with the user's head.

An aspect of the present disclosure relates to a haptic array system in a head-worn computer. The haptic array(s) that can correlate vibratory sensations to indicate events, scenarios, etc. to the wearer. The vibrations may correlate or respond to auditory, visual, proximity to elements, etc. of a video game, movie, or relationships to elements in the real world as a means of augmenting the wearer's reality. As an example, physical proximity to objects in a wearer's environment, sudden changes in elevation in the path of the wearer (e.g. about to step off a curb), the explosions in a game or bullets passing by a wearer. Haptic effects from a piezo array(s) that make contact the side of the wearer's head may be adapted to effect sensations that correlate to other events experienced by the wearer.

Figure 29A:
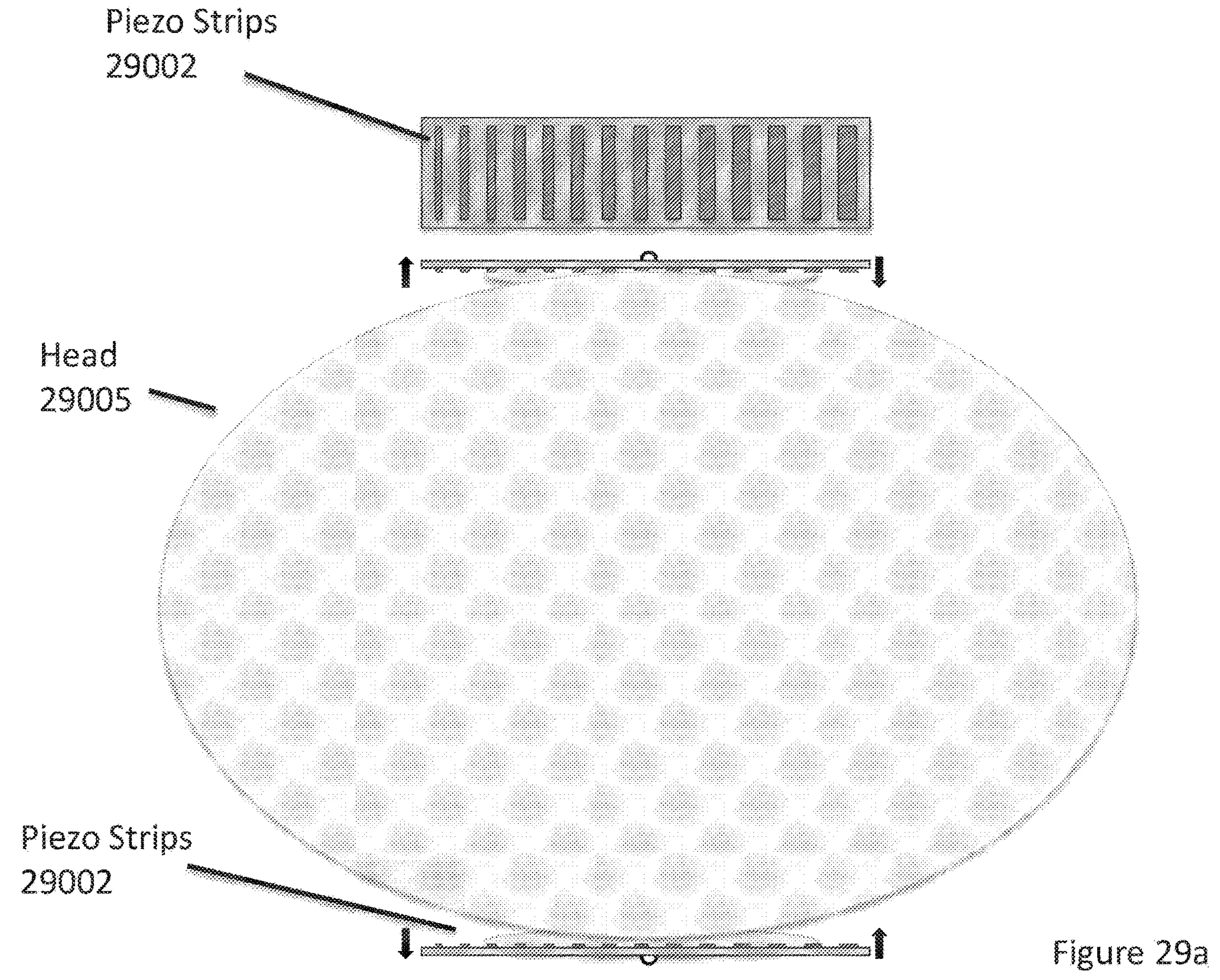

FIG. 29*a* illustrates a haptic system according to the principles of the present disclosure. In embodiments the piezo strips are mounted or deposited with varying width and thus varying force Piezo Elements on a rigid or flexible, non-conductive substrate attached, to or part of the temples of glasses, goggles, bands or other form factor. The non-conductive substrate may conform to the curvature of a head by being curved and it may be able to pivot (e.g. in and out, side to side, up and down, etc.) from a person's head. This arrangement may be mounted to the inside of the temples of a pair of glasses. Similarly, the vibration conduit, described herein elsewhere, may be mounted with a pivot. As can be seen in FIG. 29*a*, the piezo strips 29002 may be mounted on a substrate and the substrate may be mounted to the inside of a glasses arm, strap, etc. The piezo strips in this embodiment increase in vibration capacity as they move forward.

An aspect of the present invention relates to providing an intuitive user interface for a head-worn computer, wherein the user interface includes a rotary style physical interface (e.g. a dial, track, etc.) in combination with a direction selection device (e.g. a button, active touch surface, capacitive touch pad, etc.). The inventors have discovered that the combination of a rotary style interface with a separate actuator provides an intuitive physical interface to navigate a graphical user interface in a head-worn computer display. The inventors discovered that it is difficult to navigate within the head-worn computer's graphic user interface when the controls are mounted on the head-worn computer. The user cannot see the interface in this situation. The inventors also discovered that causing a rotary dial encoder style user interface with period stops (i.e. mechanical features in the rotary device that cause it to 'click' or otherwise pause into a next spot on as the rotary dial moves) allows the user interface to be configured such that a graphical selection element (e.g. cursor) in the graphical user interface 'snaps' from one selectable item to the next in correspondence to the mechanical stops of the rotary device. This makes moving from item to item feel mechanically connected to the action in the graphical user interface. In addition, the direction selection button can be used to regulate in which direction the selection element moves in the graphical user interface (GUI). For example, if the GUI includes a two-dimensional matrix of selectable items (e.g. icons), than the direction selection element may be activated once to cause the rotary device to move a cursor right and left, while an additional activation may then cause the cursor to move up and down. Without the separate direction control interface, the user may have to scroll through the items in one axis (e.g. row by row).

Figure 30:
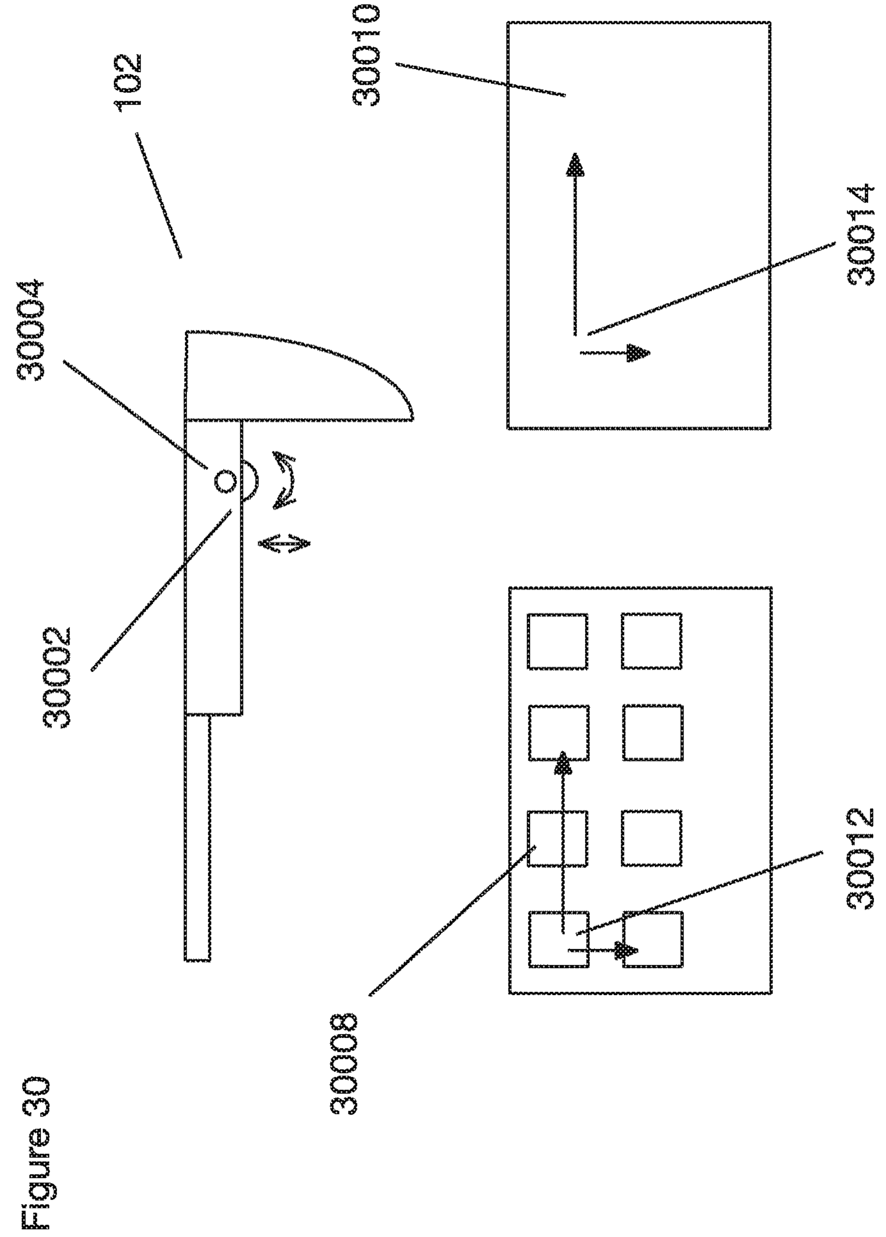
FIG. 30 illustrates a user interface system in accordance with the principles of the present disclosure.

FIG. 30 illustrates a head-worn computer 102 with a rotary style physical user interface 30002 mounted on an arm of the head-worn computer 102 along with a direction selection control device 30004, which is also mounted on the arm of the head-worn computer 102. The placement of the various elements mounted on the head-worn computer as illustrated in FIG. 30 are provided for illustrative purposes only. The inventors envision that the physical user interfaces (e.g. dial 30002 and direction selector 30004) may be otherwise mounted on the head-worn computer 102. For example, either interface may be mounted on a top, bottom, side of a surface of the head-worn computer. In embodiments, while the two physical user interfaces may operate in coordination or cooperation within the GUI, the two may be placed in separate places on the head-worn computer 102. For example, they may be mounted on separate arms of the head-worn computer 102. As another example, the direction selector may be mounted on the top of the arm and the rotary dial may be mounted on the bottom. The direction selector may be mounted such that the it is 'out of the way' of the user's interactions with the dial, but in a proximity that makes it convenient to interact with. For example, the direction selector may be a button and it may be mounted on a top surface of the arm in a region generally above a bottom arm mounted dial interface, but the button may be offset (e.g. shifted forward or backwards from a centerline of the dial) such that the user can interact with the dial by grabbing the top of the arm with an index finger and the dial with the thumb without touching the direction selection button. However, the direction selection button may be close enough to a centerline of the dial that a small shift in the user's index finger allows an interaction with the direction selection button. FIG. 30 illustrates an embodiment where the dial 30002 is mounted on a bottom surface of the arm of the head-worn computer 102 and the direction selection button 30004 is mounted on a side of the same arm. In this configuration, the user may interact with the dial by grabbing the top of the arm with his index finger and the dial with his thumb. When the user wants to change the scroll direction of a cursor or other element in the GUI, he may slip his finger or thumb to the direction selection button 30004 for the interaction.

The rotary style physical interface 30002 may have mechanically derived stops or pause points (as discussed above). It also may have a mechanically derived selection activation system, such as an ability to accept a selection instruction in conjunction with the motion control of a graphical selection element. For example, the rotary device may be mechanically adapted such that the user can rotate a dial but also press through a centerline of the dial towards the center of the dial to effect a 'click' or selection. The rotary style physical interface need not be round, as illustrated in FIG. 30. It may be oval, rectangular, square, etc., so long as the mechanical action causes the user to feel that he is rotating through selections.

The direction selection device 30004 may be a mechanical device (e.g. button, switch, etc.), capacitive sensor, proximity detector, optical sensor or other interface adapted to accept a user's physical input. It may also be programmed such that different patterns of interaction cause different commands to be generated. For example, a single touch or activation may cause a direction of scroll to be changes and a double touch or activation may cause a GUI element selection to be made.

FIG. 30 also illustrates two GUI environments 30018 that may be presented in a display of the head-worn computer 102. GUI environment 30018*a* illustrates a set of selectable elements 30008 (e.g. application launch icons). As a user rotates the rotary style physical input device 30002 and the rotary device 'clicks' from stop to stop, the identity of which icon in the GUI to be selected hops horizontally. At the end of row, it may snap to the next row to make a continuation feel of the dial. The direction selection device 30004 controls which direction 30012 is followed when the user turns the rotary device. If the rotary device is hopping icons in a row format (i.e. horizontally), an activation of the direction selection device may cause the same rotary action to move the icon hopping in a column format (i.e. vertically).

GUI environment 3018*b* illustrates an application environment. Following the launch of an application the application environment may appear in the display of the head-worn computer and the rotary style input device and the direction selection device may effect the direction and degree of movement within the application environment. For example, following the launch of an application the rotary style input device may be programmed to cause an up and down scrolling within the application environment. In the event that the user would like to then scroll horizontally, he may activate the direction selection device to cause the rotary style input device to than cause a horizontal movement.

The inventors have also discovered that including haptic feedback in conjunction with interactions with the physical user interface devices can provide further guidance to the user. For example, when turning the rotary device or activating the direction selection device, a haptic system (e.g. as described herein) may be used to provide haptic feedback. The haptic system may have fine control over multiple haptic sensations (e.g. slight vibration, strong vibration, escalating vibration, de-escalating vibration, etc.) and the rotary movement or direction selection may cause a particular pattern to cause a particular sensation. Progressive movements of a dial interface may cause a particular pattern. A fast shift of the dial may cause a different type of haptic feedback than a slower interaction, etc.

In embodiments, the rotary nature of the user interface 30002 may be provided through a capacitive strip, or other touch proximity surface, such that it causes data to be provided as the user swipes over the surface to mimic a rotating surface.

Another aspect of the present invention relates to a modular expansion system for a head-worn computer. In embodiments, the head-worn computer has a connection system (e.g. including a mechanical and electrical connection) such that a functional module can be mounted and removed from the head-worn computer. This arrangement makes possible a functional expansion or modification of functions of the head-worn computer through a removable and replaceable modular system. For example, the head-worn computer may not natively have a depth sensing system and a replaceable module adapted to provide depth sensing may be mounted on the head-worn computer to provide the function. In embodiments, a processor in the head-worn computer reads data from the module to identify it and/or its functions such that the module can be properly operated and data from the module can be properly used. In embodiments, the identification is accomplished through a predetermined code.

In embodiments, the head-worn computer includes an electrical connector adapted to electrically connect with a modular expansion module, wherein the modular expansion module adds a capability to the head-worn computer and is removeably mounted to the head-worn computer; and a mount adapted to physically secure the modular expansion module to the head-worn computer. In embodiments, the mount may be a magnetic element to physically secure the modular expansion module. In embodiments, the mount may include a snap fit element(s) to physically secure the modular expansion module. In embodiments, the mount may include an alignment element(s) to physically align the modular expansion system on the head-worn computer. In embodiments, the head-worn computer may further include a processor adapted to recognize a function of the modular expansion module, when connected to the modular expansion module, such that the modular expansion module operates in accordance with a schema identified for the function. In embodiments, the expansion module may perform a function related to optical modification for a camera in the head-worn computer (e.g. a zoom lens), it may contain a self contained camera, a sensor, sensor set, stereo/multi-cameras, depth sensor, radar, tracking IR emitting diodes, tracking IR photodiodes, IMU(s), sound or haptic transducers, light emitters, magnetic field sensors, magnetic field emitters, EMI tracking (e.g. coils), electrochromic window, liquid crystal window, shutter, wind sensor, scent sensor, etc. In embodiments, the modular expansion system may be powered by a battery or other power source of the head-worn computer or have internal power. In embodiments, when the expansion module has internal power, the module may also operate when it is removed from the head-worn computer. For example, the expansion module may include a camera and a low power data connection (e.g. Bluetooth) such that the expansion module can be placed on a table in front of the user so the user can video himself (e.g. for a video conference).

Figure 31:
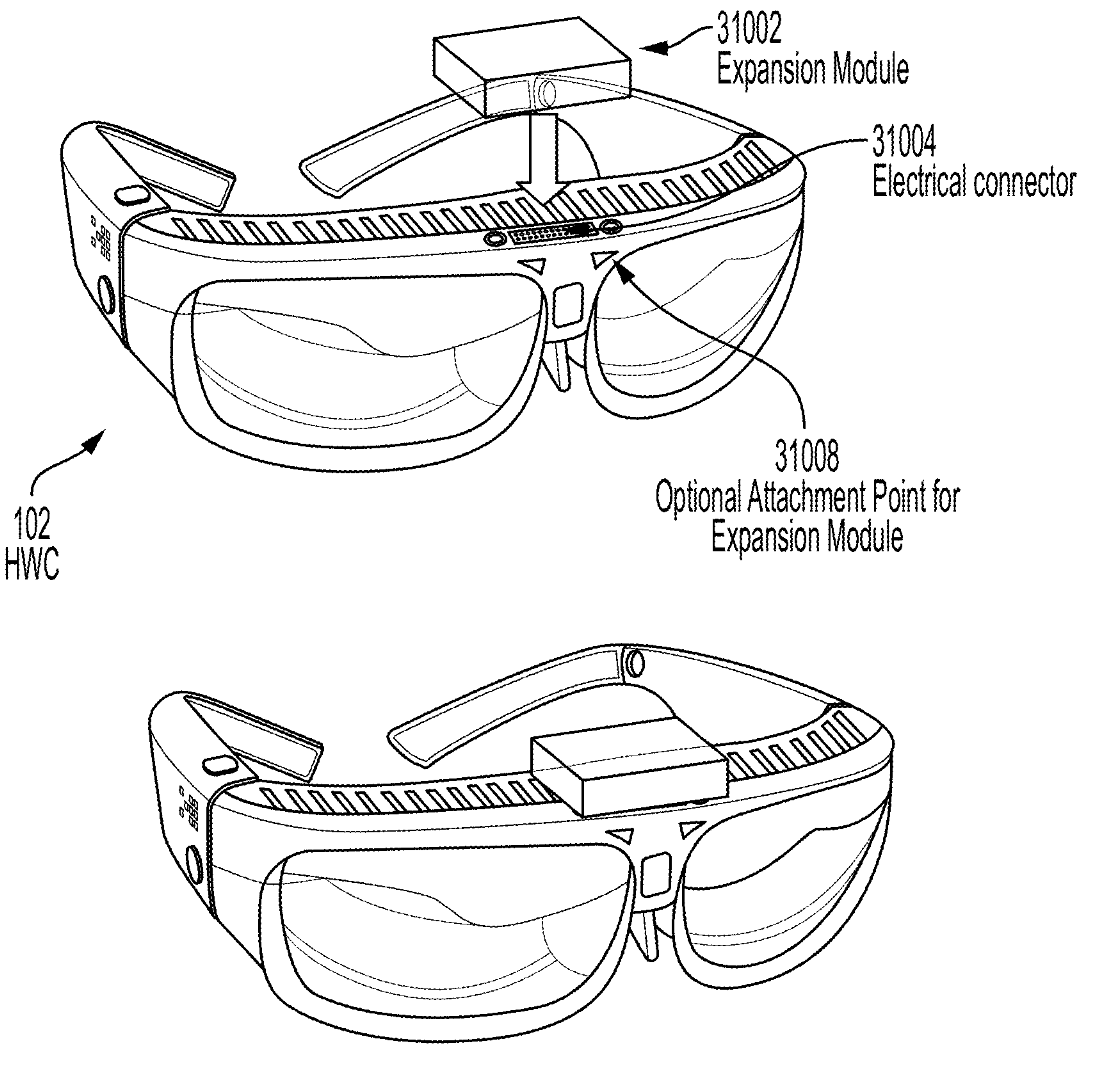
FIGS. 31 through 33 illustrate modular expansion modules in accordance with the principles of the present disclosure.

FIG. 31 illustrates a head-worn computer 102 adapted to receive an expansion module 31002. The expansion module 31002 electrically connects to the HWC 102 through an electrical connector 31004. The HWC 102 and expansion module 31002 may have mechanical, magnetic or other securing mechanisms to hold the two together (e.g. optional attachment point 31008).

Figure 32:
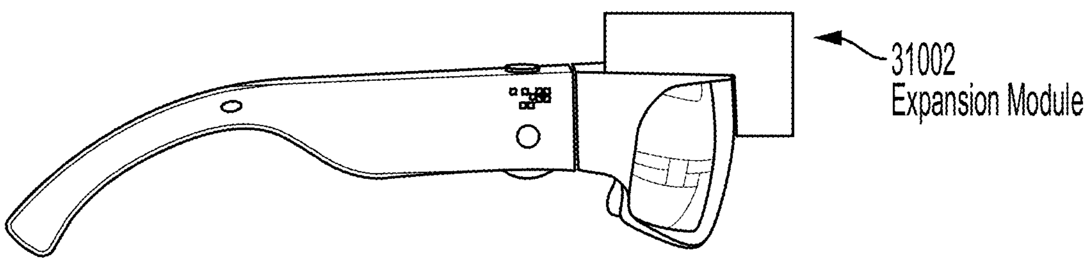
Figure 32:
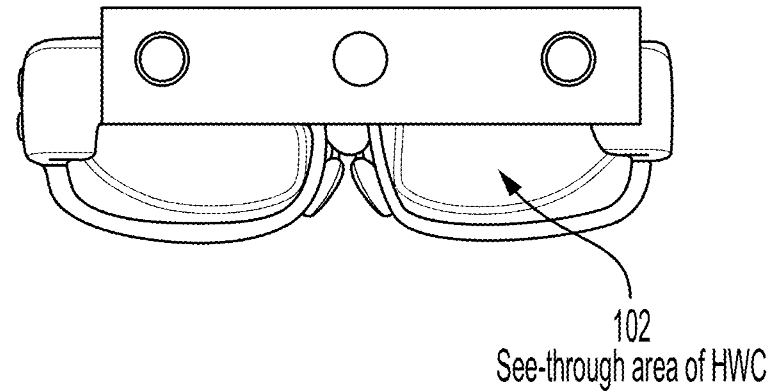
Figure 33:
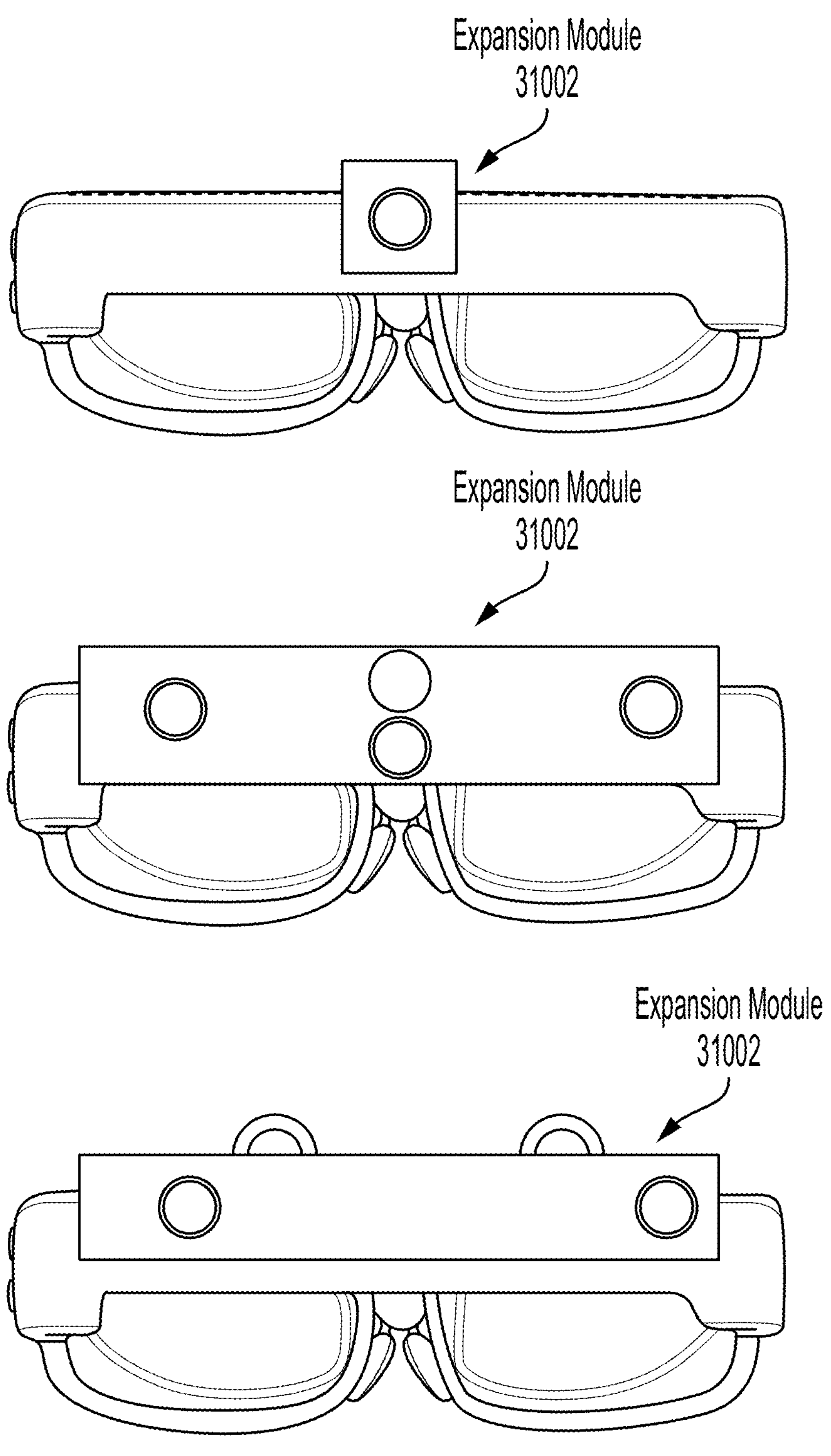

FIG. 32 illustrates an embodiment where the expansion module 31002 hangs down in front of the HWC 102. In embodiments, the expansion module may sit on top, hang over a side or front of the HWC 102, or be otherwise mounted. In the illustrated embodiment of FIG. 32, while the expansion module 31002 hangs down in front of the HWC 102, it still sits above a see-through area of the HWC 102. FIG. 33 illustrates a few optional configurations for the expansion module 31002.

While many of the embodiments herein describe see-through computer displays, the scope of the disclosure is not limited to see-through computer displays. In embodiments, the head-worn computer may have a display that is not see-through. For example, the head-worn computer may have a sensor system (e.g. camera, ultrasonic system, radar, etc.) that images the environment proximate the head-worn computer and then presents the images to the user such that the user can understand the local environment through the images as opposed to seeing the environment directly. In embodiments, the local environment images may be augmented with additional information and content such that an augmented image of the environment is presented to the user. In general, in this disclosure, such see-through and non-see through systems may be referred to as head-worn augmented reality systems, augmented reality displays, augmented reality computer displays, etc.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The invention claimed is:

1. A system comprising:

a wearable head device comprising a display region, the display region configured to present a view of an environment of the wearable head device;

an electrical connector configured to removably secure to an electronic module; and one or more processors configured to perform a method comprising:

determining that the electronic module is coupled to the wearable head device via the electrical connector, wherein the determining that the electronic module is coupled comprises determining that the electrical connector is secured to the electronic module;

in accordance with a determination that the electronic module is coupled to the wearable head device, receiving, by the wearable head device, data from the electronic module;

determining, based on the received data, an operation of the electronic module; and presenting an output to the wearable head device via the electrical connector in accordance with the operation of the electronic module.

2. The system of claim 1, wherein the method further comprises identifying a function associated with the electronic module.

3. The system of claim 1, wherein the method further comprises in accordance with a determination that the electronic module is not coupled to the wearable head device, forgoing receiving the data from the electronic module.

4. The system of claim 1, wherein the electronic module is configured to perform the operation when not coupled to the wearable head device.

5. The system of claim 1, wherein the electronic module comprises one or more sensors.

6. The system of claim 5, wherein:

the one or more sensors comprises a sensor of a first sensor type, the wearable head device does not comprise a sensor of the first sensor type.

7. The system of claim 1, wherein the electronic module is configured to receive and transmit data wirelessly.

8. The system of claim 7, wherein the electronic module is configured to receive and transmit data wireless via Bluetooth.

9. The system of claim 1, wherein the electronic module comprises a battery configured to provide energy to the electronic module.

10. The system of claim 1, wherein the output causes the wearable head device to perform an action associated with the operation.

11. The system of claim 1, wherein the method further comprises in accordance with the determination that the electronic module is coupled to the wearable head device, transmitting, by the wearable head device, second data to the electronic module.

12. The system of claim 1, wherein the wearable head device is configured to provide support to the electronic module via the electrical connector.

13. The system of claim 1, wherein the electronic module comprises a camera.

14. The system of claim 1, wherein the electrical connector comprises a magnetic connector.

15. A method for operating a system, the system comprising:

a wearable head device comprising a display region, the display region configured to present a view of an environment of the wearable head device; and an electrical connector configured to removably secure to an electronic module, the method comprising:

determining that the electronic module is coupled to the wearable head device via the electrical connector, wherein the determining that the electronic module is coupled comprises determining that the electrical connector is secured to the electronic module;

in accordance with a determination that the electronic module is coupled to the wearable head device, receiving, by the wearable head device, data from the electronic module;

determining, based on the received data, an operation of the electronic module; and presenting an output to the wearable head device via the electrical connector in accordance with the operation of the electronic module.

16. The method of claim 15, further comprising identifying a function associated with the electronic module.

17. The method of claim 15, further comprising transmitting second data wirelessly to the electronic module and receiving third data wirelessly from the electronic module.

18. The method of claim 15, further comprising causing, via the output, the wearable device to perform an action associated with the operation.

19. The method of claim 15, wherein the electronic module comprises a camera.

20. A non-transitory computer-readable medium storing instructions which, when executed by one or more processors of a system, cause the one or more processors to perform a method, the system comprising:

a wearable head device comprising a display region, the display region configured to present a view of an environment of the wearable head device; and an electrical connector configured to removably secure to an electronic module, the method comprising:

determining that the electronic module is coupled to the wearable head device via the electrical connector, wherein the determining that the electronic module is coupled comprises determining that the electrical connector is secured to the electronic module;

in accordance with a determination that the electronic module is coupled to the wearable head device, receiving, by the wearable head device, data from the electronic module;

determining, based on the received data, an operation of the electronic module; and presenting an output to the wearable head device via the electrical connector in accordance with the operation of the electronic module.

* * * * *